United States Patent
Fukushima et al.

(10) Patent No.: US 7,714,857 B2
(45) Date of Patent: *May 11, 2010

(54) THREE-DIMENSIONAL IMAGE DISPLAY APPARATUS, METHOD OF DISTRIBUTING ELEMENTAL IMAGES TO THE DISPLAY APPARATUS, AND METHOD OF DISPLAYING THREE-DIMENSIONAL IMAGE ON THE DISPLAY APPARATUS

(75) Inventors: Rieko Fukushima, Tokyo (JP); Yuzo Hirayama, Yokohama (JP); Kazuki Taira, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,246

(22) Filed: Aug. 13, 2008

(65) Prior Publication Data

US 2008/0309663 A1 Dec. 18, 2008

Related U.S. Application Data

(63) Continuation of application No. 10/744,045, filed on Dec. 24, 2003, now Pat. No. 7,425,951.

(30) Foreign Application Priority Data

Dec. 27, 2002 (JP) .............................. 2002-382389
Feb. 25, 2003 (JP) .............................. 2003-047733

(51) Int. Cl.
*G06T 15/00* (2006.01)
*G02B 27/22* (2006.01)

(52) U.S. Cl. ............................ 345/419; 348/32; 348/51; 348/54; 359/462; 359/463; 359/464; 359/465; 359/494; 359/15

(58) Field of Classification Search ......... 345/419–426; 359/462, 463, 464, 465, 15, 494; 348/32, 348/51, 54
See application file for complete search history.

(56) References Cited

U.S. PATENT DOCUMENTS 5,943,166 A 8/1999 Hoshi et al.

(Continued)

FOREIGN PATENT DOCUMENTS

JP 2-226139 9/1990

(Continued)

OTHER PUBLICATIONS

Notification of Reasons for Rejection issued by the Japanese Patent Office for Japanese Patent Application No. 2003-047733, and English translation thereof.

(Continued)

*Primary Examiner*—Jin-Cheng Wang
(74) *Attorney, Agent, or Firm*—Finnegan, Henderson, Farabow, Garrett & Dunner, L.L.P.

(57) ABSTRACT

An apparatus is provided with a display unit and a optical filter. The unit has pixels arranged in a matrix form, which are groped into a first group and second groups to display two-dimensional image information constituting elemental images, the image information being obtained from different directions. The optical filter has a first optical opening opposed to the first pixel group and second optical openings opposed to corresponding one of the second pixel groups. The center of the first pixel group is coincident with the axis of the first opening, each center of the second pixel groups is deviated from corresponding one of the second opening axe, and the deviation is gradually increased depending on a distance between the first and the second pixel group centers. The light rays are directed to a reference plane from the first and second pixel groups through the first and second opening axes.

6 Claims, 20 Drawing Sheets

U.S. PATENT DOCUMENTS

| | | | |
|---|---|---|---|
| 5,991,073 | A | 11/1999 | Woodgate et al. |
| 6,046,849 | A | 4/2000 | Moseley et al. |
| 6,049,424 | A | 4/2000 | Hamagishi |
| 6,055,013 | A | 4/2000 | Woodgate et al. |
| 6,055,103 | A | 4/2000 | Woodgate et al. |
| 6,437,915 | B2 | 8/2002 | Moseley et al. |
| 6,449,090 | B1 | 9/2002 | Omar et al. |
| 6,459,532 | B1 | 10/2002 | Montgomery et al. |
| 6,519,088 | B1 | 2/2003 | Lipton |
| 6,603,504 | B1 | 8/2003 | Son et al. |
| 6,703,989 | B1 | 3/2004 | Harrold et al. |
| 6,795,241 | B1 | 9/2004 | Holzbach |
| 6,816,207 | B2 | 11/2004 | Jung |
| 6,940,646 | B2 | 9/2005 | Taniguchi et al. |
| 6,999,110 | B2 | 2/2006 | Kobayashi |
| 2003/0184571 | A1 | 10/2003 | Hirayama |

FOREIGN PATENT DOCUMENTS

| | | |
|---|---|---|
| JP | 7-77668 | 3/1995 |
| JP | 8-194273 | 7/1996 |
| JP | 10-239785 | 9/1998 |
| JP | 10-253926 | 9/1998 |
| JP | 11-085095 | 3/1999 |
| JP | 2001-56450 | 2/2001 |
| JP | 2001-215444 | 8/2001 |
| JP | 2002-034057 | 1/2002 |
| JP | 2002-72136 | 3/2002 |
| JP | 2002-300599 | 10/2002 |

OTHER PUBLICATIONS

Notification of Reasons for Rejection issued by the Japanese Patent Office for Japanese Patent Application No. 2001-382389, and English translation thereof.
Shimizu et al., "Latest 3D Video Technology—in an Effort to Provide Ultimate Displays," pp. 88 and 89, and English-language abstract.
U.S. Appl. No. 10/809,512, filed Mar. 26, 2004, to Saishu et al.
Office Action mailed Oct. 18, 2005 in U.S. Appl. No. 10/744,045.
Office Action mailed Jun. 5, 2006 in U.S. Appl. No. 10/744,045.
Office Action mailed Feb. 5, 2007 in U.S. Appl. No. 10/744,045.
Office Action mailed Oct. 2, 2007 in U.S. Appl. No. 10/744,045.
Office Action mailed Jan. 15, 2008 in U.S. Appl. No. 10/744,045.

THREE-DIMENSIONAL IMAGE DISPLAY APPARATUS, METHOD OF DISTRIBUTING ELEMENTAL IMAGES TO THE DISPLAY APPARATUS, AND METHOD OF DISPLAYING THREE-DIMENSIONAL IMAGE ON THE DISPLAY APPARATUS

CROSS-REFERENCE TO RELATED APPLICATIONS

This application is a continuation of application Ser. No. 10/744,045 (allowed), filed Dec. 24, 2003 now U.S. Pat. No. 7,425,951, which is based upon and claims the benefit of priority from prior Japanese Patent Applications No. 2002-382389, filed Dec. 27, 2002 and No. 2003-047733, filed Feb. 25, 2003, all of which are incorporated herein by reference.

BACKGROUND

1. Technical Field

The present invention relates to a display apparatus for displaying a three-dimensional image, particularly to a method of disposing elemental images to secure a maximum viewing zone, a method in which an observer can recognize deviation from the viewing zone, and an apparatus for realizing this method.

2. Description of the Related Art

There are various systems for displaying a three-dimensional image, and there may be roughly two methods. One of them is a system for a stereoscopic viewing using a binocular parallax, and the other method is a space image reproduction system for actually forming the space image in space.

As the binocular parallax system, there have been proposed various systems with or without the presence of glasses, for example, a stereoscopic system including video information for left/right eyes (so-called stereoscopic method) and a multi-view system in which a plurality of observation positions at the time of video photography are disposed to increase an amount of information and to expand an observable range. Here, in the stereoscopic system, two photography positions are disposed for left and right eyes to obtain images for left and right eyes so that the images are visible with the left and right eyes, respectively. In the multi-view system, the video photography positions are further increased as compared with the stereoscopic system.

In contrast to the binocular parallax system, the space image reproduction system in which the image is reproduced in the space is an idealistic system for three-dimensional image reproduction, and holography is classified in the space image reproduction system. This system is sometimes referred to as an integral imaging (II) system proposed by Lippmann in France in 1908 (also referred to as an integral photography (IP) system, and sometimes as a light ray reproduction method), and is also sometimes classified in the binocular parallax system. However, in the II system, light rays travel in reproduction optical paths at the time of reproducing, which are opposite to photographing optical paths at the time of recording to reproduce a complete three-dimensional image. Therefore, an ideal integral imaging (II) system must be classified in the space image reproduction system.

This integral imaging (II) system or the light ray reproduction system has been disclosed, for example, in Jpn. Pat. Appln. KOKAI Publication Nos. 10-239785 and 2001-56450. Here, meanings of terms of the integral imaging method and light ray reproduction method are not exactly established in a stereoscopic display method, but the methods may be considered based on about the same principle. In the following description, the system will be referred to as the "integral imaging system" as a concept including the light ray reproduction system.

In recent years, a system which includes a lenticular lens or a parallax slit combined with a display has come into the mainstream for displaying three-dimensional images. In such a system, stereoscopic observation is possible without any glasses. If the three-dimensional image is displayed without any glasses as in the multi-view system or the II system, the following system or apparatus is sometimes used. In the system, a display unit is provided, which has a plurality of two-dimensionally arranged pixels, and an optical barrier is disposed in front of the pixels. The pixels-display a two-dimensional image, which is projected in a front space through the optical barrier to form a three-dimensional image. The optical barrier has openings, slits, or exit pupils, each of which has a size smaller than that of the pixels, typically, so as to pick up one image from the pixel. The optical barrier has a function of controlling a transmission of light rays emitted from the pixels so that the optical barrier is called a transmission control unit and the opening is called a transmission control section, and the openings are realized by pinholes or micro lenses, which are two-dimensionally arranged. In a three-dimensional image display apparatus, a natural three-dimensional image can be reproduced. A liquid crystal display unit can be used as the display unit, which includes image display elements corresponding to the pixels arranged in a matrix form.

A large number of elemental images each composed of two-dimensional images are displayed on the pixels for the three-dimensional image, which are observed subtly different in a visible way in accordance with a viewing angle, wherein each of the pixels have a positional relationship with the individual pinholes or micro lenses on the three-dimensional image display apparatus. That is, light rays are emitted to the front space of the display apparatus from the elemental images through the corresponding pinholes or micro lenses, or from a light source through the pinholes or micro lenses and the elemental images. These light rays form a three-dimensional real image in front of the transmission control sections, such as the pinholes or the micro lenses. When paths of these light rays are extrapolated on the rear space in the back side of the transmission control sections of the pinholes or the micro lenses, a three-dimensional virtual image (image which does not exist as viewed on a rear-space side) is observed on the rear space of the transmission control sections of the pinholes or the micro lenses. That is, as observed by the observer, the three-dimensional real image is observed by a group of light rays which are emitted from the elemental image and form the image in the front space of the transmission control sections, and the three-dimensional virtual image is observed by the group of light rays which also form the image in the rear space of the transmission control sections.

As described above, various systems for displaying the three-dimensional image in real space have been proposed. In an ultimate three-dimensional image display, the displayed image seems to be natural as if the displayed image actually existed in the real space. From this standpoint, the integral imaging system in which convergent points are not located at a viewing distance is assumed to be a superior method, because a natural stereoscopic image can be formed by a simple construction. Since the visible images are successively changed in accordance with the angle viewed by the observer through the windows, a natural motion parallax is obtained, and a more realistic stereoscopic image can be reproduced. In this respect, this method is superior.

It is to be noted that a multi-view display apparatus without any glasses seemingly has a construction similar to that of the display apparatus of the II system. However, the display apparatus of the multi-view system is obviously different from the II system in that the light rays from the apparatus are converged on an observation plane positioned in a visual distance. For the display apparatus of the multi-view system, the observer is requested to be positioned in or around the visual distance, and a converging point of the light rays in this visual distance is requested to be set to be (1/integer) times of an interval between the eyes. In other words, when the observer is positioned in the visual distance, the light rays passing through (1/integer) of an exit pupil need to be incident upon observer's both eyes. For the display apparatus of the multi-view system, even when the number of two-dimensional images obtained from different directions and corresponding to one exit pupil is small, the three-dimensional image can be recognized by the binocular parallax. Therefore, when the number of pixels is limited because of various circumstances such as a resolution of an image display unit in the display apparatus of the multi-view system, there is a merit that the three-dimensional image of high precision can be represented as compared with the II system. However, when the observer moves in a transverse direction in the display apparatus of the multi-view system, and when an interval between the converging points is not sufficiently short, there is a problem that flipping of the three-dimensional image is observed or that the viewing zone along the viewing direction is limited.

In the apparatus without any glasses, there is a common problem in which a viewing region may be limited, even if the three-dimensional image can be observed without glasses.

The light rays from the light source are radiated in all directions via each pixel of a transmission type display unit in which the parallax information is displayed, and transmitted through the transmission control section such as a pinhole array, a slit plate, a fly-eye lens array, or a lenticular lens array having an array of exit pupils, as described above. Accordingly, the light rays are so controlled as to bear parallax information and are projected in a predetermined direction. The light rays emitted in the predetermined direction are incident upon the observer's eyes and visually recognized by the observer's eyes in accordance with observer's eye positions, and the three-dimensional image is recognized by the binocular parallax. If a sufficiently large number of light rays are projected in the front space, the three-dimensional real or virtual image is formed in front of or behind the display unit, and the observer can recognize the image. In this specification, a combination of two-dimensional images obtained from various directions on one exit pupil is referred to as elemental images.

In the above-described display apparatus, the light rays emitted from the pixels are designed to pass through the corresponding exit pupil and are directed to a predetermined direction, but some of the light rays are actually passed through another exit pupil, especially through the adjacent exit pupil, and are directed to another direction. The light rays passing through this wrong exit pupil form an image (hereinafter referred to as a quasi image) different from the original three-dimensional image (hereinafter referred to as the correct image). The quasi image resembles the correct image, but is formed into a distorted image in accordance with a deviation of a designed value. When the wrong light rays hinder the correct image, the correct and quasi images are visually recognized in an intermingled manner.

Essentially, when the integral imaging system (II system) that is of a photographic concept is to be realized with electronic devices such as LCD and PDP, there is a concept of viewing zone, but a method of preparing the image displayed on the image display unit in consideration of the viewing zone has not been studied. If the concept of viewing zone is not introduced in the formation of the three-dimensional image to be displayed by the image display unit, there is a problem that an actual viewing zone is narrowed as described hereinafter.

In the three-dimensional image display apparatus of the II system in which the viewing zone is not considered, a positional relation between the elemental images corresponding to the exit pupil is not studied in detail. In the II system, there are provided a main viewing zone or a main lobe in which the correct image is produced, a transitional zone in which the quasi image is produced, and an intermingled zone or a side-lobe zone between the main viewing zone and the transitional zone, in which the quasi and correct images are intermingled. In any case, there is a problem that the main viewing zone only for the correct image is narrow even as compared with the intermingled transitional zones, and is a limited region, which cannot substantially be used practically.

As described above, in the three-dimensional image display apparatus in which the II system is used, a problem that the viewing zone is narrow and the region including the intermingled and visually recognized correct and quasi images is large has been pointed out.

Moreover, as described above, in the three-dimensional image display apparatus without any glasses, the observer may be shifted into the side-lobe zone from the main viewing zone, when the observer moves along the display panel. Therefore, the quasi image different from the true image may be gradually intermingled, and the quasi image may be perceived. This is because a part of the elemental image displayed by the pixel for displaying the three-dimensional image disposed adjacent to the original pixel for displaying the original three-dimensional image is visually recognized via the opening disposed opposite to the certain pixel for displaying the three-dimensional image in a case where the opening is observed from a wide field of view including the deviating observation position.

The three-dimensional image display apparatus using the above-described construction can be used in various fields, and a medical application is one of the applications of the apparatus. When the three-dimensional image display apparatus is used in the medical field, what is remarkably important is that the quasi image cannot be perceived or that the observer can recognize that the three-dimensional image perceived by the observer includes the quasi image. However, in a conventional three-dimensional image display apparatus, the quasi image is inevitably perceived. Moreover, when the perceived three-dimensional image includes the quasi image, it cannot constantly be recognized that the quasi image is observed in a case where the perceived three-dimensional image includes the quasi image.

To solve the problem, the use of refraction of light has been proposed as disclosed in Jpn. Pat. Appln. KOKAI Publication No. 2002-72136. It is to be noted that in this publication a color filter having a function of an optical shutter constitutes the pixel for displaying the three-dimensional image, and a white point light source array is disposed on the rear surface of the color filter instead of using the optical barrier.

In the technique described in the above-identified Jpn. Pat. Appln. KOKAI Publication No. 2002-72136, a transparent medium whose refractive index is larger than 1 is inserted between the color filter and the white point light source array. In this structure, light ray components on the side of the wide field of view can totally be reflected by the surface of the transparent medium on the side of the color filter among the light rays from each white point light source. Therefore, when a distance between the transparent medium and the color filter is appropriately set, the light rays from the white point light source disposed opposite to the pixel for displaying the three-dimensional image can be prevented from entering the adjacent pixel for displaying the three-dimensional image. Therefore, it is possible to prevent the quasi image from being perceived.

However, since the refraction of light rays is used in this method, the region of the observation position in which the true image can be perceived is broadened. Therefore, there is a problem with the image, in situations in which the observation position is moved irregularly or when the number of pixels for displaying the two-dimensional image included in the pixels for displaying the three-dimensional parallax is changed. Specifically, a natural movement pattern is lost.

SUMMARY

An object of the present invention is to provide a three-dimensional image display apparatus to enlarge a viewing zone in which only light rays bearing image information are visually recognized in order to display a correct image and to minimize an observation angle in which a quasi image is mixed.

Another object of the present invention is to provide a three-dimensional image display apparatus in which the quasi image cannot be perceived or an observer can recognize that a three-dimensional image perceived by the observer includes the quasi image, and a display method using the apparatus.

According to an aspect of the present invention, there is provided a n apparatus for displaying a three-dimensional image, which can be observed in a viewing zone having a reference plane, comprising:

a display unit which has pixels arranged in a matrix form, the pixels being grouped into a first group and a plurality of second groups to display elemental images, the first and second pixel groups having first and second pixel group centers, respectively; and transmission control section having a first optical opening and a plurality of second optical openings, configured to control a transmission of light rays emitted from the elemental images, the first optical opening being opposed to the first pixel group, the second optical openings being opposed to corresponding one of the second pixel groups, the first and second optical openings having first and second opening axes, respectively, the first pixel group center being aligned on the first opening axis, each of the second pixel group centers being deviated from corresponding one of the second opening axes, the deviation being gradually increased depending on a distance between the first pixel group center and the second pixel group center, the light rays being directed from the first pixel group through the first opening axis and the light rays being directed from each of the second pixel groups through the corresponding one of the second opening axes to the reference plane.

According to another aspect of the present invention, there is provided a method of distributing parallax images in an apparatus for displaying a three-dimensional image which can be observed in a viewing zone, the display unit including a display, which has pixels arranged in a matrix form, the pixels being grouped into pixel groups to display elemental images, and a transmission control section having optical openings, which is configured to control a transmission of light rays from the elemental images, the method comprising:

determining a reference plane located at a predetermined distance from a display unit and a center of the reference plane as the center of the viewing zone;

setting optimum paths of light rays for the optical openings, each of the optimum path passing through the center of each of the optical opening to the center of the viewing zone or a position closest to the center of the viewing zone, and determining a relation between the optical opening and the corresponding pixel group which is located on the optimum path passing through the optical opening; and applying the elemental images to the pixel groups based on the optimum paths.

According to a yet another aspect of the present invention, there is provided a method of distributing parallax images in an apparatus for displaying a three-dimensional image which can be observed in a viewing zone, the display unit including a display having pixels arranged in a matrix form, and a transmission control section having optical openings, which is configured to control a transmission of light rays from the pixel, the method comprising:

determining one of first and second states, light rays emitted from the pixel passing through the optical opening and being directed in the viewing zone in the first state, and the light rays emitted from the pixel passing through the optical opening and being directed outside the viewing zone, from a position of the pixel in the second state;

determining the parallax image information to be distributed to the pixels based on the path of the light rays in the first state; and changing the optical opening to the another one of optical opening in the second state and returning to the determining one of the first and second states.

According to a further aspect of the present invention, there is provided a method of displaying a three-dimensional image which can be observed in a viewing zone having a reference plane, the display method comprising:

displaying elemental image on pixels arranged in a matrix form, the pixels being grouped into a first group and a plurality of second groups, the first and second pixel groups having a first group center and a plurality of second pixel group centers, respectively; and controlling a transmission of light rays emitted from the elemental images utilizing a first optical opening and a plurality of second optical openings, the first optical opening being opposed to the first pixel group, the second optical openings being opposed to corresponding one of the second pixel groups, the first and second optical openings having first and second opening axes, respectively, the first pixel group center being aligned on the first opening axis, each of the second pixel group centers being deviated from corresponding one of the second opening axes, the deviation being gradually increased depending on a distance between the first pixel group center and the second pixel group center, the light rays being directed from the first pixel group through the first opening axis and the light rays being directed from each of the second pixel groups through the corresponding one of the second opening axes to the reference plane.

According to a yet further aspect of the present invention, there is provided an apparatus for displaying a three-dimensional image utilizing an integral imaging system comprising:

a display having a plurality of pixel units arranged vertically and horizontally, each pixel unit including first group of sub-pixels positioned in a middle part of the pixel unit, and a second group of sub-pixels positioned in a peripheral edge of the pixel unit; and a optical barrier disposed opposite to the pixel units and having optical openings, the optical openings causing the first group of sub-pixels to display the three-dimensional image and causing the second group of sub-pixels to display an image for warning distinguishable from the three-dimensional image.

According to a yet further aspect of the present invention, there is provided an apparatus for displaying a three-dimensional image which can be observed in a viewing zone, comprising:

a plurality of pixel units arranged vertically and horizontally, each pixel unit including first group of sub-pixels;

a first shielding layer disposed opposite to the plurality of pixel units and including first optical openings disposed opposite to each pixel unit; and a second shielding layer disposed between the plurality of pixel units and the first shielding layer, separated from the pixel units and the first shielding layer, and including second optical openings so disposed as to opposite to the first optical openings, respectively.

According to a yet furthermore aspect of the present invention, there is provided n apparatus for displaying a three-dimensional image, which can be observed in a viewing zone having a zone axis and a reference plane perpendicular to the zone axis, comprising:

a display unit which has pixels arranged in a matrix form, the pixels being grouped in groups of pixels to display elemental images, each of the groups of pixels having a group center; and transmission control section having optical openings, configured to control a transmission of light rays emitted from the elemental images, the optical openings being opposed to the elemental images, the optical openings having opening axes, respectively, deviations being produced between some of the group centers and the corresponding opening axes, the deviation being stepwisely increased depending on a distance between the zone axis and the corresponding opening center, the light rays being directed from the pixels through the corresponding opening axis to the reference plane.

In the description, it is to be noted that here terms "integral imaging (II) system" and "multi-view system" are distinguished as follows.

The multi-view system is a three-dimensional image display system in which a case where an observation position is distant from a display plane by an observation visual distance is assumed, and a design in which two-dimensional images photographed in two photography positions are observed with right and left eyes in this case is used. That is, the multi-view system is designed in such a manner that two or more pairs of converging points for the right and left eyes are set in a plane distant from the display plane by the observation visual distance, and display light rays for displaying the two-dimensional images photographed in the respective observation positions are converged on the converging points. It is to be noted that the two-dimensional images for use herein are photographed by a perspective projection process, and image information is assigned to and is displayed on at least two pixels for displaying the three dimensional image which corresponds to each of the windows.

According to this design, the observer can see separate images (the respective two-dimensional perspective images photographed in two photography positions) with the right and left eyes in a position distant from a screen by an observation visual distance L without using any glasses. Furthermore, when two or more pairs of converging points are arranged in a horizontal direction, photographing positions for obtaining the two-dimensional images are increased and a resolution of displaying the three dimensional image is lowered. If the observation position is moved in a left and/or right direction, both the images observed with the left and right eyes are switched. Therefore, the observer can confirm a condition of change of a three-dimensional image in accordance with the movement of the observation position.

On the other hand, the II system is a three-dimensional image display system using such a design that the two-dimensional images photographed in the respective photography positions are not focused on one point. For example, the system is designed in such a manner that a case where the observation position is distant from the display plane by an infinite distance is assumed, and the image observed with one eye (orthographic image) is switched, depending on the observation positions, for each of images photographed in a plurality of photography positions in accordance with an observation angle. Concretely, different from the perspective projection of the multi-view system, the orthographic image photographed by a parallel projection process is used, and the elemental images are produced with utilizing a ray-trace method.

According to this design, in reality, since the image is not observed from the position distant from the display plane by the infinite distance, the two-dimensional image observed with one eye does not equal to that photographed in any photography position. However, each of the two-dimensional images observed with the right and left eyes is constituted by addition of images photographed from a plurality of directions by the parallel projection process, and accordingly the two-dimensional image photographed in the observation position by the perspective projection process is formed on average. According to this constitution, separate images can be seen with the right and left eyes, respectively, and the three-dimensional image perceived by the observer becomes equivalent to that recognized in a case where a photographed object is actually observed in any direction.

Moreover, in this specification, term "display reference position" means an optional point or straight line positioned in the display plane. The "display reference position" may also be set in any place in the display plane. However, when the "display reference position" is a point, the point is typically set to substantially the center of the display plane. When the "display reference position" is the straight line, the line is typically set so as to pass through substantially the center of the display plane and to be vertical to a line connecting observer's both eyes.

DETAILED DESCRIPTION

A three-dimensional image display apparatus according to embodiments of the present invention will hereinafter be described with reference to the drawings.

Figure 1:
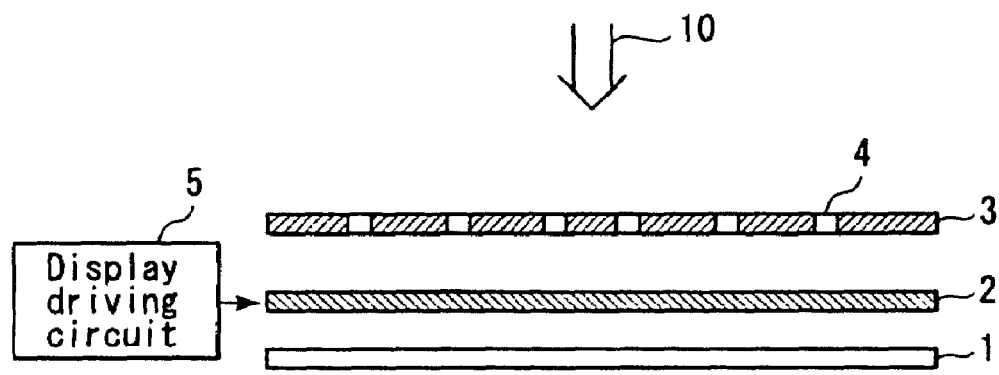
FIG. 1 is a sectional view schematically showing a structure of an II system display apparatus which displays a three-dimensional image according to a first embodiment of the present invention.

FIG. 1 shows a structure of the three-dimensional image display apparatus according to a first embodiment of the present invention. As shown in FIG. 1, the three-dimensional image display apparatus includes: a light source 1 which emits light rays as a backlight; an image display unit 2 including an image display element array which is irradiated with the light rays from the light source 1 and which includes an image display element array of display devices corresponding to pixels of equal size, the pixels being arranged in a matrix form, that is, in rows/columns; and an optical barrier or panel 3 having transmission control sections 4 which limit the light rays passing through the image display unit 2, to control the direction of the light rays. It is to be noted that an arrow 10 in FIG. 1 shows a direction in which an observer views the three-dimensional image display apparatus. When the apparatus is viewed from this direction, a three-dimensional stereoscopic image can be observed.

Figure 2:
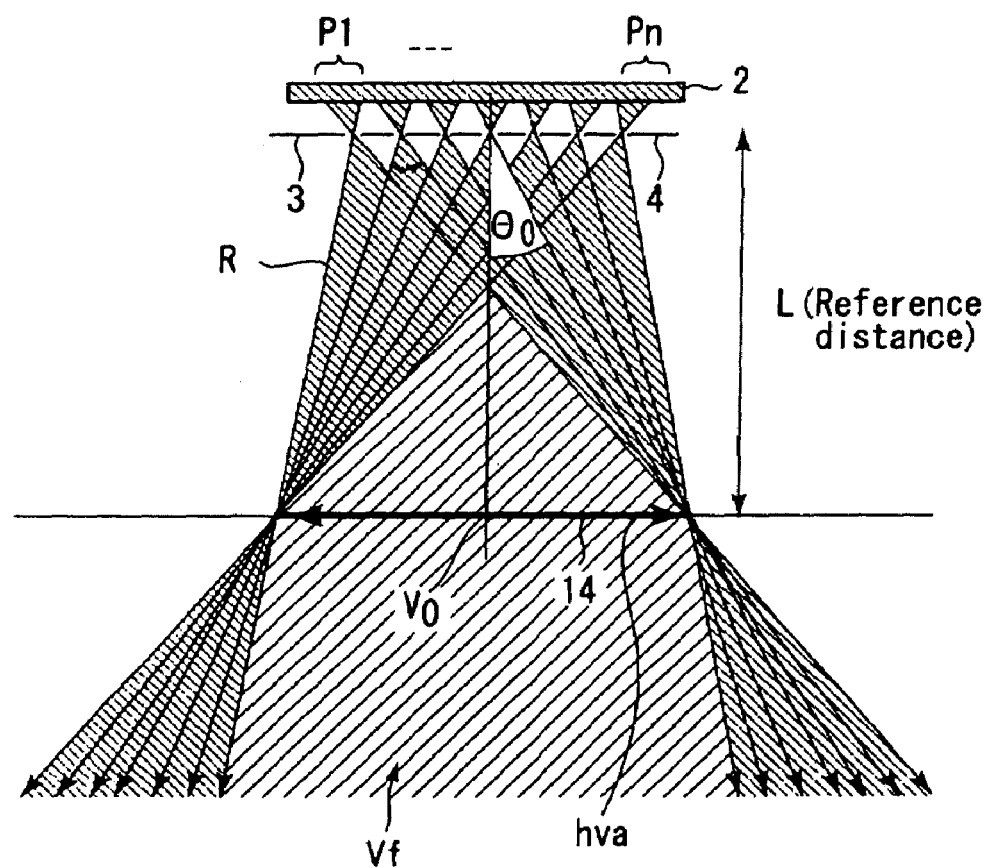
FIG. 2 is a schematic diagram showing maximization of a viewing zone of the display apparatus shown in FIG. 1 by the present proposed method.

The image display unit 2 displays parallax information required for the display of the three-dimensional image in pixels. The image display unit 2 may include a transmission type, which allows light rays to pass therethrough, thereby imparting image information to the light ray, and/or a self emission type, which generates light rays bearing image information by itself. With the image display apparatus of the transmission type, the light source 1 is required as shown in FIG. 1. When the image display unit 2 is of the self emission type as shown in FIG. 2, the light source 1 is unnecessary. The image display unit 2 of either the transmission type or the self emission type is considered to be used in direct sight type two-dimensional displays such as a cathode light ray tube device (CRT), a liquid crystal display (LCD), and a plasma display device (PDP), or in a projection type display.

On the other hand, the transmission control sections 4, often referred to as an optical barrier, correspond to a pinhole array, an array plate such as a slit array, a fly-eye lens, or a segment lens array plate of lenticular lenses, and the like. The pinhole array may include transmission control sections 4 for limiting light rays to be transmitted and to direct the light rays in a predetermined direction. The fly-eye lens may include lens segments 4 for controlling incident and outgoing light rays to direct the light rays in a predetermined direction. These transmission control sections 4 of optical barrier 3 have a function of controlling the light rays from the image display unit 2 and direct the light rays in a predetermined direction. For simplicity, the transmission control sections 4 will be referred to as openings or optical openings 4. The openings 4 are arranged in a matrix or slit form on the optical barrier 3. Instead of these optical devices, a liquid crystal display (LCD) may also be used as an optical barrier 3 in which positions and shapes of the transmission control sections 4 can be varied with time.

Moreover, the image display unit 2 is driven by a display driving circuit 5 to distribute and display parallax image information into the pixels corresponding to the respective optical openings 4, and light rays bearing the parallax image are projected in a front space through the optical opening 4, as will be described later. In the arrangement of the transmission type image display apparatus shown in FIG. 1, the light source 1, image display unit 2, and optical barrier 3 are successively arranged. However, it is appreciated that the image display unit 2 may be exchanged with the optical barrier 3. When the light source 1, optical barrier 3, and image display unit 2 are arranged in order, the light rays for displaying the two-dimensional image depending on the observation direction can still be produced.

Figure 3:
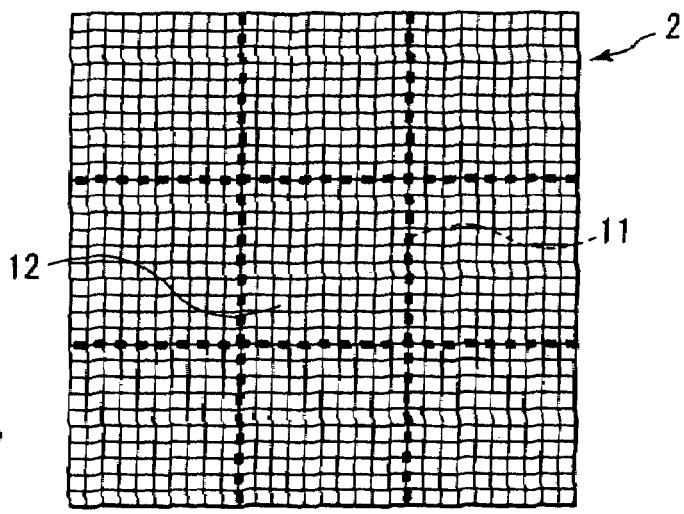
FIG. 3 is a plan view schematically showing a display unit of the display apparatus shown in FIG. 1.

In the following description, as schematically shown in FIG. 3, in the image display unit 2, pixel units 11 for displaying the three-dimensional image are arranged in the matrix form, and each of the pixel units 11 is constituted of a plurality of sub-pixels 12 which are also arranged in a two-dimensional matrix form. For the optical barrier 3, as one example shown in FIG. 4A, a shield pattern defining the optical openings 4 is formed on a transparent substrate. Alternatively, through holes corresponding to the optical openings 4 may be formed in a shield plate. Here, the optical openings 4 are arranged on the optical barrier 3 so as to be arranged opposite to the pixels 11 for displaying the three-dimensional image in matrix. When the image display unit 2 displays the parallax only along a horizontal direction as will be described later, as shown in FIG. 4B, the optical openings 4 are formed in slits extending along the vertical direction on the optical barrier 3. The slits 4 are also so disposed as to face the pixels 11 on the display and arranged only in the horizontal direction shown in FIG. 3B.

When the image display unit 2 is of a monochromatic type, for example, display colors of the respective sub-pixels 12 are assumed to be the same, and the individual sub-pixels 12 can form the pixels for displaying the two-dimensional image. In this case, each optical opening 4 usually have a shape similar to one sub-pixel 12, and typically has the shape and dimension as to pick up image information substantially related to one sub-pixel 12.

Moreover, when the image display unit 2 shown in FIG. 1 is of a full color type, the sub-pixels 12 can be constituted, for example, by three colored sub-pixels, which are displayed in three colors of red, green, and blue. If each of the sub-pixels 12 has a general shape, which is longitudinally elongated in the vertical direction, the three colored sub-pixels are laterally arranged along the horizontal direction to constitute one sub-pixel 12. In the three dimensional image displaying apparatus that provides parallax information only in the horizontal direction, it is required to have a high resolution in the horizontal direction. However, a combination of the sub-pixels 12 is not limited in the horizontal direction, but may also be arranged in the vertical direction. The sub-pixels 12 for displaying the two-dimensional image may also be constituted of the colored sub-pixels of red, green, and blue, and the three-dimensional image display apparatus shown in FIG. 1 may also display a two-dimensional flat image. In the former case in which the sub-pixel 12 composed of red, green, and blue sub-pixels is assumed as a unit, each optical opening 4 usually has a shape similar to that of one sub-pixel 12 constituted of three sub-pixels of red, green, and blue, and typically has about the same shape and dimension as those of one sub-pixel 12. Moreover, when the image display unit 2 is of a monochromatic type, each optical opening 4 usually has the shape similar to that of one mono-color sub-pixel 12 for displaying the two-dimensional image, and typically has about the same shape and dimension as those of one sub-pixel 12.

Figure 4A:
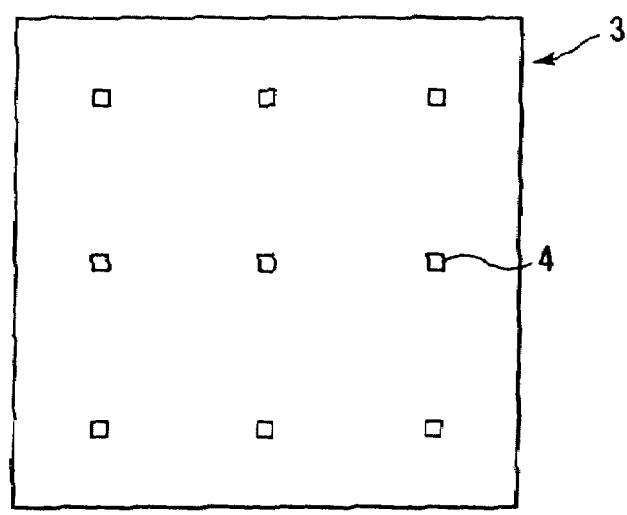
FIGS. 4A and 4B are plan views schematically showing two examples of transmission control sections shown in FIG. 1 including an arrangement to cope with pixels of the display unit shown in FIG. 3.
Figure 4B:
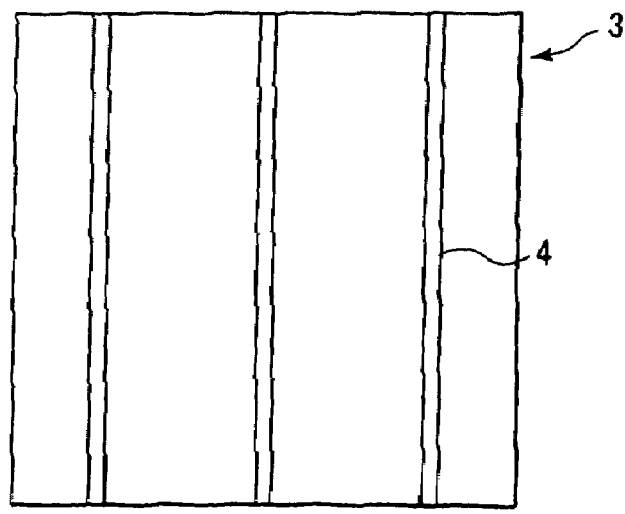

Moreover, FIG. 4A shows an example in which the openings are arranged in a lattice form, but the openings may spatially uniformly be arranged, and may also be arranged, for example, in a checkered pattern.

In the first embodiment, the three-dimensional image is displayed by the display apparatus shown in FIG. 1, for example, by the following method. If the three-dimensional image perceived by the observer includes the quasi image, the display of the quasi image can be recognized by the observer.

Figure 5:
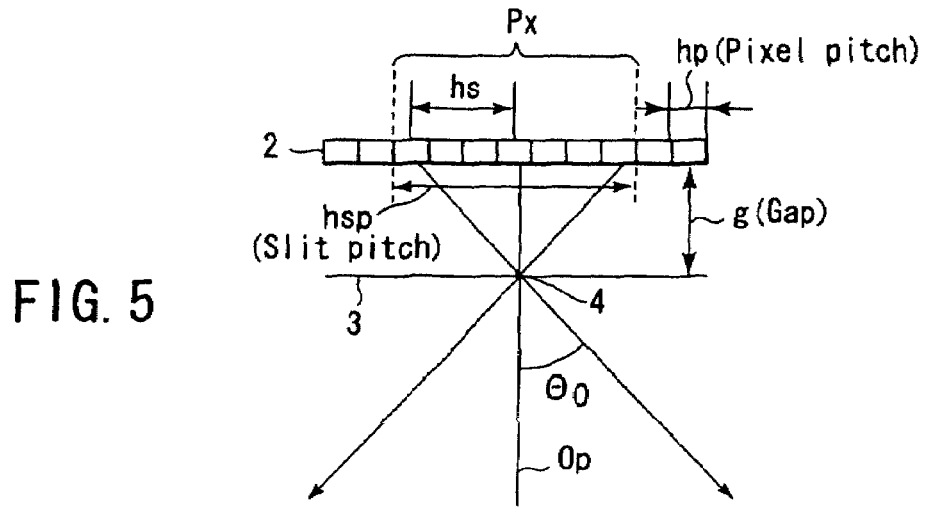
FIG. 5 is an explanatory view schematically showing a specific pixel group in which elemental images are disposed opposite to or schematically opposite to a center of the viewing zone in the display apparatus shown in FIG. 1.
Figure 6:
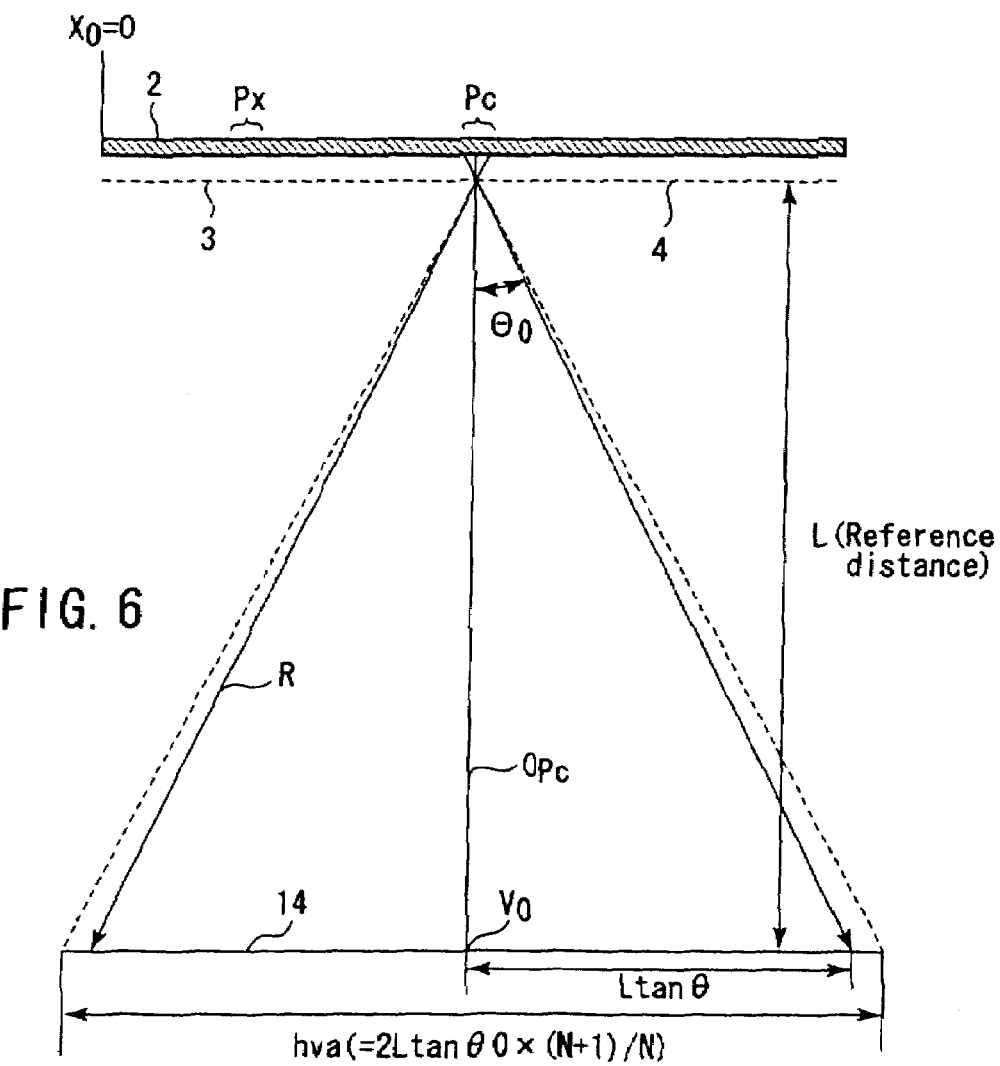
FIG. 6 is an explanatory view showing a relation of a path of a light ray with which the viewing zone is irradiated via an opening positioned on a central axis of the transmission control sections, and the viewing zone in the display apparatus shown in FIG. 1.

An arrangement example shown in FIG. 5 will hereinafter be described. FIG. 5 shows a state in which the apparatus is observed in a vertical direction, that is, a sectional view of the apparatus along the horizontal direction. In the three-dimensional image display apparatus shown in FIG. 5, as shown in FIG. 6, elemental images P1 to Pn constituted of a combination of two-dimensional images, which are so obtained depending on different directions as to subtly differ in a way of viewing in accordance with a viewing angle, are displayed on the image display unit 2.

The respective elemental images P1 to Pn are displayed as image patterns corresponding to the optical openings 4, such as the pinholes or micro lenses, in a pixel 11 for the three dimensional display, which is constituted of a plurality of sub-pixels 12 for two-dimensional display. The light rays emitted from a large number of patterns corresponding to the elemental images P1 to Pn are emitted as light rays R toward the front of the display apparatus via the corresponding optical openings 4 such as the pinholes or the micro lenses. These light rays R form a real image on the front surface of the optical barrier 3 of the pinholes or micro lenses, and form a virtual image on the rear space of the display unit 2. That is, a three-dimensional virtual image is observed by the light ray group constituted of the light rays R directed toward the pattern on the display unit 2 via the optical barrier 3 including the optical openings 4. The three-dimensional real image is formed by the light ray group R passed toward the observer from the pattern on the image display unit 2 through the optical barrier 3 of the pinholes or the micro lenses.

As shown in FIG. 2, to maximize a viewing zone at a reference distance L in the three-dimensional image display apparatus, the reference distance L is determined, which is used in arranging the elemental images P1 to Pn on the image display unit 2, and a reference plane 14 in the reference distance L is set. In the same manner as FIG. 1, FIG. 2 is also a schematic sectional view along the horizontal direction, which shows light ray paths. A width of the viewing zone of the horizontal direction in the reference plane 14 is denoted with hva in FIG. 2, and the center of the viewing zone is denoted with V0. The elemental images P1 to Pn are eccentrically arranged with respect to the corresponding optical barrier 3, that is, the optical openings 4 so that the path of the light ray R from the elemental image is incident upon the reference plane having the width hva in the viewing zone in the horizontal direction. Here, as described above, in the viewing zone, only a three-dimensional correct image is observed, and the viewing zone corresponds to a region excluding a transition zone where the quasi image is observed as the three-dimensional image together with the correct image and a quasi image region where the quasi image is produced. If the arrangement of the corresponding elemental images P1 to Pn is changed with respect to the optical barrier 3, that is, the center of the optical opening 4, light rays Rx emitted from the elemental images P1 to Pn and transmitted through all the optical openings 4 are substantially superimposed on one another in a region in the reference distance L, and the width hva of the viewing zone is substantially maximized. In FIG. 2, in the end of the reference plane 14 in the width hva, the light rays Rx are drawn as if they were intersected with one another on one point, but as will be described later, the light rays actually pass through a region having a certain width. In FIG. 2, it should be noticed that the region having a certain width in the end of the reference plane 14 is regarded as one point and drawn.

Next, a method of maximizing the width hva in the reference distance will be described with reference to FIGS. 5 to 19. The method of maximizing the viewing zone in the horizontal direction will hereinafter be described, but it is possible to apply the similar method also in maximizing the viewing zone of the vertical direction. It is to be noted that a screen left end of the image display unit 2 is set to 0, and + values are set on the right as one faces.

FIG. 5 shows a specific pixel group in which the elemental images P1 to Pn are disposed opposite to or schematically opposite to the center of the viewing zone. The display unit 2 is assumed to have a dimension determined by a shown parameter. Generally as in the actual display unit, the pixels having a horizontal pixel number (the size H) are arranged at a certain sub-pixel pitch hp in an entire screen region. Here, the pixels correspond to three pixels, that is, a set of sub-pixels of red (R), green (G), and blue (B). The sub-pixel pitch hp for each sub-pixel is equal to one another, and a minimum unit for the three-dimensional image, which corresponds to two-dimensional images depending on different image obtaining directions relating to the sub-pixels, is displayed in these sub-pixels. FIG. 5 shows the specific pixel group disposed opposite to, or substantially opposite to the center of the viewing zone. Therefore, the light rays emitted from the respective pixels and directed toward the width hva of the reference distance L through the optical openings 4 of the optical barrier 3 are directed in a ranges of a symmetric projection angle θ0 with respect to an opening central axis Op passing through the center of the optical opening 4 and crossing at right angles to the image display unit 2. A set of parallax images which emit a light ray group directed toward the width hva via the certain optical opening 4 in this manner is referred to as elemental images Px. The elemental images Px is displayed on the pixel 11 for the three dimensional display to form a three-dimensional stereoscopic image.

Furthermore, a transverse width of the optical barrier 3 shown in FIG. 5 is equal to or smaller than that of the sub-pixel pitch (hp) of the display unit 2. The optical barrier 3 includes the optical openings 4 continuously extending in the vertical direction and having a vertically elongated shape as shown in FIG. 4B. These optical openings 4 are formed as slits arranged at an interval (hsp) integer times the sub-pixel pitch hp in a plate, and the interval hsp of the optical openings 4 has such a relation that the interval is equal to the width of the elemental image Px. To simplify the following description, there will be described an example in which parallax information is applied in the horizontal direction to achieve one-dimensional II system. In this one-dimensional II system, the interval hsp of the optical openings 4 is equal to the width of the elemental image Px. Thus, lines each connecting the sub-pixels to the corresponding one of the windows are arranged in parallel, light rays are not converged at the reference distance, and elemental images can be obtained from parallax images which is photographed with utilizing a parallel projection method, as described later. In this example, the basic parallax number (Nvs), that is, the number of basic sub-pixels constituting the elemental image is represented by Nvs=hsp/hp (interval of the optical opening 4/pixel width). That is, for the elemental images Px disposed opposite to or substantially opposite to the center of the viewing zone, the elemental image on the image display unit 2 is obtained based on the basic parallax number Nvs of parallax images. Moreover, a distance hs to the center of the pixel positioned in an outermost end of the elemental image Px from the opening central axis Op is represented by hs=hp(Nvs−1)/2.

In the region disposed opposite to or substantially opposite to the center of the viewing zone of the image display unit 2 in this manner, as shown in FIG. 6, the opening central axis Op passes through the center of the elemental image Px, and the pixels constituting the elemental images Px are substantially geometrically symmetrically arranged with respect to the opening central axis Op. As will be described later, the pixels 11 for the three dimensional display, which is composed of (Nvs+1) sub-pixels, are arranged in a discrete manner so that the group of pixels constituting the elemental images P1 to Pn on the display unit 2 is gradually deviated outside from the central axis Op of the corresponding opening depending on a distance from the elemental images Px disposed opposite to or substantially opposite to the center of the viewing zone along a screen. As a result, the pixels 11 are symmetrically arranged with respect to an orthogonal line passing through the center V0 of the viewing zone and crossing at right angles to the image display unit 2 so that a viewing width hva is maximized at the reference distance L.

Here, 3×hp indicates the width of the pixel constituted of three colored sub-pixels (sub-pixels of R, G, and B). An effective screen width H is calculated from multiplying the width of the pixel by the total number of pixels (the size H). Assuming that Nvs is a common denominator of the total sub-pixel number (=3×the size H) of the display unit, the slit number Ns is represented by Ns=H/hsp (screen width/interval of the optical openings 4) from the screen width. An interval (gap) g between the optical opening 4 and the display unit 2 is represented by g=hs/tan θ0. θ0 can be determined from an optional viewing zone and the width hva. The above-described relation is organized as shown in Table 1 below.

TABLE 1

| Parameter | Meaning of parameter |
|---|---|
| L | Reference distance |
| the size H | Number of horizontal pixels |
| Hp | Horizontal sub-pixel pitch, that is, pixel width [mm] of sub-pixel |
| Nvs = hsp/hp | Basic parallax image number (natural number) |
| θ0 | Projection angle of Viewing Zone |
| hs = hp(Nvs − 1)/2 | Distance between center of optical opening (slit) 4 and pixel center of elemental image end |
| hsp | Interval between optical openings (slits) 4 |
| H = 3 × hp × the size H | Screen width of display unit 2 |
| Ns = H/hsp | Number (natural number) of optical openings (slits) 4 |
| g = hs/tanθ0 | Gap [mm] |

Repeatedly to say, in the present description, the interval (hsp) between the optical openings (slits) 4 is set to be constant to form no convergent point at the reference distance L and achieve a high-speed production of the elemental image groups. Since the interval between the optical openings is an interval of a light ray group constituting the three-dimensional image, it is natural to set the slit pitch hsp to be constant and to set the resolution of the three-dimensional image to be constant. Furthermore, here, it is premised that the interval hsp between the optical openings 4 of the optical barrier 3 is an integral multiple of the sub-pixel pitch hp. In an algorithm to be described later for designing the display apparatus under this assumption, there are provided lines corresponding to the optical paths of the light rays which are substantially in parallel to each other, each of the lines being extended from the center of the sub-pixel to that of the corresponding optical opening 4. If an object is photographed along a predetermined direction to obtain image information or data, the elemental images can be easily produced from the image information and assigned to the sub-pixels with a relatively high processing. The predetermined direction corresponds to the line connecting the center of the sub-pixel to that of the corresponding optical opening 4 and the elemental image corresponds to a part of the object image, which is projected on the sub-pixel of the display unit through the corresponding opening along the predetermined direction.

A vertical parallax along the vertical direction can also be imparted to the sub-pixel in the same manner as a horizontal parallax along the horizontal direction as described herein. Therefore, here, the description of the vertical parallax is omitted for the sake of simplicity of the description.

Moreover, prior to the next description, a central position (Xp) of the pixel and a central position (Xs) of the optical opening 4 are determined by the following equations (1), (2). The pixel central position (Xp) indicates a distance between one end of the display unit 2 (Xp=0; FIG. 6) and the position of the center of the pixel. A pixel number vp is integer, and the first pixel is assigned to pixel number 0. The first pixel has a central position (Xp) corresponding to the distance, which is ½ of the pixel pitch hp. If the pixel number is number 1, the pixel central position (Xp) is (1+½)hp. Similarly, assuming that the pixel number is number vp, the pixel central position (Xp) is as follows:

$$Xp = (vp + \tfrac{1}{2}) \times hp \quad (1),$$

(vp=0, 1, 2, ..., pixel number, $0 \leq vp \leq 3 \times$ the size H−1).

Here, since the pixel number is assigned to the rightmost pixel from the leftmost pixel, as shown in Equation (1), a maximum pixel number vp is number (3×the size H−1) obtained by excluding the number 0 from the total pixel number (3×the size H).

Moreover, the positions (Xs) of the optical openings 4 are arranged at an equal interval (hsp) from one end (X0) of the display unit 2 to the opposite end. When the number vs of the optical opening 4 is number 0, the position is ½ of the slit width hsp (Xs=hsp/2). If the number of the optical opening 4 is number 1, the position (Xs) of the optical opening 4 is (1+½)×hsp. Similarly assuming that the number of the optical opening 4 is number vs, the optical opening 4 position (Xs) is as follows:

$$Xs = (vs + \tfrac{1}{2}) \times hsp$$

(vs=0, 1, 2, ..., number of the optical opening 4, $0 \leq vs \leq Ns-1$) (2)

Here, the number vs of the optical opening 4 is assigned from an optical opening 4a disposed in the vicinity of one outermost end in the optical barrier 3 to the opposite end in such a manner that the number successively increases. The number of the maximum optical opening 4 is number (Ns−1) obtained by excluding the number 0 from the total optical opening 4 number Ns.

Next, the width hva in the reference distance L will be described based on the above-described assumptions and Equations (1), (2). In general, in the II system, different from the display apparatus of the multi-view system, the light rays bearing the parallax information are not focused on one point in the reference plane 14, as described above. In the multi-view system, the light rays from the parallax information are focused on points in the visual distance L. Thus, the number of points produced corresponds to the number of the pixels for two-dimensional display, which are also provided relating to the windows. Therefore, the region upon which the light rays are incident in the viewing distance L is defined as the viewing zone, and images for three-dimensional display can be produced based on the transmission projection images obtained from the convergent points. However, the II system, the light rays bearing parallax information are not converged and dispersed on the reference plane 14. Especially, in the embodiment of the II system, in which the light rays bearing parallax information are constituted of parallel light rays as described above, the paths of the parallel light rays are determined by the sub-pixel pitch hp, slit pitch hsp, projection angle θ0, and gap g, and the parallel light rays are substantially uniformly distributed in the viewing zone. In this manner, the uniform distribution of the light rays needs to be considered in designing the display apparatus of the II system. Therefore, in the design algorithm of the display apparatus of the II system described below, the width (hva) of a viewing zone Vf in the reference distance L is set based on the pixels and the openings. The openings are so selected such that the light rays generated from each sub-pixel and passed through the selected optical opening 4 minimize Equation (3), $$hvm(Xp, Xs) = |H/2 - \{Xp + (Xs - Xp) \times (L+g)/g\}| \quad (3)$$

wherein hvm(Xp, Xs1) is an interval between a point Vm and a center point V0 on the reference plane 14.

The above Equation (3) will be described with reference to FIGS. 6 and 7. In Equation (3), in addition to the above-described assumption, it is assumed that the center V0 of the viewing zone is coincident with the center of the image display unit 2. That is, the width hva is determined in such a manner that a center line passing through the screen center of the display unit 2 and crossing at right angles to the reference plane 14 is coincident with the center V0 of the viewing zone width, and the light rays from an elemental image Px or Pc are designed so as to be incident upon the reference plane 14 having the width hva. That is, the pixel constituting the elemental image Px or Pc and the corresponding optical opening 4 for each sub-pixel have a predetermined relation so as to satisfy Equation (3), and the sub-pixel and the corresponding optical opening 4 are determined by the algorithm shown in Equation (3) so that the light rays reach the predetermined width hva.

Here, Pc denotes the elemental image corresponding to the opening whose center is coincident with an orthogonal line Op passing through the center V0 of the viewing zone and crossing at right angles to the display unit 2 and the optical barrier 3. In addition, the elemental image Pc may not be actually provided, but may be imaginary provided. This is because the center of the opening 4 may not be coincident with an intersection of the orthogonal line Opc. For example, if number Ns of openings is even, the orthogonal line Opc intersects with the optical barrier 3 in a point other than the center of the opening 4. In the description of FIG. 5, it is described that the elemental images Px are disposed "substantially" opposite to the center of the viewing zone. Furthermore, if the viewing zone is arranged so as to be largely deviated from the front of the display unit 2, the orthogonal line passing through the center V0 of the viewing zone may not directly intersect with the display unit 2, the crossing point may not be provided on the display unit 2 and be provided outside of the display unit 2. Therefore, the elemental image Pc is defined as a concept, which corresponds to the opening having a center coincident with the orthogonal line Opc passing through the center V0 of the viewing zone and crossing at right angles to the display unit 2.

Next, in FIG. 7, an interval between incident positions Vm and V0, and that between positions Vn and V0 will be described. The incident positions Vm and Vn are so defined such that a line corresponding to the path of the principal light ray and connecting the center of a certain sub-pixel px to that of the certain optical opening 4m, 4n intersects with the incident positions Vm and Vn on the reference plane 14 at the reference distance L. The incident positions V0 is also so defined such that a center axis of the viewing zone intersects with the incident position Vo on the reference plane 14 at the reference distance L. In this embodiment, the center axis of the viewing zone is coincident with the orthogonal line passing through the center of the display unit 2, which is a prerequisite herein, at the center V0 of the reference plane.

The relation of Equation (3) will be described in more detail. A distance between the center of the certain sub-pixel px and the center of the certain optical opening 4m, 4n in the horizontal direction is represented by |Xs−Xp|. Here, the distance with respect to the optical opening 4m is |Xs1−Xp| as shown in FIG. 7, and the distance with respect to the optical opening 4n is |Xp−Xs2| as shown in FIG. 7. For all of the optical openings 4, the distance between the centers of the optical opening 4 and sub-pixel px is represented by |Xs−Xp|.

Figure 7:
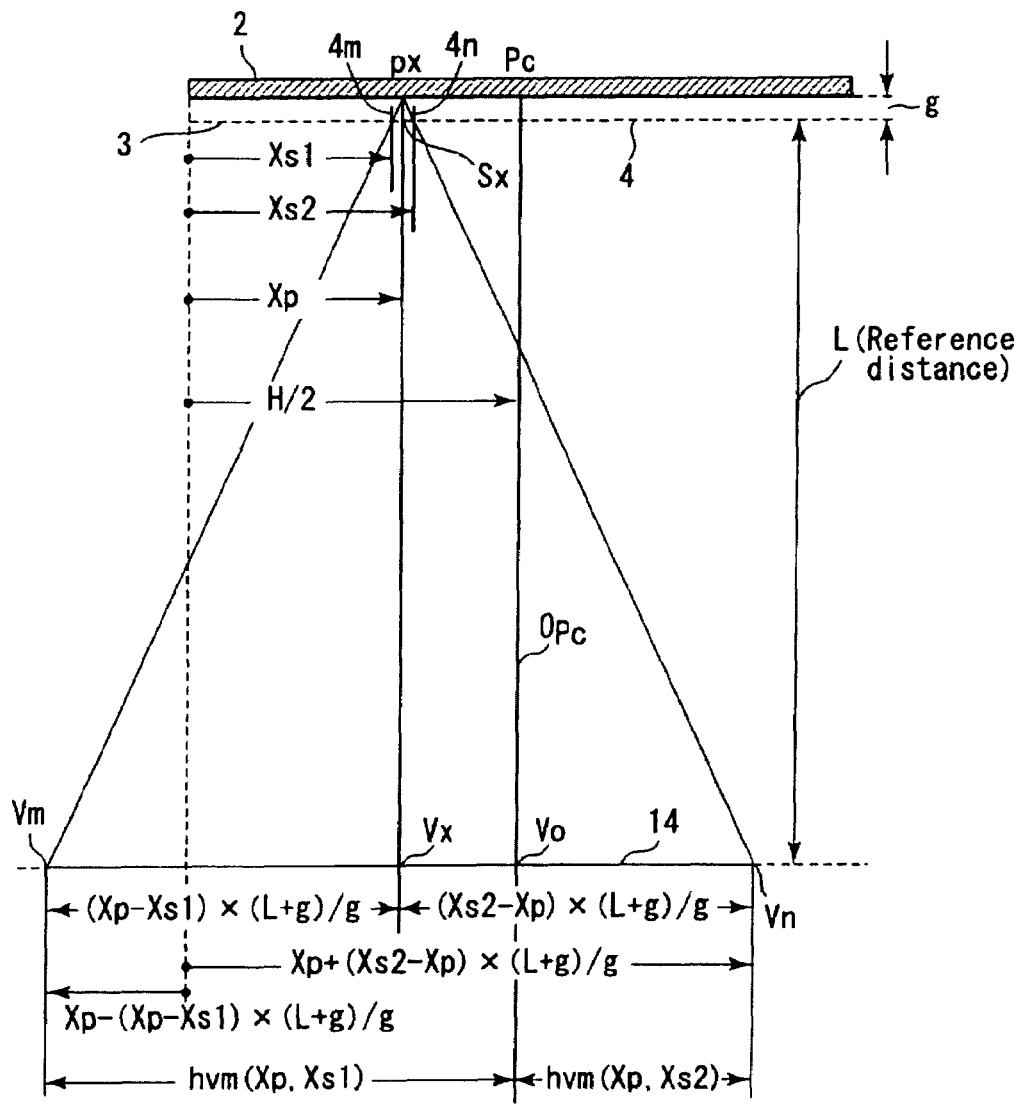
FIG. 7 is an explanatory view showing a position upon which a light ray produced from a certain pixel and passed via an optical opening is incident in a reference distance in the display apparatus shown in FIG. 1.

In FIG. 7, there is provided an intersection Sx between the optical barrier 3 and the orthogonal line passing through the center of the sub-pixel px and crossing at right angles to the optical barrier 3. There is also provided intersection Vx at which the orthogonal line crosses at right angles to the reference plane 14. The principle light rays, which emerges from the sub-pixel px and passes through the center of the optical opening 4m, are incident on incident points Vm, Vn on the reference plane 14. A triangle formed by the intersection Sx, the center of the certain sub-pixel px, and the center of the optical opening 4m, 4n is analogous to that formed by the intersection Vx, the center of the sub-pixel px, and the incidence point Vm, Vn. Therefore, as shown in FIG. 7, with respect to the optical openings 4m, 4n, the following is established:

distance between the incidence point Vm and the intersection $Vx = \{(Xp-Xs1) \times (L+g)/g\}$; and distance between the incidence point Vn and the intersection $Vx = \{(Xs2-Xp) \times (L+g)/g\}$.

Moreover, the positions of the incidence points Vm, Vn are represented by the distance from one end (X0) of the display unit 2 as follows:

position of the incidence point Vm:

$Vm = \{Xp - (Xp-Xs1) \times (L+g)/g\}$; and position of the incidence point Vn:

$Vn = \{Xp + (Xs2-Xp) \times (L+g)/g\}$.

The following equation is established:
position of the incidence point $= \{Xp + (Xs-Xp) \times (L+g)/g\}$.

Therefore, the interval hvm(Xp, Xs1) between the points Vm and V0 on the reference plane 14, and an interval hvm (Xp, Xs2) between the points Vn and V0 are represented as follows. That is, the intervals hvm(Xp, Xs1) and hvm(Xp, Xs2) correspond to the intervals between the center of the viewing zone in the reference plane 14 at the reference distance L (the intersection between the orthogonal line passing through the center of the display unit 2 and the reference plane 14, which is a prerequisite herein), and the incidence points Vm, Vn, and are represented as follows as apparent from FIG. 7:

$hvm(Xp, Xs1) = H/2 - \{Xp - (Xp-Xs1) \times (L+g)/g\}$; and $hvm(Xp, Xs2) = \{Xp + (Xs2-Xp) \times (L+g)/g\} - H/2$.

This interval hvm(Xp, Xs) is represented by Equation (3). Repeatedly to say, Equation (3) is determined on the assumption that the orthogonal line passing through the center V0 in the reference plane 14 of the viewing zone and crossing at right angles to the display unit 2 intersects with the center of the display unit 2. Also in a case other than the described case, when a horizontal coordinate of the orthogonal line passing through the center V0 in the reference plane 14 of the viewing zone and crossing at right angles to the display unit 2 is replaced with H/2 of Equation (3), a concept represented by Equation (3) can be applied.

The optical opening 4 (slit: Xs) is selected with respect to a specific sub-pixel (Xp) so that the width hvm(Xp, Xs) represented by Equation (3) is minimized. Then, the light ray from the sub-pixel (Xp) can efficiently be incident upon the viewing zone. That is, the specific optical opening (slit) 4 is determined from a plurality of optical openings (slits) 4 for each sub-pixel (Xp), and parallax information optimum with respect to the light ray including a line connecting the center (Xs) of the optical opening (slit) to the center (Xp) of the sub-pixel as a path can be assigned to the sub-pixel.

Figures 8A, 8B, 8C:
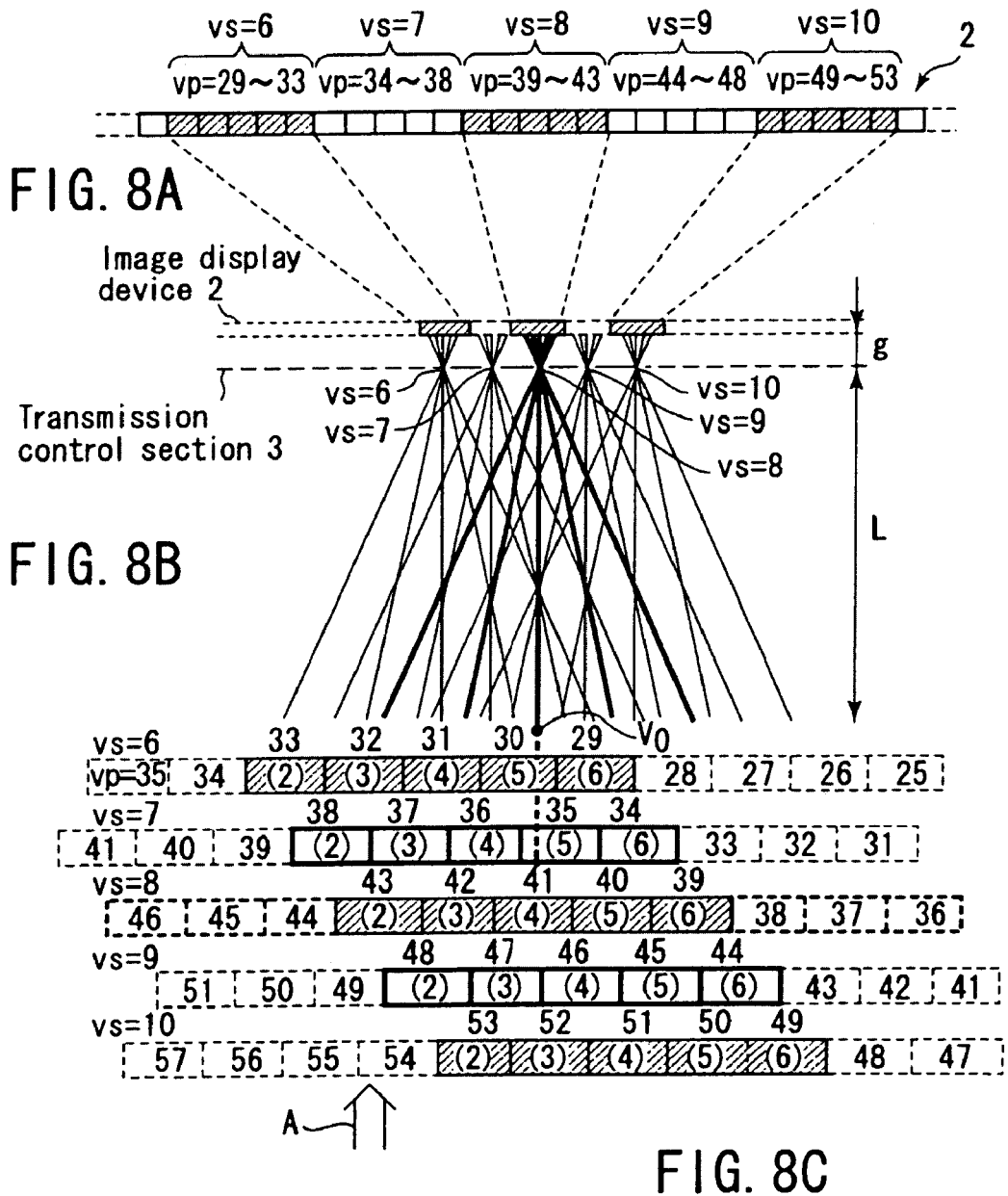
FIGS. 8A to 8C are schematic diagrams of the display apparatus according to a comparative example in which the elemental images are arranged in the display unit so that the center of a pixel group constituting each elemental image is coincident with that of an optical opening 4.
Figure 9A:
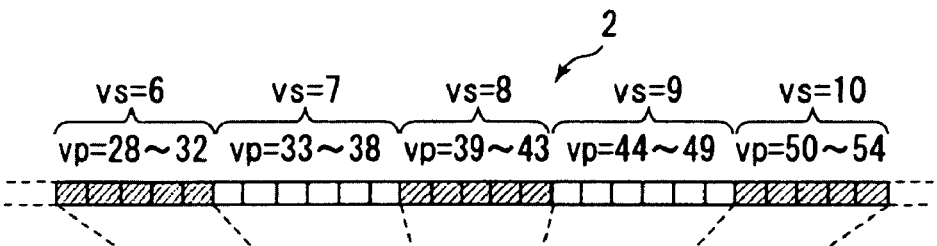
FIGS. 9A to 9C are schematic diagrams showing a method of distributing the elemental images to the display unit according to the first embodiment of the present invention.
Figure 9B:
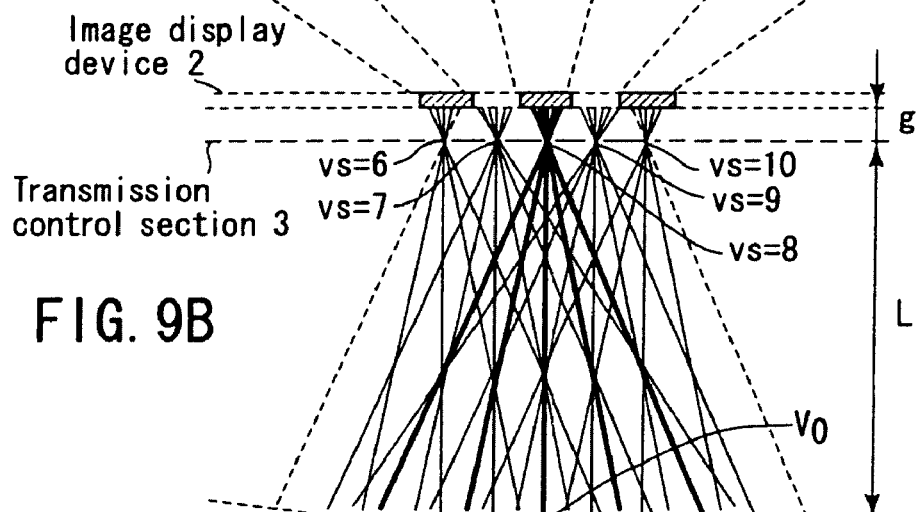
Figure 9C:
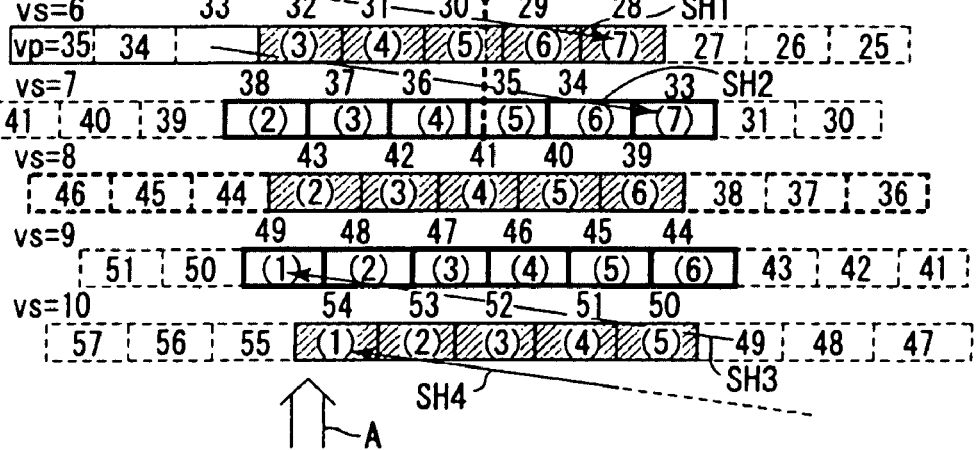

FIGS. 8A, 8B, and 8C show schematic diagrams according to a comparative example in which the parallax image is disposed in such a manner that the center of each elemental image is coincident with that of the optical opening 4, if Nvs=5. FIGS. 9A, 9B, and 9C show schematic diagrams in which the parallax image is disposed so as to minimize Equation (3). FIGS. 8B and 9B show the structure of the display apparatus and the paths of the light rays determined by the elemental image displayed in the display apparatus. FIGS. 8A and 9A show an enlarged arrangement diagram in which the two-dimensional images are distributed to the sub-pixels on the display unit 2 in accordance with the optical openings 4, wherein the two-dimensional image corresponds to an unit of the elemental image and the two-dimensional images are obtained along different directions. FIGS. 8C and 9C show positions where the parallax information shown in FIGS. 8A and 9A are projected onto the reference plane 14 of the viewing zone via the optical openings 4 so that the positions are coincident with those of FIGS. 8B and 9B. In FIGS. 8A, 8B, and 8C, and FIGS. 9A, 9B, and 9C, the optical openings 4 designated as sixth to tenth (vs=6 to 10), which are numbers (vs) of the optical openings 4 are shown. The 28th to 54th are shown as the sub-pixel numbers (vp) in FIGS. 8A and 9A and the 25th to 57th are shown as the projection positions of the sub-pixels in accordance with the sub-pixel numbers (vp), and camera numbers (1) to (7), which correspond to parallax images obtained by the parallel projection method, are shown in FIGS. 8C and 9C. The elemental image corresponding to the number of the optical opening 4 is displayed on the pixel 11 for three-dimensional display, which is composed of the sub-pixels 12 for the two-dimensional display of the image display unit 2. As the numbers indicating the elemental images on the reference plane 14, the corresponding opening numbers vs=6 to 10 are used.

As described above, in the present invention, the pitch of the optical opening 4 is determined so that a basic parallax image number hsp/hp is a natural number. Therefore, a line (path of the principal light ray) connecting each sub-pixel center to the center of the optical opening 4 has a parallel relation with the same parallax number. That is, in the comparative example shown in FIGS. 8A, 8B, and 8C, each elemental image (vs=6 to 10) is constituted of five sub-pixels in which image information obtained from five parallax images designated by the second to six camera numbers are displayed. The paths of the light rays connecting the sub-pixel center of the sub-pixel to the center of the corresponding optical opening 4 have a mutually parallel relation, wherein the two-dimensional image information obtained from the parallax image corresponding the camera number 2 is displayed on the sub-pixel. Similarly, the paths of the light rays connecting the sub-pixel centers of the sub-pixels to the centers of the corresponding optical openings 4 have a mutually parallel relation wherein the two-dimensional image information obtained from the parallax image corresponding the camera number 3 to 6 is displayed on the sub-pixels. Therefore, the light rays from the sub-pixels constituting each of the elemental images (vs=6 to 10) are diverged from the optical opening at the same spread angle. Repeatedly to say, the light rays from each sub-pixel diverge in front directions, all of the openings of the optical barrier 3 are irradiated with the light rays, and the respective openings allow the light rays to pass. However, the two-dimensional image information displayed in each sub-pixel is determined based on the principal light rays which are shown as the lines connecting the center of the sub-pixel to the center of one optical opening corresponding to the sub-pixel. The paths of the principal light rays passed through the corresponding opening satisfy the above-described relation. According to the above relation, the light rays from each adjacent elemental images via the optical opening 4 are shifted in such a manner that the incidence position is deviated by the interval hsp of the optical opening 4 in the reference plane 14 in the reference distance L. The deviation of the incidence position is shown as shades in FIG. 8C.

The elemental image produced by the pixels vp=29 to 33 passes through the opening 4 of an opening number 6 (vs=6) as shown in FIGS. 8A and 8B, and is projected on the reference plane so that a projected image (similarly specified by vp=29 to 33 in FIG. 8C) is formed. The adjacent elemental image produced by the sub-pixels vp=34 to 38 also forms an adjacent projection image (similarly specified with vp=34 to 38) as shown in FIG. 8C. The adjacent elemental image specified with vp=34 to 38 is formed on the reference plane so as to be shifted by the interval hsp of the optical opening 4 from the projection elemental image specified by vp=29 to 33. Similarly, the projection elemental image (vp=39 to 43) is also shifted by the interval hsp of the optical opening 4 from the adjacent projection elemental image specified by vp=34 to 38 in FIG. 8C on the reference plane. As a result, in the comparative example shown in FIGS. 8A to 8C, a portion including overlapped regions upon which the light rays emitted from each elemental image are incident, that is, the region in which the correct image can visually be recognized in the entire screen region is narrowed. For example, if an observer is located at a horizontal position indicated by an arrow A in the reference distance L, as shown in FIG. 8C, the light rays emitted from the correct elemental image with respect to openings Vs=6 to 8 are observed. However, with respect to the light rays passing through the openings Vs=9, 10, the light rays coming from the sub-pixels Vp=49, 54 displaying the elemental image which passes through the adjacent opening Vs=10, 11 (Vs=11; not shown) are also observed.

On the other hand, in FIGS. 9A, 9B, and 9C, the elemental image corresponding to the optical opening 4 is distributed to the sub-pixel for the three-dimensional display so as to minimize the relation of Equation (3). In other words, if the two-dimensional information is distributed to certain sub-pixels, the light rays passing through one of the openings are specified and the two-dimensional information to be bore on the light rays is determined in accordance with Equation (3). That is, if the optical opening 4 is determined with respect to a certain sub-pixel, the light rays passing through the optical opening 4 and bearing the two-dimensional image information are determined. Even if the certain sub-pixel, for example, the sub-pixel specified by the sub-pixel number 41 (vp=41) is designated, the light rays from the certain sub-pixel can not be specified because the sub-pixel radiates light rays toward various directions. Therefore, the light rays from the sub-pixel are incident upon not only the optical opening 4 having opening number 8 (vs=8) but also the optical openings 4 designated by other opening numbers (vs=6, 7, 9, 10), and the light rays from the sub-pixel designated by sub-pixel number 41 (vp=41) are radiated via these optical openings 4 (vs=6 to 10). In the example shown in FIGS. 9A, 9B, and 9C, the light rays from the sub-pixel designated by the sub-pixel number 41 (vp=41) are radiated via not only the opening having the opening number 8 (vs=8) but also the openings having opening numbers Vs=7, 9 and projected on the reference plane. The optical opening 4 is determined with respect to the sub-pixel designated by the pixel number 41 (vp=41) in accordance with the minimization requirement of Equation (3). Then, the paths of the light rays from the sub-pixel are determined, and the two-dimensional image, which is obtained from the camera image corresponding to this direction, is distributed to the pixel. The incidence position in the reference distance, to which the light rays are directed from the opening (vs=8) having the opening number 8, is closest to incident position Vo in the sub-pixel designated by the sub-pixel number 41 (vp=41). Therefore, the opening is selected, which minimizes the relation of Equation (3), and the camera image corresponding to the photographing direction is distributed to the pixel from the relation between the optical opening 4 and the sub-pixel. That is, the paths of the light rays radiated from the sub-pixel designated by the sub-pixel number 41 (vp=41) via the openings having opening numbers Vs=7, 9 are not selected to determine the width hvm of the reference plane, and the two-dimensional image is displayed in accordance with the image obtaining direction in the parallel projection method which corresponds to the camera number 4.

By the selection of the light rays which maximize the width hvm determined by Equation (3), different from the arrangement shown in FIGS. 8A, 8B, and 8C, the optical openings 4 for the sub-pixels of sub-pixel numbers (vp=28, 33, 49, 54) are changed, and the image obtaining direction (the camera number) relating to the sub-pixels is changed. In FIG. 9A, slant lines show the elemental image formed on the pixels wherein a relationship between the elemental image and the corresponding opening number is changed in comparison with the arrangement shown in FIG. 8A. The paths of the light rays emitted from each elemental image and passed through the corresponding optical opening 4 are incident upon the width hva centering on the screen center or a specific region. For example, if an observer is located at a horizontal position indicated by an arrow A in the reference distance L, as shown in FIG. 9C, it is understood that the light rays directed toward the observer in the reference plane relates to the elemental images to be displayed, which are projected from the openings having opening numbers vs=6 to 10 and are previously assigned to the sub-pixels designated by the opening numbers vs=6 to 10.

In the above description, the optical opening 4 corresponding to each sub-pixel is selected on the basis of the center of the viewing zone in the reference distance and, as a result, the width (hva) of the viewing zone in the reference distance is determined. As shown in FIG. 9C, as characteristics of the design of the II system, the light rays bearing the parallax information in the reference distance L are not incident on the same point, and are deviated little by little for each elemental image. Therefore, in this specification, if the difference of the incidence positions of the light rays is within the deviation, the incident points are described as the same incident point. For a reason that the incidence position of the light rays has the deviation, the following viewing zone is defined using an inequality. Additionally, the optical opening 4 for each sub-pixel can be selected in the following method, only when the interval hsp between the sub-pixel pitch hp and the optical opening is constant.

As shown in FIG. 6, the width hva is represented as a region obtained by adding one sub-pixel to the basic parallax pixel number Nvs by Equation (4) on the basis of the width (2L tan θ0) of the viewing zone using the basic parallax image number (Nvs) as a reference.

$$hva \leq 2L \tan \theta 0 \times (Nvs+1)/Nvs \quad (4)$$

If Equation (4) is satisfied, as shown in FIGS. 9A, 9B, and 9C, the elemental image is assigned with respect to the optical opening 4 on an outer side apart from the center of the viewing zone. As a result, the light rays can efficiently be converged on the viewing zone. As a result, the viewing zone determined by Equation (4) is enlarged as compared with that of the comparative example. If the arrangement of the elemental image is shifted toward the outside, the elemental image whose constituting sub-pixels increase by one is disposed. For example, like the sub-pixel group designated by the sub-pixel numbers (vp=44 to 49) corresponding to the optical opening 4 having the opening number (vp=9) as shown in FIGS. 9A, 9B, and 9C, the sub-pixel group (the pixel 11 for three-dimensional display) constituted of six sub-pixels increased from five basic parallax sub-pixels by one is disposed, and the elemental image is allowed to shift toward the outside.

To design the arrangement of elemental images, in a region (specific region) in the vicinity of the intersection of a normal passing through the center V0 of the viewing zone in the reference distance and the display unit 2, the elemental images constituted of basic parallax sub-pixels is repeatedly disposed while the incidence position in the reference distance shifts every pitch of the optical opening 4. If the elemental image is repeatedly disposed, the incidence position of the light rays emitted from the elemental image and passed through the opening in the reference distance do not satisfy the width hva determined by Equation (4). If this elemental image is produced, an elemental image constituted of (basic parallax image number+1) sub-pixels is again produced, the elemental image is assigned with respect to the center of the corresponding optical opening 4, and the optical opening 4 is shifted to the outside in a manner that the opening 4 is located at an inside position of the elemental image. The elemental image is repeatedly disposed in this manner to arrange the elemental images entirely over the screen. Here, the center V0 of the viewing zone is set so as to be coincident with a screen center, but actual design is not limited to the coincidence between the center V0 of the viewing zone and the screen center.

Next, a concept of parallax number will be described. This parallax number is equivalent to the number of photographing directions required in a high-speed generation of the elemental image utilizing a method of allocating a parallel projection image along one direction, as described above. The equation by which the width hva is defined will hereinafter be described on the assumption that the sub-pixel pitch hp and slit interval hsp are constant.

The pitch (hsp) of the optical opening 4 is divided by the sub-pixel width to determine a certain basic parallax image number Nvs. The number obtained by adding the number of additional parallaxes to the basic parallax image number Nvs corresponds to the parallax image number. To maximize the viewing zone, the directions of the photographing utilizing the parallel projection are increased with the increase of the additional parallax numbers and the elemental images are arranged on the sub-pixels according to the above-described method. The increase of the photographing directions will be described in detail.

Figure 10:
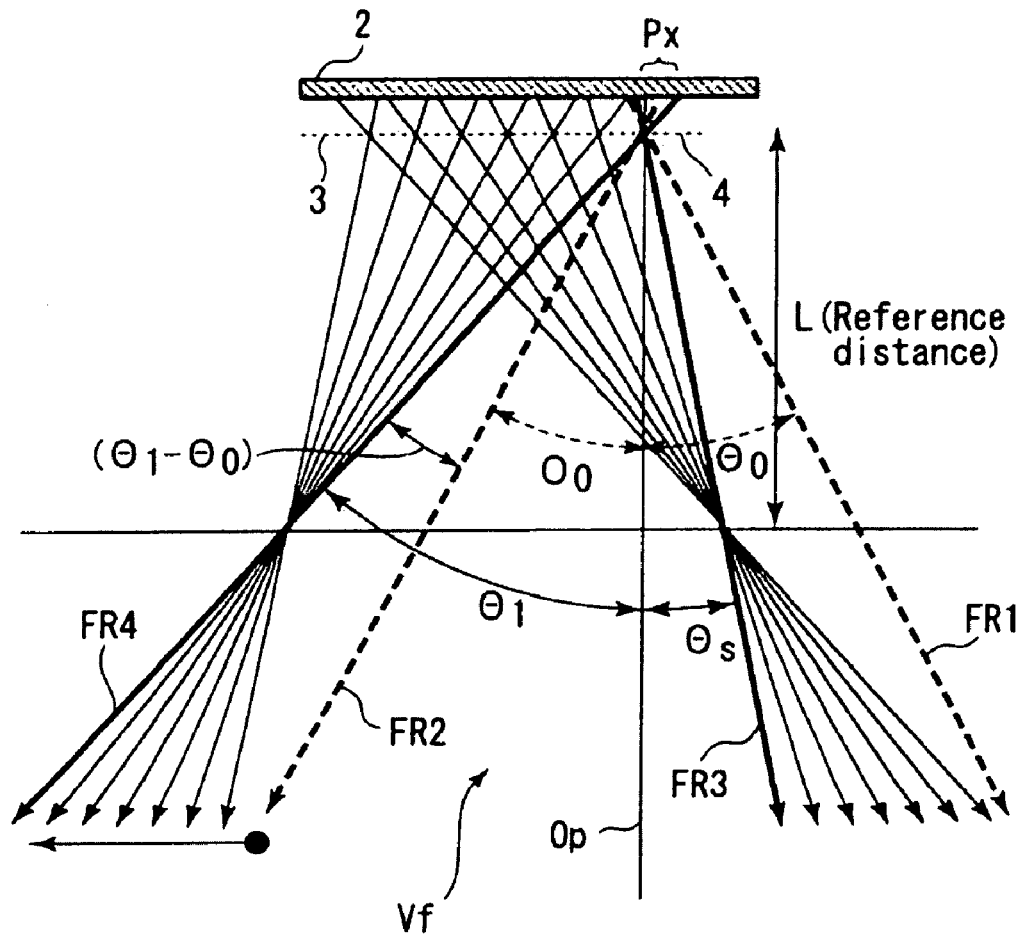
FIG. 10 is an explanatory view showing an angle of a light ray group produced from an assumption of the elemental image displayed in a region distant from the center or the viewing zone under a certain condition in the display apparatus shown in FIG. 1.

The algorithm proposed in the present invention requires information of an image photographed at a shallow photographing angle having a larger incidence angle θ1 of the principle light ray as described later and as shown in FIG. 10 to obtain an additional parallax, that is, an additional photographing direction. To simplify the description, as shown in FIG. 10, the center of the viewing zone is coincident with the center of the display unit in the same manner as in the assumption in FIGS. 2 and 6.

The light rays from the elemental image Pc, which is located so as to be opposed to the center of the viewing zone, are projected through the opening 4 to symmetrical regions defined by the same projection angle θ0 with respect to the central line Op as shown in FIG. 6. In FIG. 10, symmetrical regions are also shown for comparison in a same manner as that in FIG. 6. In FIG. 10, the symmetrical regions are defined between principal light rays Op and FR1 and between principal light rays Op and FR2 having the same projection angle θ0 with respect to the central line Op, which passes through the elemental image Px apart from the center of the display unit 2.

In the first embodiment, as shown in FIG. 10, the light rays from the elemental image Px apart from the center of the display unit 2 are projected through the opening 4 to a first region between the principal light rays Op and FR3 and a second region between the principal light rays Op and FR4. The first region has a projection angle θs smaller than the angle θ0 and the second region has a projection angle θ1 larger than the angle θ0. Therefore, the camera positions for obtaining the two-dimensional image relating to the light rays directed to an additional range (θ1−θ0) between the angles θ1 and θ0 needs to be newly added to data between the angles ±θ0. This means that it is necessary to add the photography utilizing the parallel projection in accordance with the paths of the light rays in the additional region (θ01−θ0).

As apparent from FIG. 10, the parallax image information corresponding to the light rays projected to the second region between the light rays FR1 and FR3 becomes unnecessary depending on the distance from the center of the display unit 2 and it is necessary to add the parallax image information corresponding to the light rays projected in the region between the light rays FR2 and FR4. This means that the central position of the elemental images Px needs to shift toward the outside depending on a distance between the central position of the corresponding optical opening 4 and the center of the viewing zone. If the parallax image information is properly selected as described above, the correct image can be observed with respect to an entire surface of the display unit in the width hva.

In the present embodiment, it is assumed that the sub-pixel interval hp and the slit interval hsp are constant. In this embodiment, an additional elemental image Px' forming the parallax image is repeatedly added and is located on the display unit in a discrete manner depending on the distance from the center of the viewing zone. That is, if the elemental image Px corresponds to the basic parallax image number Nvs of the parallax images and the additional elemental image Px' is added, the parallax number (Nvs+1) is obtained by adding 1 to the basic parallax image number Nvs and the additional elemental image Px' is additionally located so as to follow the elemental image Px. A total parallax number (Nall), which includes the parallax number in the region of FR2 to FR4 and the parallax number in a region symmetrical to the region of FR2 to FR4, will be used and described as follows.

Figure 11:
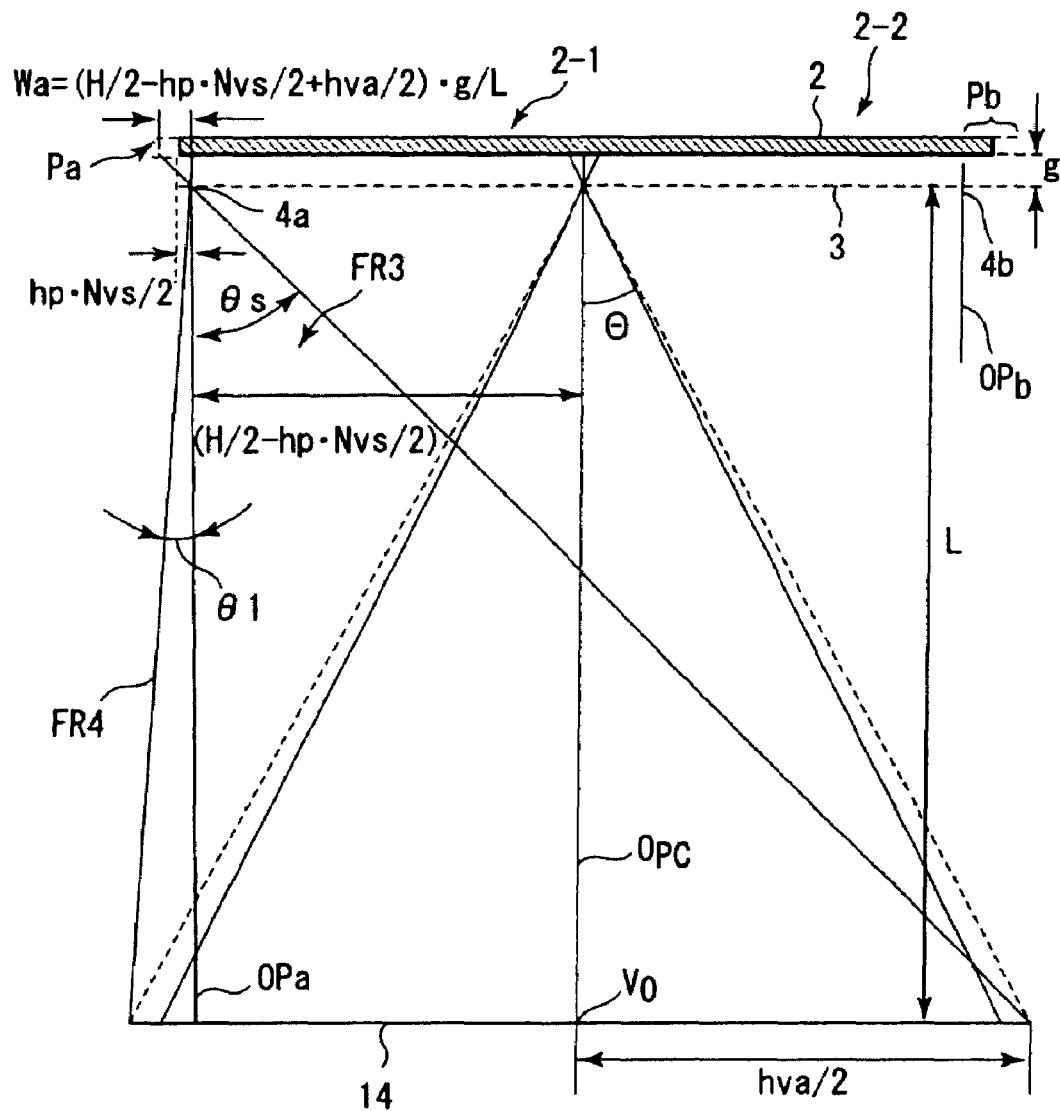
FIG. 11 is a schematic diagram showing an angle of a light ray incident upon an end of the viewing zone under the certain condition in the display apparatus shown in FIG. 1.

A method of calculating the total parallax image number (Nall: real number) will be described with reference to FIG. 11.

When one region 2-1 of the display unit 2 divided by the central line Op is noticed, the width of the region corresponds to ½ screen width (H/2). Here, when an outermost-end elemental image Pa is considered, the elemental image Pa is projected to the viewing zone having the width hva, through the outermost-end optical opening 4a corresponding to the elemental image Pa. In the present embodiment, since the number of the optical openings 4 is set to Ns=H/hsp, which is an integer. Therefore, when the outer end of the display unit 2 is regarded as a reference, the outermost-end optical opening 4a is positioned apart from the outer end by the ½ opening (slit) interval hsp. That is, a central line Opa passing through the outermost-end optical opening 4a is distant from the outer end of the display unit 2 by the ½ opening (slit) interval hsp. This ½ opening (slit) interval hsp is represented by hp×Nsv/2 as apparent from Table 1. Moreover, the central line Opa of the outermost-end optical opening 4a is distant from a central line Opc of the display unit 2 by a distance (H/2−hp×Nvs/2). The width hva of the viewing zone in the reference plane 14 of the reference distance L is represented by hva as defined by Table 1 and Equation (4). Since the distance to the other end (not shown) of the width hva from the central line Opc of the display unit 2 is hva/2, the distance to the central line Opa of the optical opening 4a on the outermost end from the other end of the reference plane 14 having the width hva is represented by (H/2−hp×Nvs/2+hva/2). A triangle including the central line Opa and including the elemental image Pa as a bottom side and having a height g is analogous to a triangle including the central line Opa and including the distance (H/2−hp×Nvs/2+hva/2) as the bottom line and having a height L. Therefore, a distance Wa between the intersection of a straight line connecting the other end of the width hva to the opening 4a with the display device of the display unit 2, and the central line Opa of the opening 4a is represented by (H/2−hp×Nvs/2+hva/2)×g/L.

Figure 12:
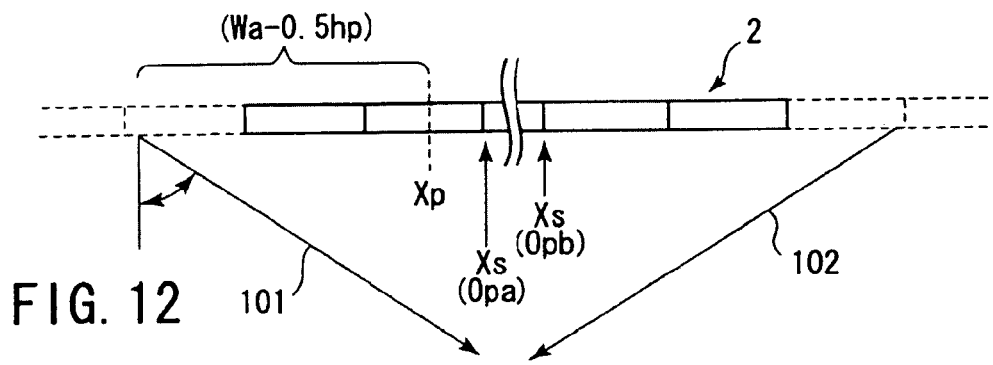
FIG. 12 is an explanatory view for obtaining the total number of parallax images corresponding to the image data shown in the pixel in a case where a basic parallax number is even in the display apparatus shown in FIG. 1.

Next, the number of parallax images arranged in this distance Wa (not shown) and required for the two-dimensional images obtained from the different directions will be studied. FIG. 12 is an explanatory view for obtaining the number of sub-pixels in a case where a basic parallax number is even. In FIG. 12, the left side corresponds to the region of the left end of the display unit 2, and the right side corresponds to the region of the right end of the display unit 2. The position Xs of the optical opening (slit) corresponds to the center of the optical opening (slits) 4a or 4b disposed on the left or right end, that is, the axis OPa or OPb shown in FIG. 11. Arrows 101, 102 indicate lines connecting the optical openings (slits) 4a, 4b to the other end of the width hva. As shown in FIG. 12, when the basic parallax number is even, the position Xs of the optical opening 4 is coincident with a boundary region of the sub-pixel. In consideration of this, a width (Wa−0.5hp) to the incidence position shown by the arrow 101 from the center of the sub-pixel disposed adjacent to the outside of the optical opening 4a is obtained. Next, this width (Wa−0.5hp) is divided by the sub-pixel width hp, 1 is added to an integer value obtained by rounding-down, and the value is doubled in consideration of the other region 2-2 of the display unit 2. Accordingly, the parallax number (=Nall) of the images incident upon the inside of the width hva is obtained in consideration of a maximum projection angle. In FIG. 12, the arrows 101, 102 indicates the lines connecting the optical openings 4a, 4b to the other end of the width hva. The light rays emerged from the sub-pixel or sub-pixels outside the intersection between the lines 101,102 and the display unit and passing through the optical openings 4a, 4b are directed outside of the width hva and are not incident upon the width hva in the viewing zone. That is, a virtual sub-pixel is arranged outside of the display unit 2 and a position of the virtual sub-pixel is determined based on the extrapolation of the pixel pitch hp. Thus, the light rays emerged from the parallax image displayed on the virtual sub-pixel are not incident on the width hva through the optical openings 4a, 4b. Therefore, when the total parallax image number is calculated, the value obtained by dividing the width (Wa−0.5hp) by the sub-pixel width hp is rounded down to obtain the integer value. Accordingly, the parallax number can be calculated in a range incident upon the width hva. That is, the following results:

$$Nall(\text{even number})=\{(Wa-0.5hp)/hp+1\}\times 2 \quad (5)$$

Figure 13:
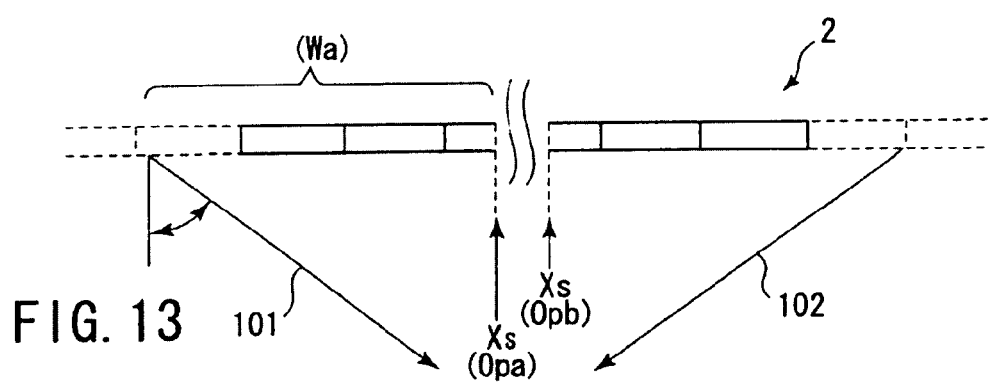
FIG. 13 is an explanatory view for obtaining the total number of parallax images corresponding to the image data shown in the pixel in a case where the basic parallax number is odd in the display apparatus shown in FIG. 1.

FIG. 13 is an explanatory view for obtaining the number of parallax images in a case where the basic parallax number is odd. In FIG. 13, the left side corresponds to the region of the left end of the display unit 2, and the right side corresponds to the region of the right end of the display unit 2 in the same manner as in FIG. 12. The position Xs of the optical opening (slit) also corresponds to the center of the optical opening (slits) 4a or 4b disposed on the left or right end, that is, the axis Opa or OPb shown in FIG. 12. The arrows 101, 102 indicate the lines connecting the optical openings (slits) 4a, 4b to the other end of the width hva. As shown in FIG. 12, when the basic parallax number is odd, the position Xs of the optical opening (slit) 4 is coincident with the pixel center Xp. That is, the width Wa is divided by the sub-pixel width hp. The value (Wa/hp+1) obtained by adding 1 in order to obtain the number of the photographing directions which is utilized for obtaining parallax information within this range is rounded down to obtain the integer value, and this value (Wa/hp+1) is doubled in consideration of the other region 2-2 of the display unit 2. Here, the light rays parallel to a normal to the display unit 2 are identical in the regions 2-1 and 2-2. Therefore, Nall is obtained in this parallax direction, that is, by excluding 1.

$$Nall(\text{odd number}) = (Wa/hp+1) \times 2 - 1 \quad (6).$$

A reason why (Wa/hp+1) is rounded down to obtain the integer value is similar to that described with respect to the even number.

Equations (5) and (6) are identical (not shown), and are represented by the following general equation (7).

$$\begin{aligned} Nall &= 2Wa/hp + 1 \quad (7) \\ &= 2(H/2 - hp \times Nvs/2 + hva/2) \times g/L)/hp + 1 \\ &= (H - hp \times Nvs + hva) \times g/L/hp + 1 \\ &= (H - hp \times Nvs + (2L\tan\theta 0(Nvs+1)/Nvs) \times g/L/hp + 1 \end{aligned}$$

The total parallax number (Nall: real number) of Equation (7) indicates the number of parallax images sufficient for adding the light ray group emitted to the region of FR2 to FR4 having the projection angle θ1 on the opposite ends of the display unit 2 shown in FIG. 10, and the projection angle θ1 corresponds to the maximum value of the projection angle θ. Therefore, it is meant that there may be the total parallax number of parallax images in order to distribute the elemental images to all the sub-pixels on the display unit 2.

It is to be noted that repeatedly to say, in FIG. 12, in the elemental images Pa, Pb or a plurality of elemental images disposed adjacent to the images, the sub-pixels do not have to be prepared for all of the elemental images constituting the elemental images Pa, Pb. More specifically, the viewing zone in the reference plane in the reference distance is narrow with respect to the area of the display unit, or the center of the viewing zone is not coincident with the screen center. When the viewing zone in the reference plane 14 in the reference distance L is large and limited inside with respect to the display plane of the display unit 2, and when the elemental image is disposed in such a manner that the light rays bearing the elemental image are incident upon the inside of the viewing zone, there is a possibility that the corresponding opening 4 is largely distant from the position of the elemental image. In this case, the elemental image corresponding to the opening positioned in the region outside the display unit is disposed outside the display unit, and the sub-pixels are not prepared.

Next, a procedure for obtaining the parallax number relating to the two-dimensional image information to be assigned to each pixel (corresponding to the number attached every photography angle of a camera for the photography by the parallel projection) will be described with reference to FIGS. 14 to 16. In the following description, it is assumed that the corresponding parallax image numbers and the optical opening numbers 4 are assigned in order from one end to the other end of the display unit 2. Similarly, the corresponding parallax numbers are also assigned in accordance with the sub-pixels, and the parallax image numbers are obtained from a position with respect to the optical opening 4 corresponding to the sub-pixel in which the two-dimensional image information relating to the parallax image is disposed.

Figure 14:
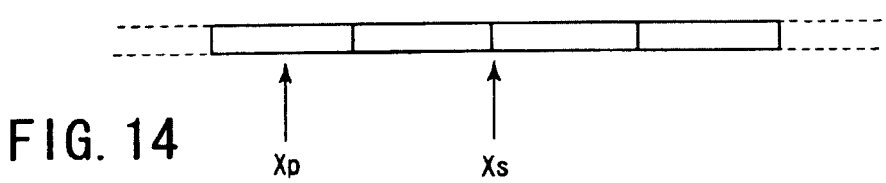
FIG. 14 is an explanatory view for obtaining the number of the parallax image (the camera number), which relates to respective two-dimensional image information and is disposed from a positional relation between the optical opening and the pixel in a case where the basic parallax number is even in the display apparatus shown in FIG. 1.

When the basic parallax image number (Nvs) is even, the optical opening 4 is disposed opposite to the sub-pixel boundary position as shown in FIG. 14, and the central line Op passes through the boundary of the adjacent sub-pixel. When the sub-pixel central position (Xp) and the sub-central position (Xs) of the optical opening 4 are determined, the parallax image number (N(Xp, Xs): integer) corresponding to the pixel and optical opening 4 is represented as follows from the total parallax number (Nall) and the sub-pixel width hp.

$$N(Xp, Xs) = (Nall/2 - 1) - \{(Xs - \tfrac{1}{2}hp) - Xp\}/hp \quad (8),$$

where {Xs−Xp} is a distance between the center of the certain pixel and the central line of the optical opening 4 corresponding the center of the certain sub-pixel. It is assumed that the center of the opening passes through the boundary between the sub-pixels. Therefore, a half sub-pixel width (½hp) is subtracted from the central position (Xs) of the optical opening 4 (Xs−½hp) to obtain the distance between the center of the sub-pixel disposed adjacent to the central position of the optical opening 4 and the center of the targeted sub-pixel. Moreover, (Nall/2−1) is a parallax image number obtained by dividing the maximum parallax image number Nall by 2 and subtracting 1 and displayed in the sub-pixel disposed adjacent to the optical opening 4. The number of the sub-pixels arranged at the sub-pixel pitch hp in the distance obtained from {(Xs−½hp)−Xp} is subtracted from the parallax number, and accordingly the parallax image number of the two-dimensional image information arranged in the sub-pixel positioned in the point Xp apart from point Xs is determined.

Figure 15:
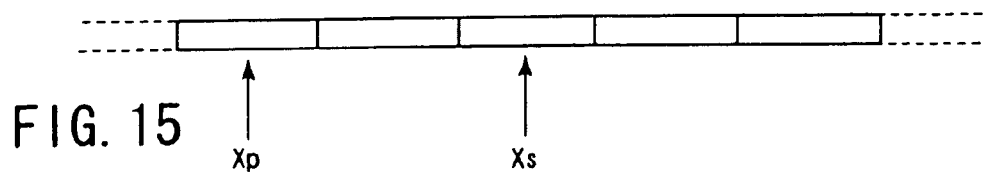
FIG. 15 is an explanatory view for obtaining the number of the parallax image (the camera number), which relates to respective two-dimensional image information and is disposed from an arrangement relation between the optical opening and the pixel in a case where the basic parallax number is odd in the display apparatus shown in FIG. 1.

On the other hand, when the parallax image number (Nvs) is even, as shown in FIG. 15, the optical opening 4 is positioned opposite to the sub-pixel center, and the central line Op passes through the center of the sub-pixel. In this case, the parallax number (N: integer) depending on the sub-pixel central position (Xp) and the central position (Xs) of the optical opening 4 is represented as follows from the total parallax number (Nall) and the pixel width hp in the same manner as in the even number.

$$N(Xp, Xs) = (Nall/2 - 0.5) - (Xs - Xp)/hp \quad (9)$$

In Equation (9), since the total parallax number (Nall) is odd, for the number of the two-dimension image displayed on the sub-pixel disposed opposite to the optical opening 4, value ½(=0.5) is added to (Nall/2), In other words, the maximum parallax number is changed to the integer by (Nall/2−0.5). The distance between the center of the sub-pixel disposed opposite to the central position of the optical opening 4 and the center of the targeted sub-pixel is obtained by (Xs−Xp), and the distance is divided by the sub-pixel width to obtain the number of parallax images arranged in this distance. When the number of parallax images arranged at the sub-pixel pitch hp in the distance obtained from (Xs−Xp) is subtracted from the parallax number of the sub-pixel disposed opposite to the optical opening 4, the number of the two-dimensional image information arranged in the sub-pixel positioned in Xp distant from Xs is determined.

Equations (8) and (9) are equal to the following equation (10).

$$N(Xp, Xs) = Nall/2 - (Xs-Xp)/hp - 0.5 \quad (10)$$

Repeatedly to say, as described with reference to FIGS. 10 and 11, the total parallax number (Nall) corresponds to the total number of photographing directions of the camera for the photography by the parallel projection in the angle ±θ1, and each parallax number N(Xp, Xs) corresponds to the number of photographing directions.

A method of arranging the elemental images in the respective sub-pixels so as to minimize Equation (3) has been described above. Next, the algorithm for arranging the parallax images on the basis of the width hva will be described. The algorithm is established when the sub-pixel interval hp and the slit interval hsp are constant different from Equation (3) and in the same manner as in the width hva defined in Equation (4) and the assumption of the total parallax number (7). It is judged whether or not the parallax images are arranged in the sub-pixel whose central position is Xp on the assumption of the path of the light ray passing through the opening whose central position is Xs, based on whether or not the path of the light ray from the two-dimensional image information connecting the sub-pixel position Xp to the optical opening position Xs is incident upon the inside of the width hva determined by Equation (4). FIG. 16 shows a method of arranging the parallax images based on the present algorithm. In FIG. 16, the incidence position (|Xp−Xs|×L/g) of the light ray in the plane of the reference distance L is obtained from an interval (Xp−Xs) between the center of the optical opening 4 and the sub-pixel center in which the elemental images are to be arranged, and the path of the light ray from the parallax image. It is judged from Equation (11) described below whether or not the incidence position is included in the reference plane 14 of the width hva.

$$|Xp-Xs| \times L/g < hva/2 - (H/2 - Xs) \quad (11),$$

where |Xp−Xs|×L/g is the distance between an central axis Opx of the optical opening 4 in the reference distance L and the incidence position of the light ray, hva/2 corresponds to ½ of the width of the viewing zone in the reference viewing zone plane 14 determined by Equation (4), and hva/2−(H/2−Xs) is a distance to the reference viewing zone plane 14 end from the central axis Opx of the optical opening 4. Therefore, Equation (11) is a criterion by which it is judged from the path of the light ray emitted from the sub-pixel (Xs) and passed via the optical opening (Xp) whether or not the light ray is incident upon the inside of the width hva.

Figure 16:
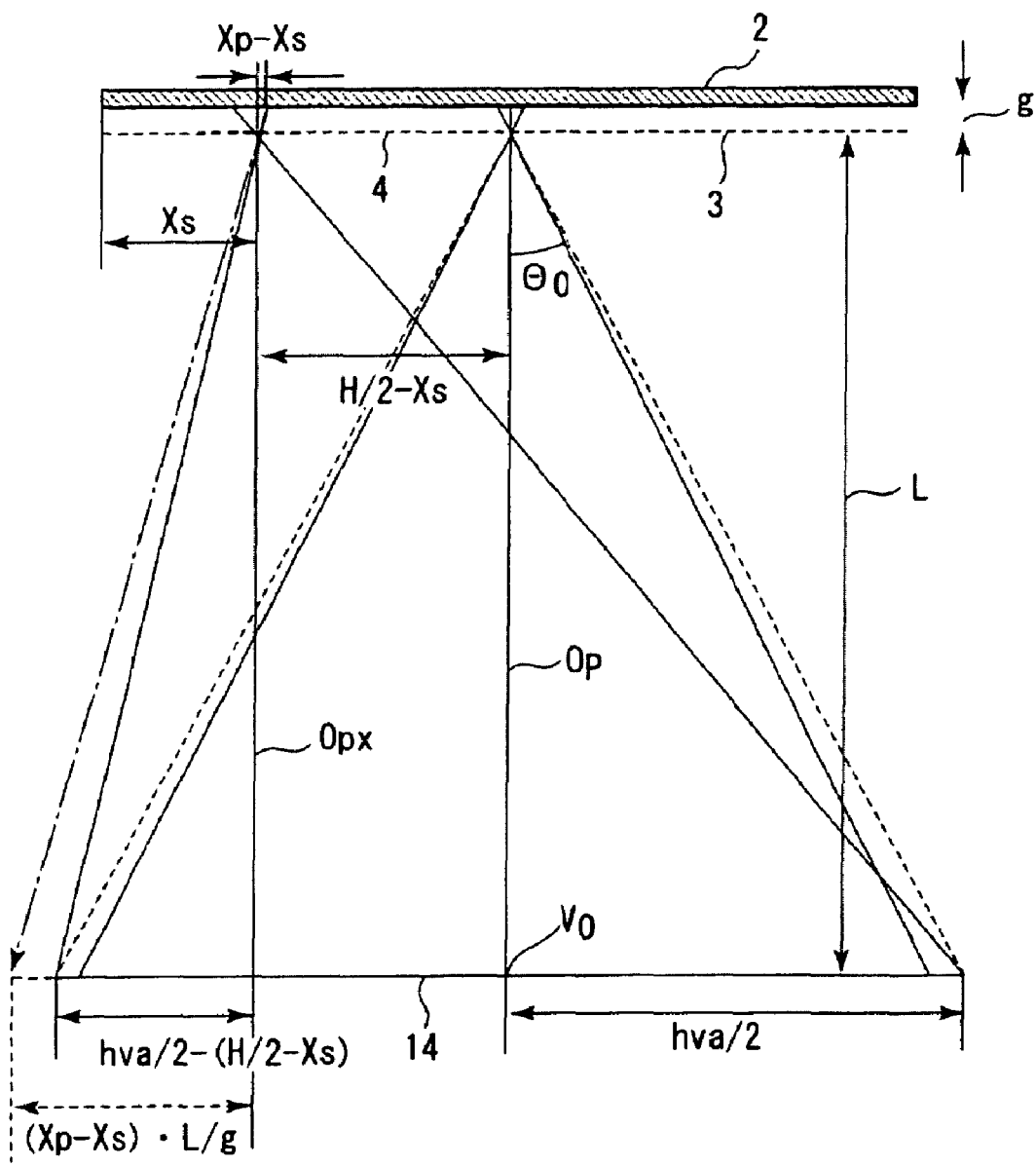
FIG. 16 is an explanatory view showing a standard for judging whether or not the light ray generated from the pixel and passed through the optical opening may be incident upon a range of viewing zone under a certain condition in the display apparatus shown in FIG. 1.

In FIG. 16, only one end of the width hva is used as the judgment criterion for determining the path of the light ray. In fact, it is also possible to arrange the elemental images in the entire region of the display unit only on the basis of the judgment reference on one side. More specifically, the judgment of (11) is started in an order from the sub-pixel on the leftmost side of the screen and the leftmost opening. When the condition of Equation (11) is satisfied, the two-dimensional image information obtained from the parallax image corresponding to the path of the light ray passed via the optical opening (Xp) is assigned to the sub-pixel. When the Equation (11) is not satisfied, the number of optical openings 4 is increased by one. That is, when the optical opening is shifted by one on the right side, the elemental image can be disposed so that the incidence position of the light ray in the reference distance is in the width hva. That is, when the light ray from the certain sub-pixel is not directed into the width hva via the optical opening 4, the opening is changed to the adjacent optical opening 4, and the changed optical opening 4 is verified using Equation (11).

Figure 17:
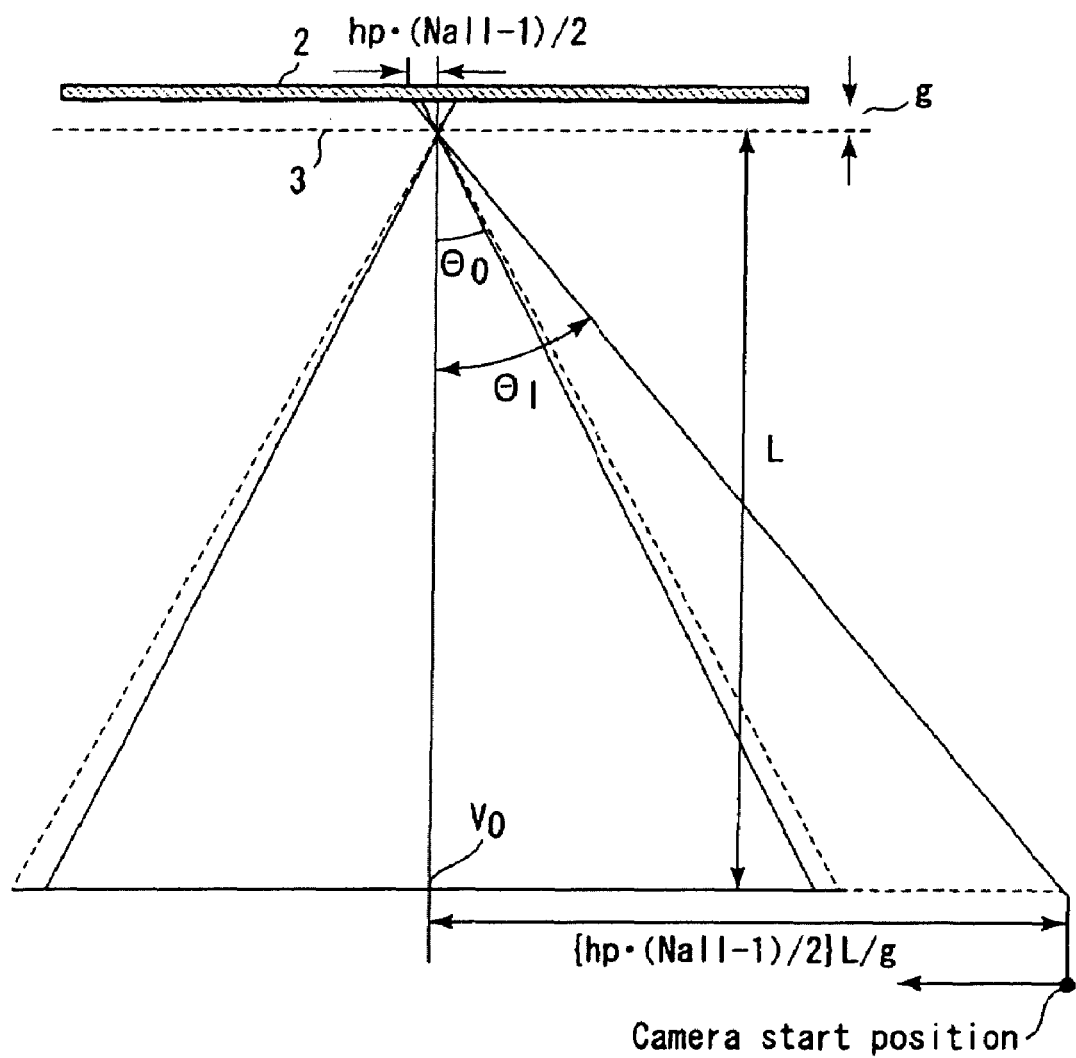
FIG. 17 is an explanatory view showing a recording direction for obtaining the elemental image to be displayed on the display unit in the display apparatus shown in FIG. 1.

Furthermore, a procedure for moving a camera position (Xc) in order to obtain the two dimensional image information displayed in the pixel will be described with reference to FIG. 17. A camera position having the maximum projection angle θ1 is obtained from the total parallax number Nall obtained by Equation (7) by the following equation (12) (Xc_start). The camera is intermittently moved from this position at a photographing interval, which is proportional to the sub-pixel pitch. While the camera position (Xc) is changed, the photographing is performed by the parallel projection to acquire the necessary parallax image. In equation (12), (Nall−1) is based on a positional relationship between the position on which the parallax image is obtained and the center of the sub-pixel.

$$Xc\_start = H/2 + hp(Nall-1)/2 \times L/g \quad (12)$$

$$Xc = Xc\_start - vi \times hp \times L/g \quad (13)$$

(vi=0, 1, 2, . . . ; parallax number, 0<vi<Nall−1)

Two algorithms for arranging the elemental images in the display unit have been described. First, a procedure for arranging the elemental images by the algorithm of Equation (3) will be described with reference to FIG. 18.

First, the values of various parameters shown in Table 1 are determined, and the reference distance L, and the center V0 of the viewing zone in the reference viewing zone plane 14 are obtained as shown in step S1. In step S2, the viewing zone (hva) is obtained from Equation (4), and the total parallax number (Nall) is obtained from Equation (7). Next, as shown in step S3, the sub-pixel of one end of the display unit 2 and the position (Xp, Xs) of the optical opening 4 are obtained from Equations (1) and (2) to start a series of steps for determining the elemental images to be arranged in the sub-pixel.

In step S4, the interval between the incidence position, in the reference distance L, of the light ray emitted from the sub-pixel and passed through the optical opening 4, and the center V0 of the viewing zone is calculated in order from the optical opening on one end of the screen using Equation (3). When the incidence position is not closest to the center V0 of the viewing zone (NO), the optical opening 4 is assumed not to correspond to the sub-pixel having the number. As shown in step S5, the opening number is increased, and another optical opening 4 disposed adjacent to the optical opening 4 is designated. It is verified whether or not the incidence position in the distance L of the light ray is similarly closest to the position, which should be the center of the viewing zone with respect to the newly designated optical opening 4, and this is repeated until the closest positional relation is obtained.

That is, step S5 is repeated until there is found a relation having a smallest interval between the incidence position in the reference distance L of the group of all light rays emitted from the sub-pixel via all of the optical openings, and the center V0 of the viewing zone, and the optical opening corresponding to the sub-pixel is determined. Additionally, as shown in step S6, the number of the parallax image relating to the two-dimensional image information is determined using Equation (10) and the images are allocated to the sub-pixel. The parallax images for use in the step S6 are acquired by disposing the camera in the photographing position determined by Equations (12), (13) and by performing the photography by the parallel projection.

Next, as shown in step S7, the sub-pixel number is increased by one to update the sub-pixel number. As shown in step S8, when the updated sub-pixel number vp is within the sub-pixel number ($0 \leq vp \leq 3 \times$ the size H−1), the steps S4, S5, S6, S8 are carried out again with respect to the sub-pixels determined by the updated sub-pixel number. When the sub-pixel number vp exceeds (sub-pixel number−1) in step S8, it is assumed that the arrangement of the elemental images into the sub-pixel is completed, thereby ending the step as shown in step S9.

Next, a procedure for arranging the elemental images on the basis of the viewing zone in the reference distance will be described with reference to FIG. 19.

First, the values of various parameters shown in Table 1 are determined, and the reference distance is obtained in step S11. In step S12, the viewing zone (hva) is obtained from Equation (4), and the total parallax number (Nall) is obtained from Equation (7). Next, as shown in step S13, the sub-pixel of one end of the display unit 2 and the position (Xp, Xs) of the optical opening 4 are obtained from Equations (1) and (2) to start the series of steps for determining the elemental images to be arranged in the sub-pixel.

In step S14, it is judged using Equation (11) whether or not the light ray emitted from the sub-pixel having the designated sub-pixel number and passed through optical opening 4 having the designated opening number is directed into the width hva in the reference distance L. When the light ray passed through the designated optical opening 4 is directed into the width hva, a correspondence relationship between the sub-pixel having the designated number and the optical opening 4 having the designated number is established. As shown in step S16, the number of the parallax images relating to the two-dimensional image information is determined using Equation (10), and the images are allocated to the sub-pixel. When the light ray from the sub-pixel having the number is directed to the outside of the width hva (NO), it is assumed that the optical opening 4 checked in step S14 does not correspond to the sub-pixel having the designated sub-pixel number. As shown in step S15, the opening number is increased, and another optical opening 4 disposed opposite to the optical opening 4 is designated. It is similarly verified whether or not the path of the light ray enters the width hva with respect to the optical opening 4 relating to the newly designated opening number. When the light ray passed through the optical opening having the newly designated opening number is incident upon the width hva, the correspondence between the designated sub-pixel number and the sub-pixel is established. As shown in step S16, the number of the parallax images relating to the two-dimensional image information is determined using Equation (10), and the images are allocated to the sub-pixel. The parallax images for use in the step S16 are acquired by disposing the camera in the photographing position determined by Equations (12), (13) and by performing the photography by the parallel projection.

Next, as shown in step S17, the sub-pixel number is increased by one to update the sub-pixel number. As shown in step S18, when the updated sub-pixel number vp is within the sub-pixel number ($0 \leq vp \leq 3 \times$ the size H−1), the steps S14, S15, S16, S17 are carried out again with respect to the sub-pixels determined by the updated sub-pixel number. When the sub-pixel number vp exceeds (sub-pixel number−1) in step S18, it is assumed that the arrangement of the elemental images into the sub-pixel is completed, thereby ending the step as shown in step S19.

Next, the arrangement of the elemental images in two methods described above will hereinafter briefly be described with reference to FIGS. 9A to 9C again. In FIGS. 9A to 9C, the reference parallax number Nvs is set to Nvs=5 for the sake of simplicity of the description. The elemental image disposed opposite to the center of the viewing zone in the reference distance L is disposed for the optical opening 4 corresponding to Vs=8. The corresponding optical opening 4 is changed on the basis of the distance between the incidence position of the light ray bearing the parallax image information in the reference distance L and the center V0 of the viewing zone, or on the basis of the width hva. For the sub-pixel number which specifies the paths of the light rays and the parallax image information to be displayed, the change of the optical opening 4 is shown by arrows SH1 to SH4 and the change of the parallax information to be displayed is shown by hatched lines and blank. As a result, in FIGS. 9A to 9C, the path of the light ray whose distance from the viewing zone center is shortest (Equation (3)) or which is incident upon the inside of the width hva (Equation (11)) is selected. Apart from the elemental image disposed opposite to the center of the viewing zone, the center of the elemental image is shifted to the outside with respect to the center of the corresponding optical opening 4. Thus, the camera numbers relating to the image obtaining positions for generating all the elemental images are increased as the numbers 1 to 7 in comparison with that shown in FIG. 8C.

FIGS. 9A to 9C show the results with respect to the reference distance L. The arrangement of the elemental images is appropriately changed in accordance with the size of L. Concretely, with the decrease of L while the projection angle θ0 or the gap g between the display unit 2 and the transmission control sections 3 is kept to be constant, the width hva in the reference distance L determined by Equation (4) is narrowed. Therefore, the elemental images are arranged so as to further increase a shift amount of the center of the elemental image with respect to the center of the optical opening 4 depending on the distance from the center of the viewing zone. Moreover, the total parallax number required for the elemental image increases. On the other hand, when L increases, the above-described shift amount decreases. That is, a generation frequency of the elemental images composed of the (N+1) pixels is lowered and the total parallax number required for generating elemental image is decreased. From the above-described relation, when the viewing zone is insufficient as compared with the area of the display unit, it is effective to increase the reference distance L and to enlarge the viewing zone. However, the viewing zone is restricted at a relatively short distance. If the sufficient viewing zone is required at the short distance, the reference distance L should be decrease and viewing region at a large distance may be vanished.

Figure 18:
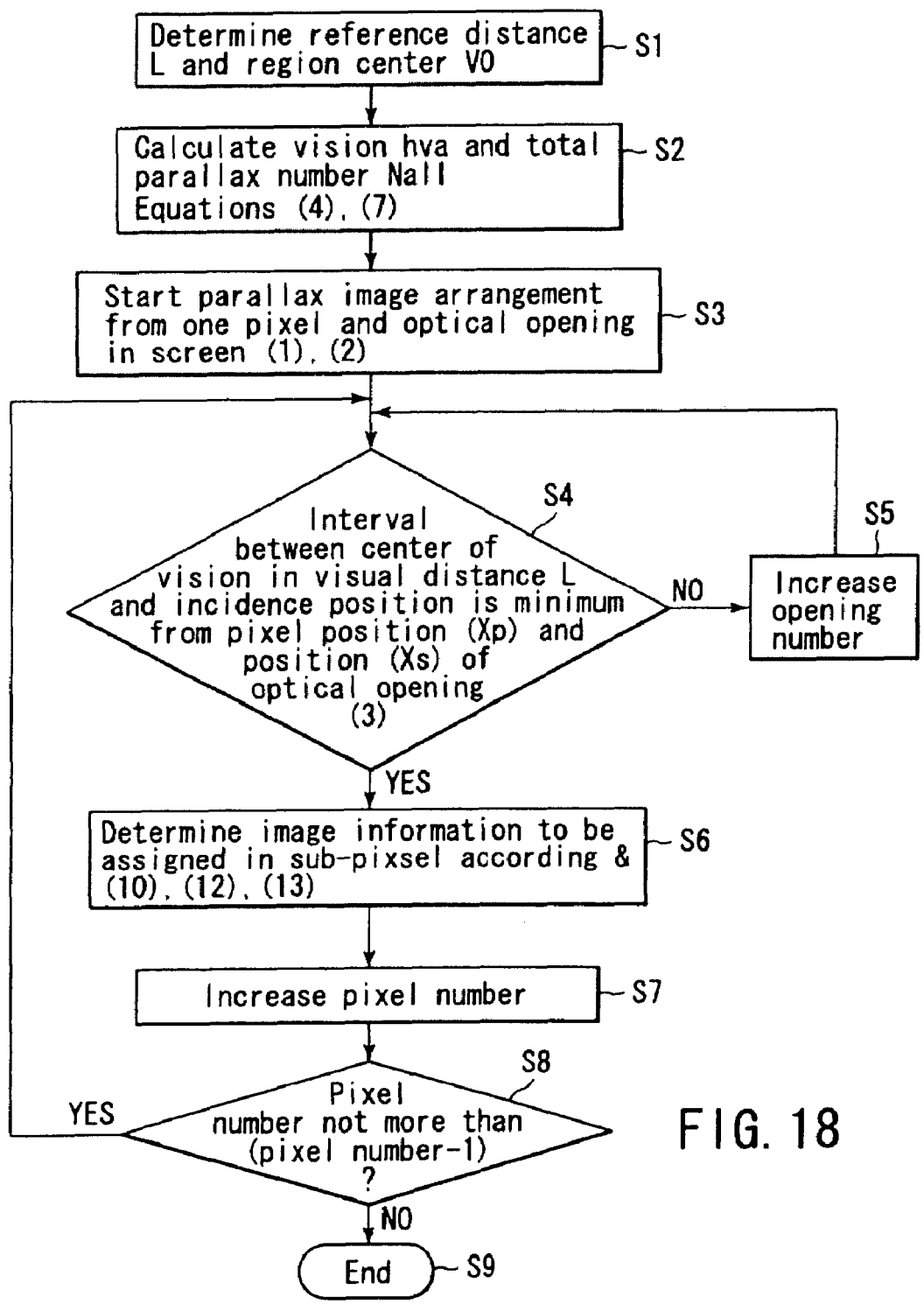
FIG. 18 is a flowchart showing a first algorithm to describe a procedure for arranging an elemental image group to be displayed in the display unit of the display apparatus according to the first embodiment of the present invention.

It is to be noted that, as described above, Equation (4) and the subsequent equations are established on the assumptions that the sub-pixel pitch hp and optical opening pitch hsp are constant and that the orthogonal line passing through the center V0 of the viewing zone in the reference distance L and crossing at right angles to the display unit 2 is coincident with the center of the display region of the display unit 2. However, the judgment by Equation (3) does not require these assumptions. That is, the application is possible, also when the pitch of the opening 4 is changed toward the end from the middle of the transmission control sections 3 in a certain period and in a stepwise manner, that is, when there are a plurality of values of Nvs or when Nvs is not a natural number. In these cases, it is appropriate to select the path of the light ray for determining the parallax image relating to the two-dimensional image information displayed on the sub-pixel along the flowchart shown in FIG. 18, not in FIG. 19. In the flowchart of FIG. 18, the width hva is calculated from Equation (4) in order to determine the parallax number relating to the two-dimensional image information displayed on the sub-pixel. However, the scope of the present disclosure lies in the method of selecting the path of the light ray to maximize the viewing zone (Equations (3), (11)). When the path of the light ray is merely determined, it is not difficult to set the parallax number relating to the two-dimensional image information for every inclination of the light ray. Moreover, it has been described that the incidence position of the light ray in the distance L is calculated from the paths of the light rays with respect to all of the optical openings in the step S4 in order to obtain a relation for minimizing the relation of Equation (3). However, when the sub-pixel pitch hp and optical opening pitch hsp are constant, the study of the specific sub-pixel is started from the optical opening in one end of the screen. At a time when the decreased value of Equation (3) increases, the optical opening that minimizes Equation (3) is determined, and the step shifts to the step S6. Even in this case, there is no problem.

Moreover, in the above-described embodiment, only the parallax image information of the horizontal direction has been described in order to describe the concept by which the stereoscopic image can be displayed in a planar description, but it is apparent that the parallax image information can also be distributed with respect to the vertical direction in the same manner as described above.

Examples will hereinafter be described.

EXAMPLE 1

In the present example, only the horizontal parallax effective for the stereoscopic viewing zone is imparted. For a liquid crystal display device, QUXGA-LCD (pixel number 3200×2400, screen size 422.4 mm×316.8 mm) may be used. A minimum driving unit includes sub-pixels of R, G, B. Three sub-pixels of R, G, B arranged side by side usually form one pixel (triplet), but the sub-pixels of R, G, B arranged in a longitudinal direction were handled as one pixel in order to increase the number of horizontal pixels in the display unit of the present example. That is, parallax image information are arranged at the sub-pixel pitch in the horizontal direction. The sub-pixel has a transverse width of, for example, 44 μm and a vertical length of, for example, 132 μm. A backlight is disposed on the rear surface of the display unit. On an observer's side, transmission control sections are provided in the form of slits each having a width of, for example, 44 μm, and the slits were arranged at an interval of, for example, 0.704 mm to form a slit array for imparting parallax information only in the horizontal direction by II system. The slit array is prepared by forming and patterning chromium and chromium oxide films on a glass plate. Since no film is formed in the transmission control section, transparency of glass is maintained. Since the chromium and chromium oxide films are formed in a shield region, black chromium oxide film is observed from the glass surface, and reflecting properties are observed from the back surface. In the II system three-dimensional image display device in which the liquid crystal display devices are combined so as to dispose the chromium surface of this slit plate opposite to the liquid crystal device, the distribution of the elemental images to the sub-pixels is determined in accordance with the algorithm shown in FIG. 18. The viewing zone of the present example is determined in such a manner that the orthogonal line passing through the central position V0 in the reference plane in the reference distance L and crossing at right angles to the panel agreed with the center of the panel.

Here, values in Table 2 may be used as parameters.

TABLE 2

| Parameter | Symbol and value |
|---|---|
| Horizontal pixel number | The size H = 3200 |
| Parallax number | Nvs = 16 |
| Sub-pixel horizontal width [mm] | Hp = 0.044 |
| Distance between center of opening and center of pixel on elemental image end | $hs = hp(Nvs - 1)/2$ |
| Interval of slits 4 | hsp |
| Viewing zone [rad.] | θ0 = 10 |
| Reference distance [mm] | L = 1000 |
| Screen width [mm] | H = 3 × hp × the size H |
| Number of slits | Ns = H/hsp |
| Gap [mm] | $g = hs/\tan\theta 0$ |
| Total parallax number | Nall = $(H \times hp \times Nvs + (2L\tan\theta 0(Nvs + 1)/Nvs)) \times g/L)/hp + 1$ |
| Sub-pixel number | vp = 0, 1, 2, . . . (0 < vp < 3 × the size H − 1) |
| Slit number | vs = 0, 1, 2, . . . (0 < vs < Ns − 1) |
| Parallax number | vi = 0, 1, 2, . . . (0 < vi < Nall − 1) |
| Pixel central position [mm] | $Xp = (vp + 1/2) \times hp$ |
| Slit central position [mm] | $Xs = (vs + 1/2) \times hsp$ |
| Initial position of camera | $Xc\_start = H/2 + hp(Nall - 1)/2 \times L/g$ |
| Camera position | $Xc = Xc\_start - vi \times hp \times L/g$ |

When the elemental images to be displayed are distributed to each sub-pixel by the judgment method of Equation (3), the total parallax number is 34 parallaxes, and the parallax number N(Xp, Xs) relating to the two-dimensional image information constituting the elemental image distributed in the vicinity of the middle disposed opposite to the center of the viewing zone in the display unit is from 8 to 23. On the other hand, N(Xp, Xs)=0 to 15 parallax images constitutes the elemental images with respect to the slit 4 positioned second from the screen left end, N(Xp, Xs)=18 to 33 parallax images constitutes the elemental images with respect to the slit 4 positioned second from the right end, and the position of the elemental image shifted to the outside with respect to the corresponding slit. That is, for the sub-pixel group constituting the elemental image for the slit 4 positioned second from the screen left end, the number of sub-pixels on the left side of the normal Op positioned in the middle of the slit 4 is 16, whereas the number of sub-pixels on the right is 0. The center of the elemental image is constituted to shift toward the outside of the display unit 2 from the normal Op. On the other hand, for the sub-pixel group constituting the elemental image for the slit 4 positioned second counted from the screen right end, the sub-pixels are distributed by the number opposite to that on the above-described left end of the normal Op positioned in the middle of the slit 4.

When the elemental image group prepared by this algorithm is displayed in the display unit, a correct image observation range (hva) in the reference distance is about 35 cm. In consideration of interocular distance (6.5 cm), an observation range should be about 28.5 cm (=35−6.5 cm), in which three-dimensional image can be viewed by both eyes. A condition in which the image is switched to the quasi image in the whole screen out of this viewing zone is recognized, and in a further outer region, the quasi image is visually recognized.

EXAMPLE 2

Figure 19:
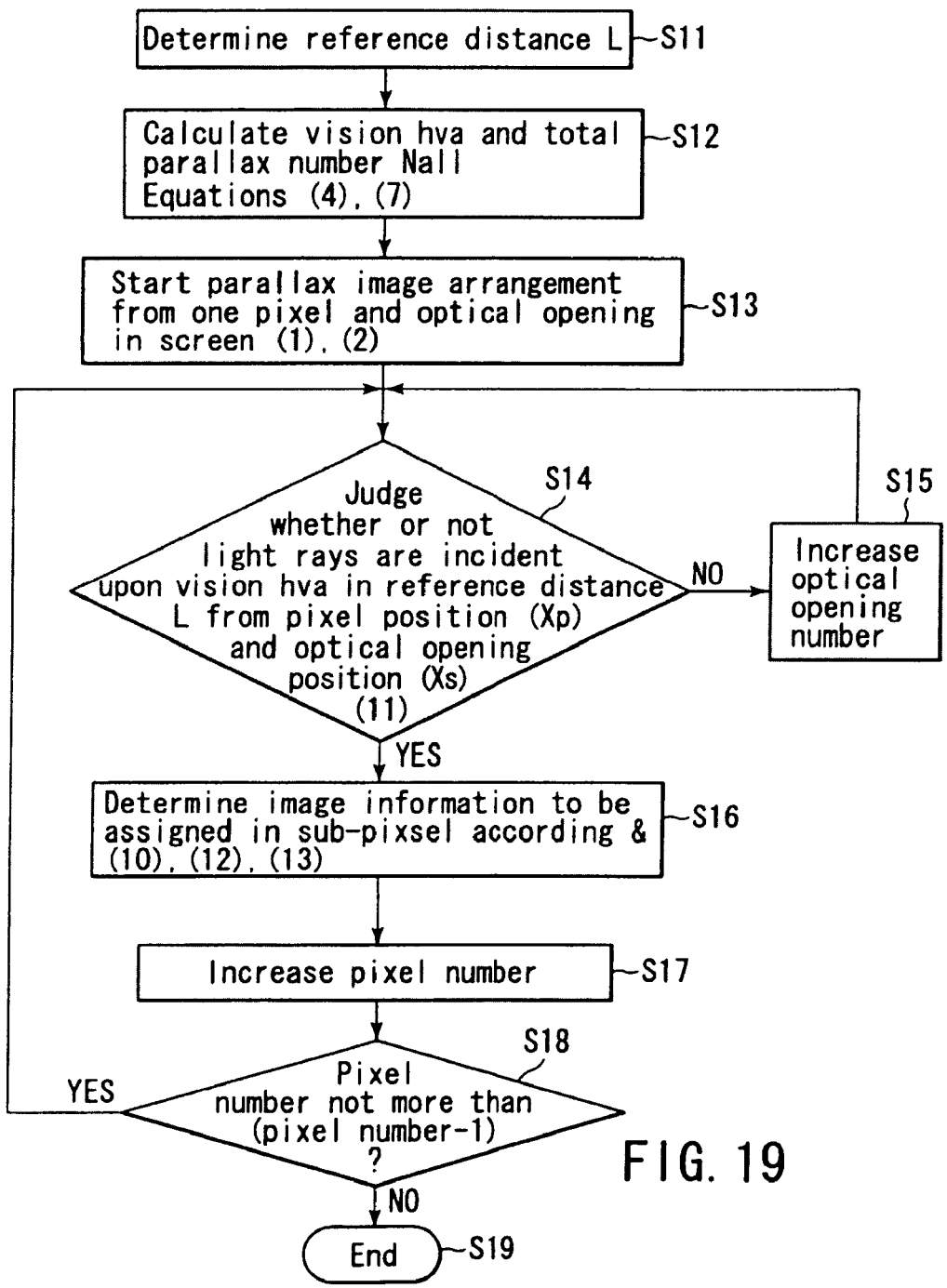
FIG. 19 is a flowchart showing a second algorithm to describe the procedure for arranging the elemental image group to be displayed in the display unit of the display apparatus according to another embodiment of the present invention.

When the elemental images are arranged in the constitution similar to that of Example 1 by the judgment method of Equation (11) in accordance with the algorithm of FIG. 19, completely the same elemental image group as that of Example 1 is obtained.

EXAMPLE 3

The reference distance is changed to 1.5 m in the constitution and algorithm similar to those of Example 1. The total number of parallaxes is 28, which is decreased as compared with Example 1, and the parallax number N(Xp, Xs) relating to the two-dimensional image information constituting the elemental image disposed in the vicinity of the middle disposed opposite to the center of the viewing zone in the display unit is from 6 to 21. On the other hand, for the elemental image for the slit 4 positioned second counted from the screen left end, the elemental image is generated from the N(Xp, Xs)=0 to 15 parallax images. For the elemental image for the slit 4 positioned second counted from the right end, the elemental image is generated from N(Xp, Xs)=12 to 27 parallax images. Moreover, for the sub-pixel group displaying the elemental image for the slit 4 positioned second counted from the screen left end, there are 14 sub-pixels on the left side of the normal Op positioned in the middle of the slit 4, whereas the number of sub-pixels on the right is 2. The group is positioned further on the left side. The distribution of sub-pixels displaying the elemental image for the slit 4 positioned second counted from the screen right end is opposite, and the sub-pixels are positioned further on the right side. That is, in both the groups, the center of the sub-pixel group displaying the elemental image shifts toward the outside of the display unit 2 from the normal Op passing through the center of the corresponding slit.

The elemental image group prepared by this algorithm is displayed in the display unit, and the correct image observation range (hva) in the reference distance is about 50 cm. In consideration of interocular distance (6.5 cm), an observation range should be about 43.5 cm (=50−6.5 cm), in which three-dimensional image can be viewed by both eyes. The condition in which the image is switched to the quasi image in the whole screen out of this viewing zone is recognized, and further in the outer region, the quasi image is visually recognized.

EXAMPLE 4

The viewing zone θ0 is changed to 15 degrees in the constitution and algorithm similar to those of Example 1. The total number of parallaxes is 28, and the parallax number N(Xp, Xs) relating the two-dimensional image information constituting the elemental image disposed in the vicinity of the middle disposed opposite to the center of the viewing zone in the display unit is from 6 to 21. On the other hand, for the elemental image for the slit 4 positioned second counted from the screen left end, the elemental image is generated from N(Xp, Xs)=0 to 15 images. For the elemental image for the slit 4 positioned second counted from the right end, the elemental image relating to the two-dimensional image information is generated from N(Xp, Xs)=12 to 27 images. Moreover, for the sub-pixel group displaying the elemental image for the slit 4 positioned second counted from the screen left end, there are 14 sub-pixels on the left side of the normal Op positioned in the middle of the slit 4, whereas the number of sub-pixels on the right is 2. The group is positioned further on the left side. The distribution of sub-pixels displaying the elemental image for the slit 4 positioned second counted from the screen right end is opposite, and the sub-pixels are positioned further on the right side. That is, in both groups, the center of the sub-pixel group constituting the elemental image shifts toward the outside of the display unit 2 from the normal Op passing through the center of the corresponding slit.

The elemental image group prepared by this algorithm is displayed in the display unit, and the correct image observation range (hva) in the reference distance is about 50 cm. The condition in which the image is switched to the quasi image in the whole screen out of this viewing zone is recognized, and further in the outer region, the quasi image is visually recognized.

COMPARATIVE EXAMPLE 1

In the constitution similar to that of Example 1, the present proposed algorithm has not been used. In the entire region of display unit 2, the basic parallax number is 16, and the same parallax number N(Xp, Xs)=0 to 15 relating to the two-dimensional image information disposed for the slit is set. Moreover, in the entire region of display unit 2, the center of the sub-pixel group displaying the elemental image for the slit 4 agrees with the normal Op positioned in the center of the corresponding slit 4.

When the elemental image group constituted in this manner is displayed in the display unit, there is no range in which the correct image is observable in the whole screen when observing at the reference distance of 1 m. In a position distant by 1.5 m, the correct image is observable with respect to the whole screen in a range of about 10 cm, which is smaller than the width of the screen. In consideration of the both eyes parallax, the correct image is observed at only one point. In opposite outer regions of about 35 cm, the correct and quasi images are intermingled and observed.

COMPARATIVE EXAMPLE 2

A short reference distance of 0.5 m is set in the constitution similar to that of Example 1, and the elemental image group is prepared by the judgment method of Equation (3) in accordance with the algorithm of FIG. 16, and is displayed in the display unit 2. Then, the correct image observation range (hva) in the reference distance is about 18 cm, which is smaller than the screen width. The three-dimensional image display apparatus is constituted imparting such an impression that the viewing zone of a depth direction is limited and the observable range of the three-dimensional image is limited.

In the above-described examples, the elemental images are generated at high speed with utilizing the parallel projection image. If the elemental images are generated with utilizing the ray-trace method, relations between the windows, i.e., the optical openings and the sub-pixels are determined in accordance to the equation (3) or (11).

The method of expanding the viewing zone in which the correct image is displayed has been described above with reference to FIGS. 1 to 19. Next, a display method in which the observer can recognize that the virtual image is observed outside the viewing zone including the display of the correct image will be described with reference to FIGS. 20 to 31. It is apparent that the display method according to a second embodiment shown in FIGS. 20 to 28 can be realized alone and may also be combined with a display method in which the viewing zone is enlarged.

In the following description, as shown in FIG. 3, each pixel 11 for displaying the three-dimensional image is constituted of a plurality of sub-pixels 12 arranged in a two-dimensional manner. As shown in FIG. 4, the optical openings 4 are regularly arranged. Therefore, the relative position of the optical opening 4 with respect to the pixel for displaying the three-dimensional image 11 is constant within the display plane.

Figure 20:
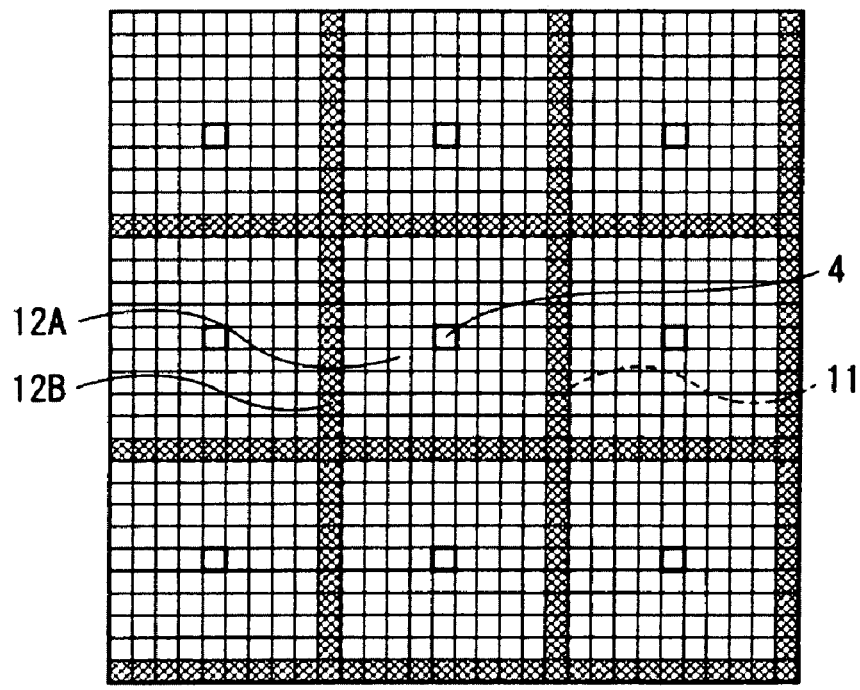
FIG. 20 is a plan view schematically showing a three-dimensional image display apparatus according to a modified example of the present invention, in which pixels for displaying a three-dimensional image shown in FIG. 3 are combined with transmission control sections shown in FIG. 4A so that warning is possible in observation outside the viewing zone.

FIG. 20 is a plan view schematically showing the three-dimensional image display apparatus using the pixels for displaying the three-dimensional image 11 shown in FIG. 3 and the optical barrier 3 shown in FIG. 4A. It is to be noted that in FIG. 20, only the optical openings 4 are drawn with respect to the optical barrier 3.

In the second embodiment, among a plurality of pixels for displaying the two-dimensional image included in the pixels for displaying the three-dimensional image 11, here among the sub-pixels 12, sub-pixels 12A positioned in a middle part are used in displaying the three-dimensional image, and sub-pixels 12B positioned in a peripheral edge are used in displaying an image for warning which can be distinguished from the three-dimensional image. It is to be noted that among the images displayed by the plurality of pixels for displaying the two-dimensional image included in the pixels for displaying the three-dimensional image 11, the image for use in displaying the three-dimensional will hereinafter be referred to as the elemental image.

Figure 21A:
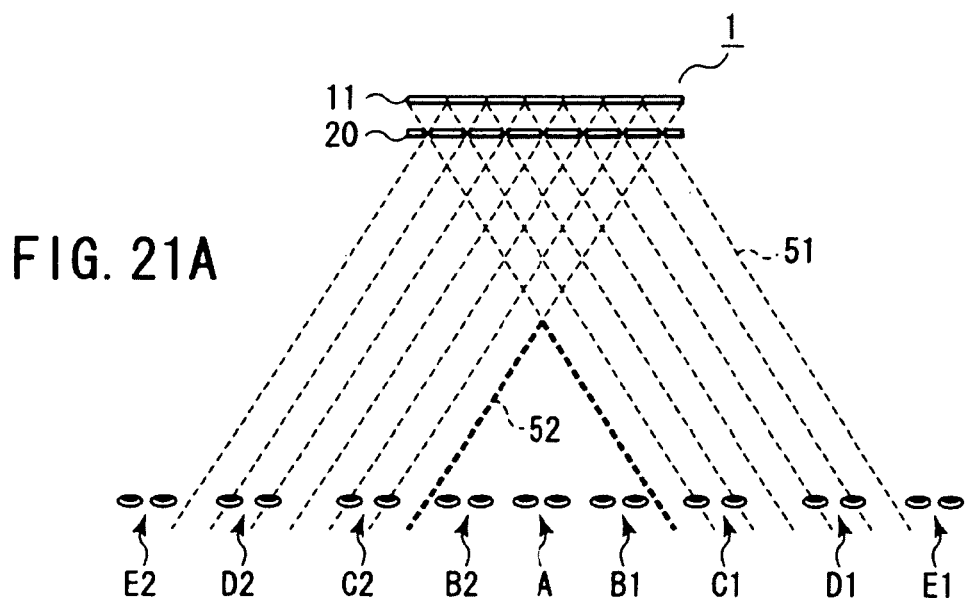
FIG. 21A is an explanatory view schematically showing a relation between the three-dimensional image display apparatus shown in FIG. 20 and an observation position.
Figure 21B:
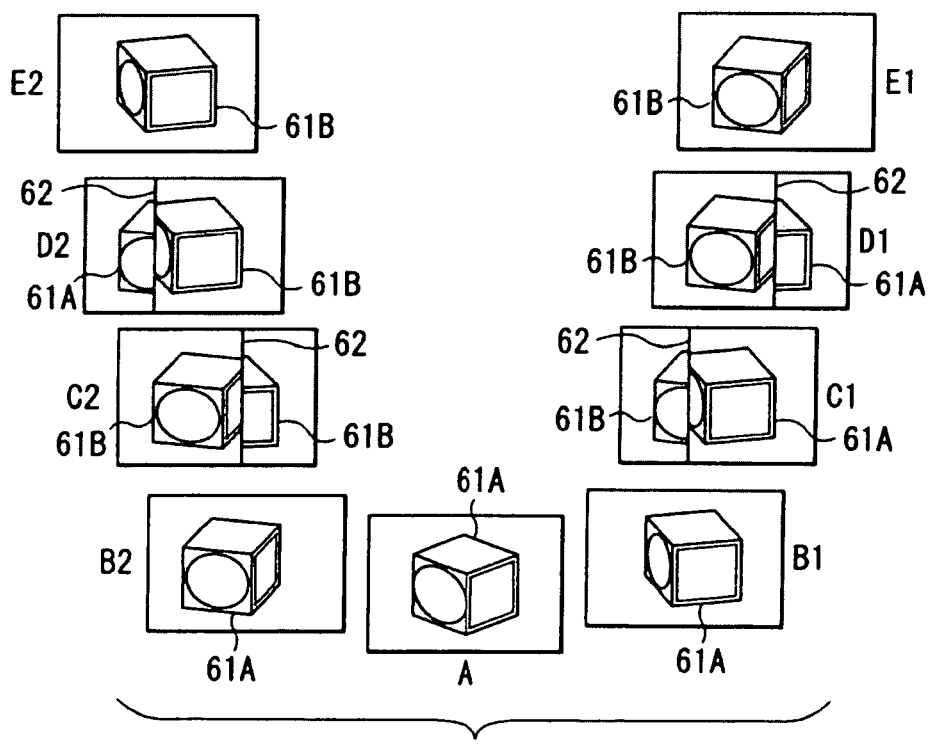
FIG. 21B is a diagram schematically showing the three-dimensional image perceived in the observation in each observation position shown in FIG. 21A.

FIG. 21A is a diagram schematically showing a relation between the three-dimensional image display apparatus shown in FIG. 20 and an observation position. FIG. 21B is a diagram schematically showing the three-dimensional image perceived in observation positions A, B1, B2, C1, C2, D1, D2, E1, E2 shown in FIG. 21A. It is to be noted that in FIG. 21A, each broken line 51 is a straight line connecting the boundary between the pixels 11 for displaying the three-dimensional image to the optical opening 4 of the optical barrier 3 (corresponding to a principal light ray). In FIG. 21A, each broken line 52 indicates a boundary between the observation position where only the true image (correct image) is perceived and the observation position where the quasi image is perceived. A region surrounded with the broken lines 52 corresponds to the observation position where only the correct image is perceived. Similarly, as described above, the observation position where only the true image (correct image) is perceived will hereinafter be referred to as the "viewing zone".

As shown in FIG. 21B, in the observation positions A, B1, B2, only true images 61A are perceived. In the observation in a region (viewing zone) below the broken lines 52 shown in FIG. 21A, the way of viewing the true image 61A changes in accordance with the observation position.

In the observation positions C1, C2, D1, D2, the true images 61A are intermingled and perceived together with quasi images 61B. Here, the quasi image 61B is recognized, because a part of the elemental image displayed by another pixel 11 for displaying the three-dimensional image disposed adjacent to the pixel 11 for displaying the three-dimensional image disposed opposite to the certain optical opening 4 is observed. A ratio of the quasi images 61B in the perceived three-dimensional images increases on the side of the wide field of view. In the observation positions E1, E2, since a part of the elemental image displayed by the adjacent pixel 11 for displaying the three-dimensional image is observed with respect to all the optical openings 4, only the quasi image 61B is perceived.

In the second embodiment, the image for warning, which can be distinguished from the true image 61A or the quasi image 61B, is displayed by the sub-pixels 12B shown in FIG. 20. As the image for warning, for example, all the sub-pixels 12B are brought in a dark display state or a bright display state. The sub-pixels 12B are positioned in the boundary between the pixels 11 for displaying the three-dimensional image. Therefore, in the movement to the observation position C1 from B1, a linear image for warning 62 appears prior to the quasi image 61B. In the movement to the observation position D1 from C1, the image for warning 62 moves toward the right from the left of the figure with the increase of the ratio of the quasi images 61B occupied in the perceived three-dimensional image. Further in the movement to the observation position E1 from D1, the image for warning 62 disappears, and only the quasi image 61B is perceived.

It is to be noted that for the image for warning 62, one eye is positioned in a region outside the broken lines 52 shown in FIG. 21A, and one straight line is perceived until both eyes exceed all the broken lines 51.

In this manner, according to the second embodiment, the observer can recognize that the observation position deviates from the viewing zone by the linear image for warning 62. It is to be noted that the movement of the observation position in the horizontal direction has been described with reference to FIGS. 21A and 21B. However, also when the position is moved in the vertical direction, the observer can recognize the observation position deviating from the viewing zone by the similar method. In this case, the image for warning is one horizontal straight line. Moreover, the image for warning 62 moves along with the movement of the observation position. Therefore, even when the true image 61A and the quasi image 61B include linear portions, the linear image for warning 62 can easily be distinguished from these images.

Further in the second embodiment, different from the use of refraction of light, the viewing zone width in the reference distance capable of perceiving the true image or the region of the observation position where the true image can be perceived cannot be expanded. Therefore, even when the number of pixels for displaying the two-dimensional image included in the pixels 11 for displaying the three-dimensional image, that is, the number of sub-pixels 12 or 12a, is comparatively small, the image can smoothly change at the time of the movement of the observation position.

In this manner, according to the second embodiment, the observer is guaranteed to recognize that the observation position deviates from the viewing zone. An effect that the deviation from the viewing zone can be recognized is obtained only with the use of the II system, and cannot be obtained with the use of a binocular or multi-view system. This will be described with reference to FIG. 22.

Figure 22:
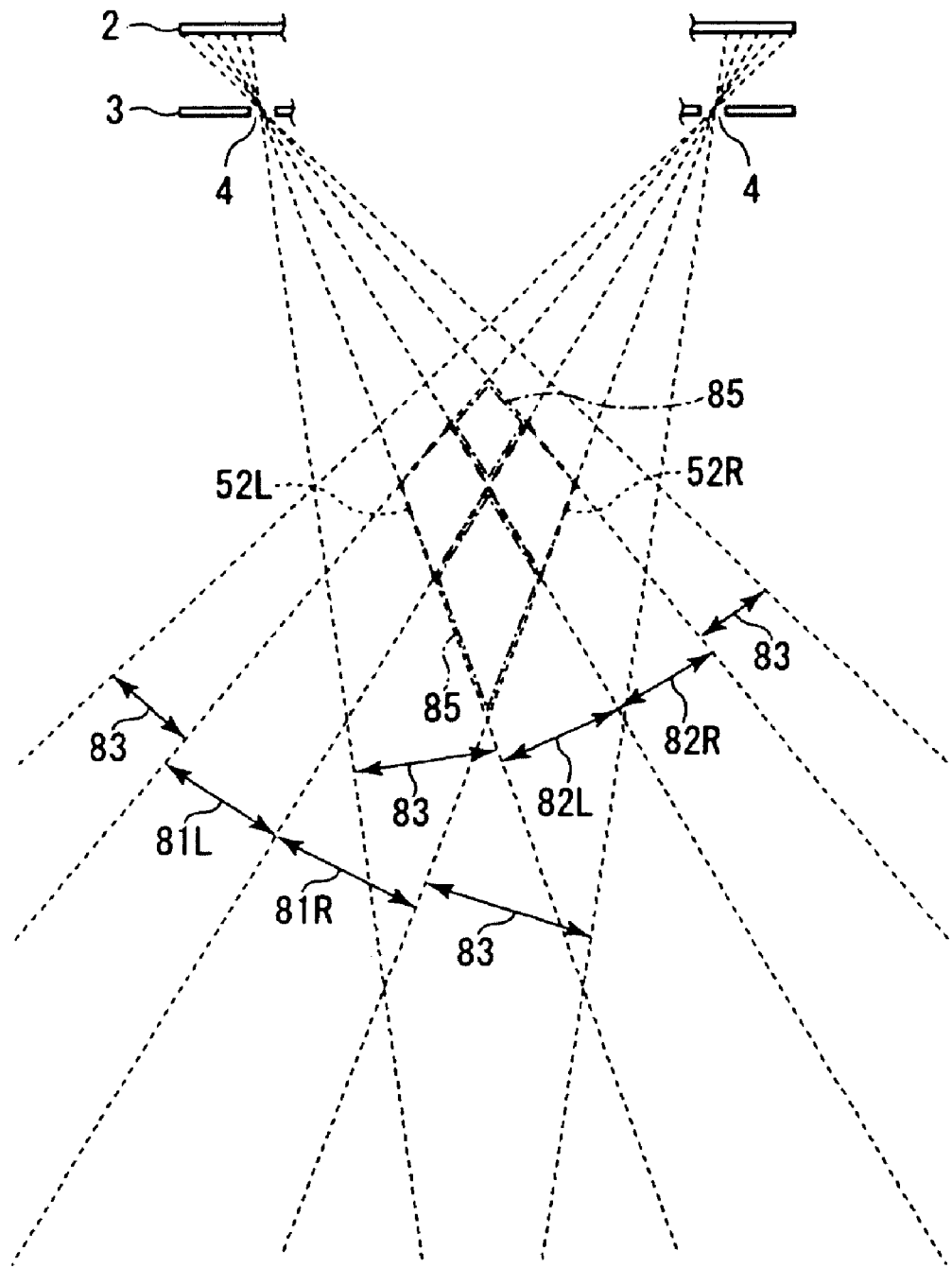
FIG. 22 is an explanatory view schematically showing a case where a stereoscopic system is used to display an image for the warning.

FIG. 22 is a diagram schematically showing a case where the binocular system is used to display the image for warning. In FIG. 22, in a region 52R, a region 81R where the image for the right eye can be observed via the right optical opening 4 overlaps with a region 82R where the image for the right eye can be observed via the left optical opening 4. Moreover, in a region 52L, a region 81L where the image for the left eye can be observed via the right optical opening 4 overlaps with a region 82L where the image for the left eye can be observed via the left optical opening 4. Furthermore, a region 83 indicates a region where the image for warning is observed.

In the binocular system, when the left eye is positioned in the region surrounded with broken lines 52L, and the right eye is positioned only in the region surrounded with broken lines 52R, only the true image is perceived. When the observation position deviates and one eye is positioned in the region 83, the observer perceives the image for warning, and recognizes that the observation position deviates from the viewing zone.

However, in a region 85, a region 81L where the image for the left eye can be observed via the right optical opening 4 overlaps with a region 82L where the image for the right eye can be observed via the left optical opening 4, and the region 81L where the image for the right eye can be observed via the right optical opening 4 overlaps with the region 82L where the image for the left eye can be observed via the left optical opening 4. That is, when the observation position is in the region 85, the observer does not perceive any image for warning, and perceives a distorted three-dimensional image. Therefore, when the observation position deviates, one eye is positioned in the region 85, and the other eye is positioned in the region 52L or 52R, or when both eyes are positioned in the region 85, it is remarkably difficult for the observer to recognize that the observation position deviates from the viewing zone. In this manner, in the multi-view system, the observer cannot be allowed to securely recognize that the observation position deviates from the viewing zone.

In the second embodiment, as shown in FIG. 20, the sub-pixels 12B for use in the display of the image for warning 62 are arranged with respect to the sub-pixels 12A for use in the display of the three-dimensional image, but it is also possible to use another arrangement.

Figure 23:
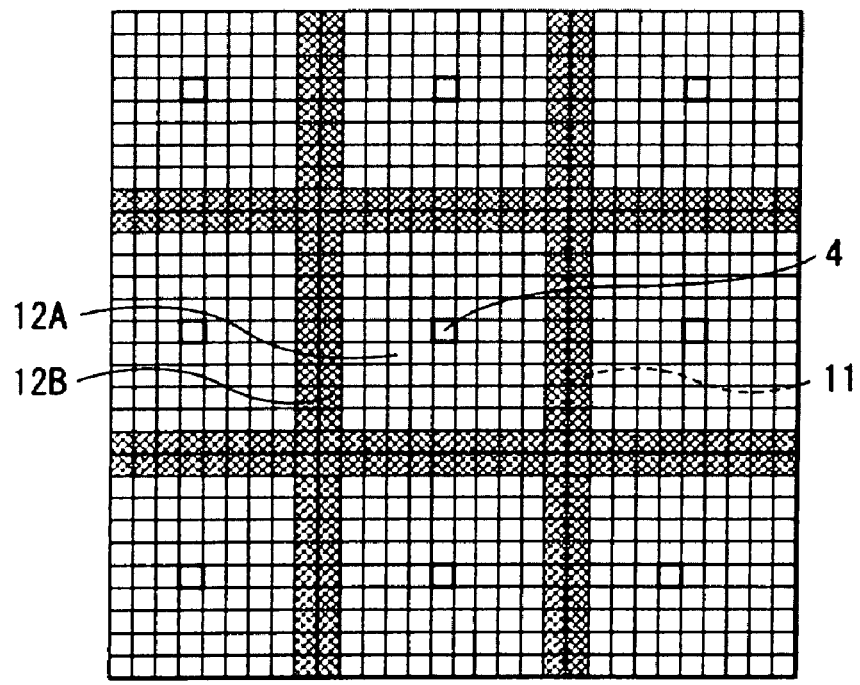
FIG. 23 is a plan view schematically showing a modified example of the three-dimensional image display apparatus shown in FIG. 20.

FIG. 23 is a plan view schematically showing a modified example of the three-dimensional image display apparatus shown in FIG. 20. In FIG. 22, among the sub-pixels 12 included in the pixels 11 for displaying the three-dimensional image, the sub-pixels in a lower end row and right end column are the sub-pixels 12B for use in displaying the image for warning 62. On the other hand, in FIG. 23, among the sub-pixels 12 included in the pixels for displaying the three-dimensional image, in addition to the sub-pixels in the lower end row and right end column, the sub-pixels in an upper end row and left end column are also the sub-pixels 12B for displaying the image for warning. In this case, the ratio of the sub-pixels 12A for use in the display of the three-dimensional image to the sub-pixels 12B for displaying the image for warning drops, but the image for warning 62 which is more easily perceived can be displayed.

In the second embodiment, the sub-pixels 12B in the pixels 11 for displaying the three-dimensional image form not only one row or column but also a plurality of rows or columns. Moreover, when the observer can sufficiently recognize that the observation position deviates from the viewing zone only in the horizontal direction, or in one-dimensional II system in which the parallax information is imparted only in the horizontal direction, in the pixels 11 for displaying the three-dimensional image, the sub-pixels 12B for displaying the image for warning do not have to be arranged along the boundary between the vertically adjacent pixels 11 for displaying the three-dimensional image. Similarly, when the observer can sufficiently recognize that the observation position deviates from the viewing zone only in the vertical direction, in the pixels 11 for displaying the three-dimensional image, the sub-pixels 12B for displaying the image for warning do not have to be arranged along the boundary between the horizontally adjacent pixels 11 for displaying the three-dimensional image.

Next, a modified embodiment of the present invention will be described. The embodiment is similar to the second embodiment except that the relative position of the pixel 11 for displaying the three-dimensional image with respect to the optical opening 4 shifts in the stepwise manner in a direction distant from a display reference position apart from the display reference position in the display plane. That is, this modified embodiment corresponds to a combined embodiment of the first and second embodiments.

Figure 24A:
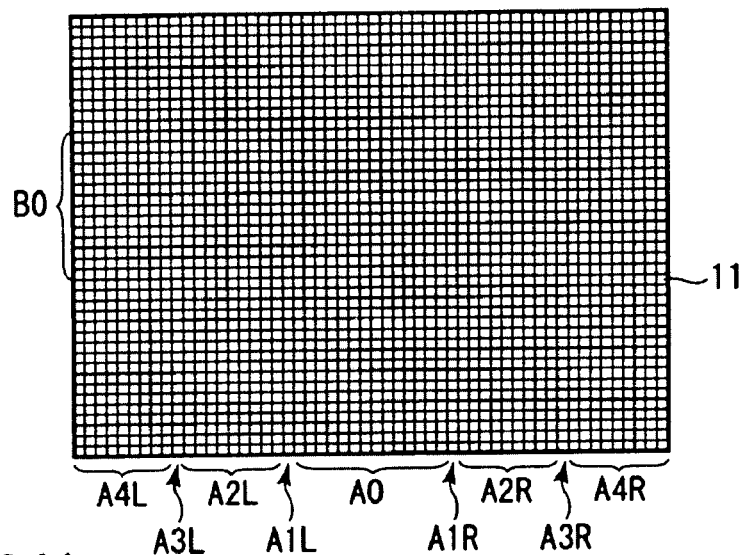
FIG. 24A is a plan view schematically showing the three-dimensional image display apparatus of an II system according to further modified example of the present invention.
Figure 24B:
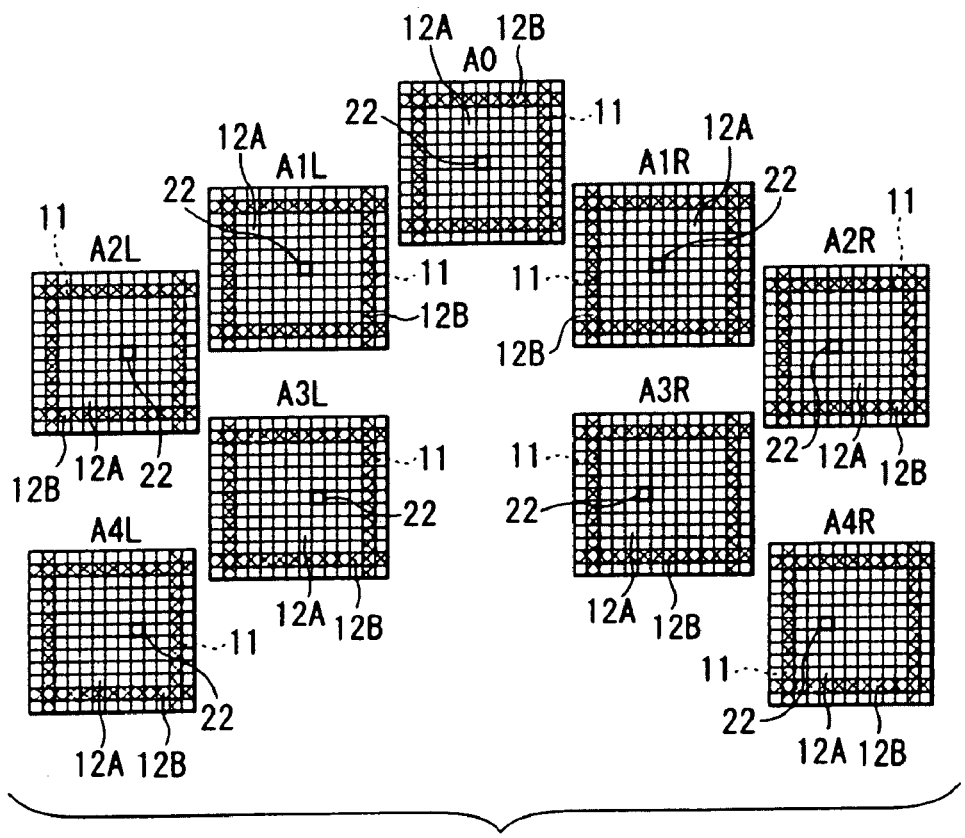
FIG. 24B is a plan view schematically showing a relative position of the pixel for displaying the three-dimensional image with respect to an opening in the three-dimensional image display apparatus shown in FIG. 24A.

FIG. 24A is a plan view schematically showing the three-dimensional image display apparatus of the II system according to the modified embodiment of the present invention. FIG. 24B is a plan view schematically showing the relative position of the pixels 11 for displaying the three-dimensional image with respect to the optical openings 4 in the three-dimensional image display apparatus of FIG. 24A. It is to be noted that the pixels 11 for displaying the three-dimensional image shown in FIG. 24B are positioned in a region B0 among the pixels 11 for displaying the three-dimensional image shown in FIG. 24A.

In a structure shown in FIGS. 24A and 24B, the interval between the optical openings 4 in the horizontal direction is set to be constant, the number of sub-pixels 12A arranged in the horizontal direction in the pixels 11 for displaying the three-dimensional image is set to 9 in regions A0, A2R, A4R, A2L, A4L, and set to 10 in regions A1R, A3R, A1L, A3L. Accordingly, the relative position of the pixel 11 for displaying the three-dimensional image with respect to the optical opening 4 is shifted in the stepwise manner in a direction apart from the straight line passing through the center of the pixel 11 for displaying the three-dimensional image and extending in the vertical direction, depending on a distance from the straight line. Further in this structure, the interval between the optical openings 4 in the vertical direction is set to be constant, and the relative position of the pixel 11 for displaying the three-dimensional image with respect to the optical opening 4 is shifted in the stepwise manner in the direction apart from the straight line passing through the center of the pixel 11 for displaying the three-dimensional image and extending in the horizontal direction, depending on a distance from the straight line.

It is to be noted that in FIG. 24A the center of the pixel for displaying the three-dimensional image 11 drawn in the middle corresponds to the display reference position. That is, in the region where the region A0 overlaps with the region B0 shown in FIG. 24A, the optical opening 4 is disposed opposite to the center of the pixel 11 for displaying the three-dimensional image as shown in FIG. 24B. On the other hand, the pixel 11 for displaying the three-dimensional image is disposed opposite to a position on the right side of the center of the optical opening 4 in a region on the right side of the region A0, and the pixel 11 for displaying the three-dimensional image is disposed opposite to a position on the left side of the center of the optical opening 4 in the region on the left side. Similarly, the pixel 11 for displaying the three-dimensional image is disposed opposite to a position above the center of the optical opening 4 in a region above the region B0, and the pixel 11 for displaying the three-dimensional image is disposed opposite to a position below the center of the optical opening 4 in the lower region.

When this structure is used, and when the image is display in the same manner as described in the second embodiment with reference to FIG. 20, the observer can recognize that the three-dimensional image perceived by the observer include the quasi image if any. Further in this modified embodiment, in the same manner as in the second embodiment shown in FIG. 20, even when the number of pixels for displaying the two-dimensional image (sub-pixels 12 or 12a) included in the pixels for displaying the three-dimensional image 11 is comparatively small, the image can smoothly change at the time of the movement of the observation position.

Further, in another modified embodiment relating to FIGS. 24A and 24B, since the above-described structure is used, the image for warning 62 different from that of the second embodiment shown in FIG. 20 can be perceived.

Figure 25A:
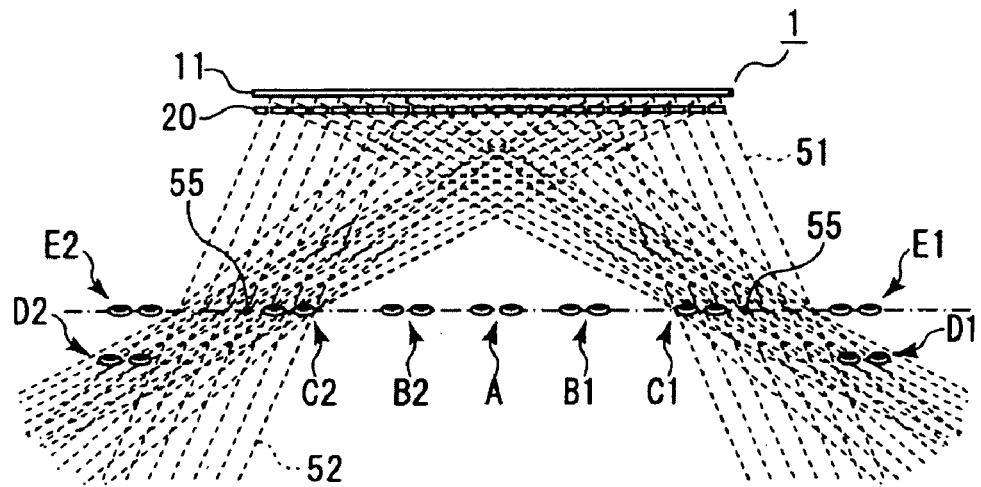
FIG. 25A is an explanatory view schematically showing the relation between the three-dimensional image display apparatus shown in FIGS. 24A and 24B, and the observation position.
Figure 25B:
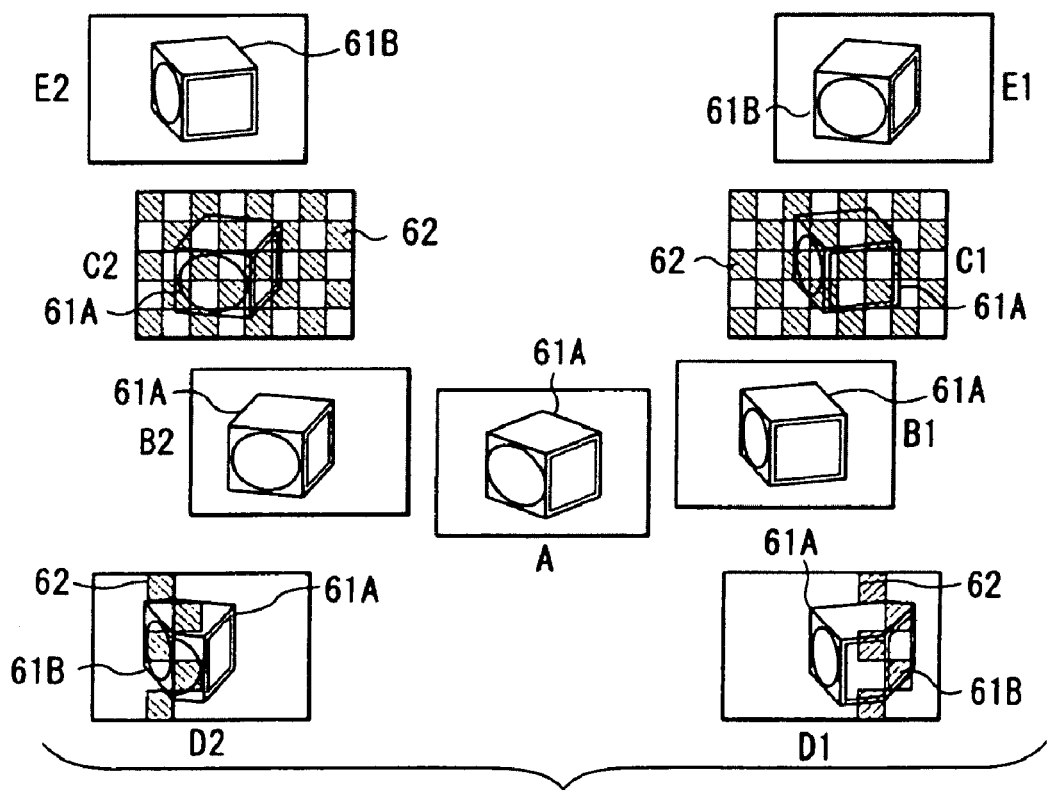
FIG. 25B is a diagram schematically showing the three-dimensional image perceived in the observation in each observation position shown in FIG. 25A.

FIG. 25A is a diagram schematically showing the relation between the three-dimensional image display apparatus shown in FIGS. 24A and 24B, and the observation positions. FIG. 25B is a diagram schematically showing the three-dimensional image perceived in each observation position shown in FIG. 25A. In FIG. 21A, the straight lines 51 connecting the boundary between the pixels 11 for displaying the three-dimensional image to the optical openings 4 of the optical barrier 3 are parallel to one another. On the other hand, in FIG. 25A, a plurality of straight lines 51 parallel to one another in a group substantially intersect with one another at one point 55.

As shown in FIG. 25B, only the true image 61A is perceived in the observation positions A, B1, B2. Further in the region (viewing zone) below the broken lines 52 shown in FIG. 25B, the way of viewing the true image 61A changes in accordance with the observation position in the same manner as described with reference to FIGS. 21A and 21B.

In the observation positions C1, C2, both eyes are positioned outside the viewing zone and in the vicinity of the intersection 55 in which the image for warning is displayed with a distribution. Therefore, the observer perceives the image for warning 62 all over the screen. It is to be noted that here the image for warning 62 has a checkered pattern as one example. Here, for the observer to easily perceive the image for warning 62, the number of columns N of sub-pixels 12B positioned in the boundary between the pixels 11 for displaying the three-dimensional image disposed adjacent to each other, a width w of the sub-pixel 12B, a distance (reference distance) L between the optical barrier 3 and the intersection 55, the gap g between the pixel 11 for displaying the three-dimensional image and the optical barrier 3, and an interval D between both eyes are designed to satisfy inequality: $D \leq N \times w \times L/g$. With $D > N \times w \times L/g$, the image for warning is visually recognized as a plurality of vertical lines positioned at a substantially equal interval in the screen in the observation positions C1, C2.

When the observation position is moved on the side of the wide field of view, the observer perceives the quasi image 61B with one eye, and the image for warning 62 all over the screen with the other eye. Only the quasi image 61B is perceived in the observation positions E1, E2, where the observation position is moved further on the side of the wide field of view.

In this manner, according to the present embodiment, the image for warning 62 can be set to be two-dimensional. Therefore, it is easier to distinguish the image for warning 62 from the true image 61A or the quasi image 61B.

It is to be noted that the image for warning 62 displayed all over the screen is perceived, only when the observation position is in the vicinity of the intersection 55 of the straight lines 51. For example, the width of the perceived image for warning 62 is reduced in the observation positions D1, D2. In this manner, in the present embodiment, when the observation position is on the straight line 51, the ratio of the image for warning 62 in the whole screen decreases with the increase of the distance between the intersection of the straight lines 51 and the observation position. However, when the distance is sufficiently short, the image for warning 62 is more easily perceived than in the second embodiment.

Moreover, as apparent from the comparison of FIG. 21A with FIG. 25A, the present embodiment is advantageous in expanding the viewing zone as compared with the embodiment shown in FIG. 21A. It is to be noted that one of characteristics generated by the use of the II system lies in that a plurality of straight lines 51 are parallel to one another.

In the above-described embodiment, as shown in FIGS. 24A and 24B, the sub-pixels 12B for use in the display of the image for warning 62 are arranged with respect to the sub-pixels 12A for use in the display of the three-dimensional image, but other arrangements may also be used.

For example, among the sub-pixels 12 included in the pixels 11 for displaying the three-dimensional image in addition to the sub-pixels in one lower end row and right end column, the sub-pixels in one upper end row and left end column may also be used as the sub-pixels 12B for displaying the image for warning.

Moreover, the sub-pixels 12B in the pixels for displaying the three-dimensional image 11 form not only one row or column but also a plurality of rows or columns.

Furthermore, when the observer can sufficiently recognize that the observation position deviates from the viewing zone only in the horizontal direction, or in the one-dimensional II system in which the parallax information is imparted only in the horizontal direction, in the pixels 11 for displaying the three-dimensional image, the sub-pixels 12B for displaying the image for warning do not have to be arranged along the boundary between the vertically adjacent pixels 11 for displaying the three-dimensional image. Similarly, when the observer can sufficiently recognize that the observation position deviates from the viewing zone only in the vertical direction, in the pixels 11 for displaying the three-dimensional image, the sub-pixels 12B for displaying the image for warning do not have to be arranged along the boundary between the horizontally adjacent pixels for displaying the three-dimensional image 11.

Moreover, in FIGS. 24A and 24B, one column of sub-pixels 12A is increased outside in the pixels 11 for displaying the three-dimensional image included in the regions A1R, A3R, A1L, and A3L. Accordingly, the relative position of the pixel 11 for displaying the three-dimensional image with respect to the optical opening 4 is shifted in a direction distant from a reference line passing through the center of the optical opening 4 and extending in the vertical direction apart from the reference line, but another structure may also be used. For example, the relative position of the pixel 11 for displaying the three-dimensional image with respect to the optical opening 4 may also be shifted in a direction distant from a reference line passing through the center of the middle pixel for displaying the three-dimensional image 11 and extending in the horizontal direction apart from the reference line. Moreover, the relative position of the pixel 11 for displaying the three-dimensional image with respect to the optical opening 4 may also be shifted in a direction apart from the center (reference point) of the middle pixel 11 for displaying the three-dimensional image, depending on a distance apart from the reference point.

In the embodiment of FIG. 20 or 23, the sub-pixels 12B for displaying the image for warning may have an unchangeable display state. Alternatively, for the sub-pixels for displaying the image for warning 12B, the display state may optionally be changeable in the same manner as in the sub-pixels 12A. Further, in the second embodiment and the modification, a driving circuit for driving the sub-pixels 12A may be disposed separately for driving the sub-pixels 12B. Alternatively, the sub-pixels 12A and 12B may also be driven by the same driving circuit. That is, in the second embodiment and the modification, the constitution for displaying the image for warning 62 may also be realized by appropriately designing hardware or simply by signal processing. In any case, it is easy to design or manufacture the three-dimensional image display apparatus.

Moreover, in the second embodiment and the modification, when the display state of the sub-pixels 12B for displaying the image for warning is changeable, and when a dynamic image is displayed by the sub-pixels 12A, a static image is displayed by the sub-pixels 12B for displaying the image for warning. When the sub-pixels 12A display the static image, the sub-pixels 12B for displaying the image for warning may display the dynamic image.

In the embodiment shown in FIG. 20 or 23, a display color of the true image 61A or the quasi image 61B may also be different from that of the image for warning 62. Moreover, the true image 61A or the quasi image 61B may also be different from the image for warning 62 in space frequency. Furthermore, the true image 61A or the quasi image 61B may also be different from the image for warning 62 both in the display color and the space frequency.

Moreover, the display position of the image for warning is not the entire screen, and may also be a part of the screen. More specifically, when there is no any vertical parallax and there is only the horizontal parallax, the image for warning may also be disposed only in a strip-shaped region extending in the horizontal direction. The strip-shaped region may also be disposed in the upper part, lower part, or middle of the screen. On the other hand, when there is also the vertical parallax, the image for warning may also be disposed in a frame shape around the screen. In any case, when the image for warning is disposed in a continuous region in the horizontal or vertical direction in consideration of a possibility that the image for warning is displayed in a discrete manner in accordance with the reference distance, the image for warning can more securely be visually recognized.

Next, another modified embodiment of the present invention will be described.

Figure 26:
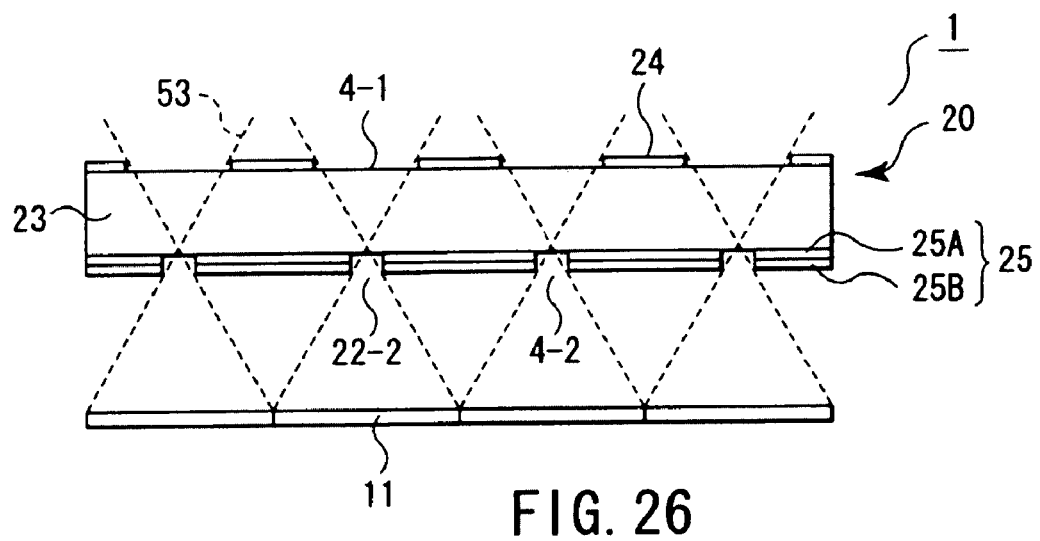
FIG. 26 is a sectional view schematically showing the three-dimensional image display apparatus according to still another modified example of the present invention.

FIG. 26 is a sectional view schematically showing the three-dimensional image display apparatus according to still another modified embodiment of the present invention. The three-dimensional image display apparatus shown in FIG. 26 includes the pixels 11 for displaying the three-dimensional image arranged in vertical and horizontal directions and the optical barrier 3 disposed opposite to the pixels.

The optical barrier 3 includes a transparent substrate 23, a first shielding layer 24 disposed on a front surface of the transparent substrate 23, and a second shield layer 25 disposed on a rear surface of the transparent substrate 23. It is to be noted that the second shield layer 25 includes a shield layer 25A and reflective layer 25B.

First optical openings 4-1 are defined on the front surface of the transparent substrate 23 by the first shielding layer 24 so as to face the pixels 11. The dimension and arrangement of the first optical opening 4-1 can be determined as will be described later in detail.

Second optical openings 4-2 are also defined on the rear surface of the transparent substrate 23 by the second shield layer 25 so as to face the pixels 11 and the first optical openings 4-1. The second optical opening 4-2 corresponds to the optical opening 4 described in the second embodiment and the modification. Therefore, when the three-dimensional image display apparatus is of a monochromatic type, each second optical opening 4-2 may have a shape analogous to that of one sub-pixel of the pixel 11, or may typically have about the same shape and dimension as those of one sub-pixel 12. When the three-dimensional image display apparatus is of a full color type, each second optical opening 4-2 may have a shape analogous to that of one of the pixels, each of which is composed of three sub-pixels of red, green, and blue, and may typically have about the same shape and dimension as those of one pixel. Alternatively, each second optical opening 4-2 may have the shape analogous to that of one sub-pixel, or may typically have about the same shape and dimension as those of one sub-pixel.

In the embodiment, in the above-described constitution, various dimensions or arrangements can be determined as follows. That is, first, straight lines 53 are so considered and so determined as to have a smallest angle between a substrate plane and the straight line. The straight line 53 begins from the point positioned on a contour of a certain pixel 11 for the three-dimensional image and are extended to points on the contour of the second optical opening 4-2 facing the pixel 11. Thereafter, the position and dimension of the first optical opening 4-1 are determined in such a manner that the contour of the first optical opening 4-1 is substantially coincident with an intersection portion of the edge of the first shielding layer 24 and the straight line 53.

With the use of this structure, light rays from the sub-pixels of the certain pixel 11 can pass through the second optical opening 4-2 and first optical opening 4-1 disposed opposite to the pixel. However, the light rays from the sub-pixel of the adjacent pixel 11 cannot pass through the first optical opening 4-1. Therefore, the observer perceives only the true image, and does not perceive the quasi image.

Moreover, in the present embodiment, different from the use of refraction of light rays, an angle of field of view capable of perceiving the true image is not expanded in order to obtain the above-described effect. Therefore, even when the number of pixels for displaying the two-dimensional image included in the pixels 11 for displaying the three-dimensional image is comparatively small, the image can smoothly change at the time of the movement of the observation position.

Next, another embodiment of the present invention will be described.

Figure 27:
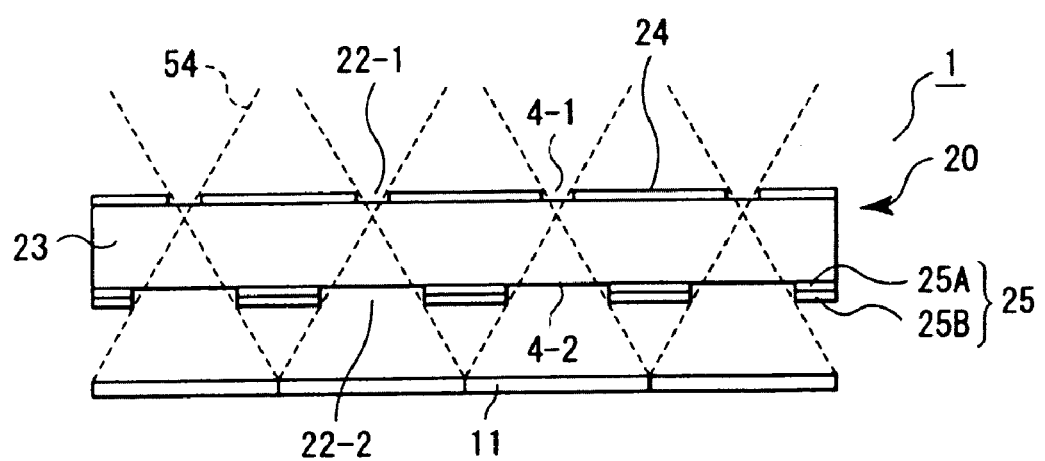
FIG. 27 is a sectional view schematically showing the three-dimensional image display apparatus according to still further modified example of the present invention.

FIG. 27 is a sectional view schematically showing the three-dimensional image display apparatus according to still further modified embodiment of the present invention. The present embodiment is similar to the above-described embodiment except that the first optical opening 4-1 corresponds to the optical opening 4 described in the first and second embodiments and the dimension and arrangement of the second optical opening 4-2 are determined as will be described later.

That is, in the present embodiment, straight lines 54 are so considered and so determined as to have a largest angle between the substrate surface and the straight lines 54. The straight line begins from the point positioned on a contour of a certain pixel 11 for the three-dimensional image and are extended to points on the contour of the first optical opening 4-1 facing the pixel 11. Thereafter, the position and dimension of the second optical opening 4-2 are determined in such a manner that the contour of the second optical opening 4-2 is substantially coincident with an intersection portion of the edge of the second shielding layer 25 and the straight line 53.

With the use of this structure, in the same manner as in the embodiment shown in FIG. 26, the observer perceives only the true image, and does not perceive the quasi image. Moreover, in the present embodiment, different from the use of refraction of light rays, the angle of field of view capable of perceiving the true image is not expanded in order to obtain the above-described effect. Therefore, even when the number of pixels for displaying the two-dimensional image included in the pixels 11 for displaying the three-dimensional image is comparatively small, the image can smoothly change at the time of the movement of the observation position.

It is to be noted that in FIGS. 26 and 27, a display apparatus of self-emitted type may also be used in the pixel 11 for displaying the three-dimensional image. In FIGS. 26 and 27, a transmission type liquid crystal display apparatus may also be used in the pixel 11 for displaying the three-dimensional image. In the latter case, the backlight needs to be disposed below the pixel 11 for displaying the three-dimensional image, and the optical barrier 3 may also be disposed above or below the liquid crystal display apparatus.

In the modified embodiment, the shielding layers 24, 25 preferably include a shield layer (e.g., the shield layer 25A), which seems to be black on the observer's side. This is because black at the time of the black display is sufficiently precipitated in the same manner as in a black matrix portion in a color filter of the liquid crystal display apparatus. Examples of a material of the shield layer include a metal film formed of chromium oxide, an organic black pigment scattered resist, and the like. It is to be noted that the black pigment scattered resist includes a black pigment scattered in photopolymer. The examples include "PD-170K (BM)" which is a pigment scattered type photosensitive solution manufactured by Hitachi Chemical Co., Ltd. The examples of another black pigment scattered resist include a resist in which carbon or a mixture of the black pigment and carbon is scattered.

In the modified embodiment shown in FIG. 26 or 27, a layer disposed on the side of a light source among the shielding layers 24, 25 may or may not include a reflective layer (e.g., the reflective layer 25B) on the light source side. When the reflective layer is disposed, efficiency of light use is enhanced, and higher luminance can be realized. It is to be noted that with the use of a chromium oxide film as the shield layer, metal films such as a chromium film are used as the reflective layer to be formed on the shield layer in many cases. Moreover, the reflective layer is usually formed in such a manner that the end surface does not protrude from the shield layer.

In the modified embodiment, the shielding layers 24, 25 are formed on the opposite surfaces of one substrate 23, but the shielding layers 24, 25 may also be formed on separate substrates. Additionally, since the number of necessary components is smaller in the former case, this structure is advantageous from the standpoint of reduction in thickness and weight as compared with the latter case.

Moreover, with the use of the former structure, as compared with the latter case, it is possible to more easily realize a high positioning precision. That is, for example, when the shielding layer 24 is formed before the shield layer 25, a marker for positioning may also be formed in forming the shielding layer 24. In this case, the patterning in forming the shielding layer 25 can be carried out while confirming the position of the marker from the back surface.

A reflection layer may be provided on the rear surface of the shielding layer 24 to improve a utilization efficiency of the light rays that is lowered in comparison with the provision of the reflection layer on the rear surface of the shielding layer 25. In other words, the configuration shown in FIG. 26 may be preferable in respect to the utilization efficiency of the light rays, but the configuration shown in FIG. 27 may be preferable in respect to an observation impression from the outside.

Examples of the display method and apparatus of the present invention will hereinafter be described.

EXAMPLE 5

In the present example, the three-dimensional image display apparatus having a structure similar to that shown in FIG. 20 is prepared.

More specifically, in the present example, as a liquid crystal display apparatus, an UXGA-LCD panel (pixel number 1600×1200, screen size 240 mm×180 mm) is used. In the liquid crystal display apparatus, three types of sub-pixels 12 of red, green, and blue can independently be driven. Moreover, a length of each of the sub-pixels 12 of red, green, and blue in a transverse direction is 50 μm, and a length of a longitudinal direction is 150 μm. It is to be noted that in the usual two-dimensional image display apparatus, three sub-pixels of red, green, and blue arranged side by side usually form one pixel (triplet), but the sub-pixels of red, green, and blue are handled as the pixels for displaying the two-dimensional image in the present example. Moreover, a glass substrate having a thickness of, for example, 1.0 mm is used in the liquid crystal display apparatus.

For the optical barrier 3, the chromium film and the chromium oxide film are successively formed on one major surface of the glass substrate, and these stacked films are patterned to form the section. It is to be noted that by the patterning, the slit-shaped optical openings 4 extending in the vertical direction and having a width of, for example, 50 μm are disposed at an interval of, for example, 0.8 mm (distance between the centers) in the shielding layer.

Moreover, the optical barrier 3 is disposed in such a manner that a film forming side of the section is disposed opposite to the front surface of the liquid crystal display apparatus, and the distance between the front surface of the liquid crystal display apparatus and a film forming surface is held to be about 2.7 mm. Accordingly, the distance between the front surface of the color filter layer of the liquid crystal display apparatus and the optical barrier 3 is about 3.3 mm in terms of air. In this design, each elemental image is observed in a range of a width of about 240 mm (=0.8 mm×1000 mm/3.3 mm) centering on the opening in a reference distance of, for example, 1 m (in the following description of the width of the viewing zone, a range in which the image can be observed with one eye is indicated. With both eyes, a distance between the eyes which is 65 mm may be subtracted from the value described herein in consideration of the positions of both eyes).

With the use of the above-described constitution, the three-dimensional image display apparatus is obtained in which 16 sub-pixels 12 are arranged in the transverse direction in each pixel 11 for displaying the three-dimensional image. It is to be noted that the viewing zone in which only the true image of the three-dimensional image display apparatus is observable does not exist in a region having a reference distance of 1 m or less. This is because the elemental image disposed opposite to each opening cannot be observed from the openings in the opposite ends of the screen having a width of 240 mm in the reference distance of 1 m. When the reference distance is set to 2.0 m, a region is produced in which the elemental image disposed opposite to each opening can be observed from the openings in the opposite ends of the screen having a width of 240 mm. A viewing zone width in a reference distance of 2.0 m of the three-dimensional image display apparatus is about 210 mm (=240 mm×7 parallaxes/8 parallaxes; in consideration of decrease of the viewing zone width by the scattering of the light ray in the observation position).

In the three-dimensional image display apparatus, each sub-pixel positioned on the opposite ends (two sub-pixels in total) are used as the sub-pixels 12B for displaying the image for warning, and the remaining sub-pixels are used as the sub-pixels 12A for displaying the three-dimensional image among 16 sub-pixels 12 included in the pixels 11 for displaying the three-dimensional image. While all the sub-pixels 12B for displaying the image for warning are maintained in the bright display state, the sub-pixels 12A are driven to display the three-dimensional image. While the observation position is moved in the horizontal direction, the screen is observed.

As a result, the image for warning is mixed and perceived in any region within a reference distance of 1 m or less, and it is possible to clearly recognize that there is no region capable of observing only the true image. Moreover, in a reference distance of 2.0 m, insertion of the image for warning for two sub-pixels is reflected, and the viewing zone width decreases to about 150 mm (=240 mm×5 parallaxes/8 parallaxes). However, as described with reference to FIGS. 5A, 5B, it is possible to easily recognize that the linear image for warning 62 appeared in the observation position deviating from the viewing zone and that the quasi image 61B is mixed in the perceived image.

COMPARATIVE EXAMPLE 1

The three-dimensional image display apparatus similar to that described in Example 5 is prepared except that all the 16 sub-pixels 12 included in the pixels 11 for displaying the three-dimensional image is used as the sub-pixels 12A for displaying the three-dimensional image. Also in this three-dimensional image display apparatus, the sub-pixels 12A are driven to display the three-dimensional image. While moving the observation position in the horizontal direction, the screen is observed. As a result, it is not possible to easily recognize that the image for warning 62 does not appear even in the observation position deviating from the viewing zone or that the quasi image 61B is mixed in the perceived image.

EXAMPLE 6

The three-dimensional image display apparatus including a structure similar to that described in Example 5 is prepared except that the relative position of the pixel 11 for displaying the three-dimensional image with respect to the optical opening 4 is shifted in the direction distant from the display reference position in the stepwise manner apart from the display reference position in the display plane as described with reference to FIGS. 24A and 24B. More specifically, the number of sub-pixels 12 arranged in the horizontal direction in the pixels 11 for displaying the three-dimensional image is set to 16 in the regions A0, A2R, A4R, A2L, A4L. The number of sub-pixels 12 arranged in the horizontal direction in each pixel 11 for displaying the three-dimensional image is set to 17 in the regions A1R, A3R, A1L, A3L. It is to be noted that in the present example, a distance (reference distance) between the display plane shown in FIG. 25A and the intersection 55 in a direction vertical to the display plane is set to 1 m. The width of the viewing zone in which only the true image is observable in the reference distance is set to about 230 mm (=240 mm×15 parallaxes/16 parallaxes).

In the three-dimensional image display apparatus, each sub-pixel positioned on the opposite ends (two sub-pixels in total) is used as the sub-pixels 12B for displaying the image for warning, and the remaining sub-pixels are used as the sub-pixels 12A for displaying the three-dimensional image among 16 sub-pixels 12 included in each pixel 11 for displaying the three-dimensional image. While the sub-pixels 12B for displaying the image for warning are driven to display the checkered pattern, the sub-pixels 12A are driven to display the three-dimensional image. While moving the observation position in the horizontal direction, the screen is observed.

As a result, the insertion of the image for warning for two sub-pixels is reflected, and the viewing zone width decreased to about 200 mm (=240 mm×13 parallaxes/16 parallaxes). However, as described with reference to FIGS. 24A, 24B, it is possible to easily recognize that the image for warning 62 having the checkered pattern appeared all over the screen in the observation position set in the reference distance but deviating from the viewing zone and that the quasi image 61B is mixed in the perceived image. Moreover, when the observation position is deviated from the reference distance and from the viewing zone, the image for warning 62 having the checkered pattern appeared in a part of the screen. Also in this case, it is possible to easily recognize that the quasi image 61B is mixed in the perceived image.

COMPARATIVE EXAMPLE 2

The three-dimensional image display apparatus similar to that described in Example 6 is prepared except that all the sub-pixels 12 included in each pixel 11 for displaying the three-dimensional image is used as the sub-pixels 12A for displaying the three-dimensional image. Also in this three-dimensional image display apparatus, the sub-pixels 12A are driven to display the three-dimensional image. While moving the observation position in the horizontal direction, the screen is observed. As a result, even when the observation position is deviated from the viewing zone, the image for warning 62 does not appear. It is not possible to easily recognize that the quasi image 61B is mixed in the perceived image. It is to be noted that the viewing zone width is about 200 mm in Example 6, whereas the viewing zone width is about 230 mm (=240 mm×15 parallaxes/16 parallaxes) in the present comparative example.

EXAMPLE 7

Figure 28A:
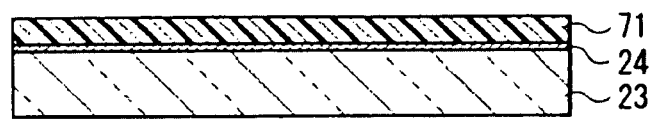
FIGS. 28A to 28H are sectional views schematically showing a method of preparing an optical barrier which can be used in the modified example shown in FIGS. 25A and 25B.
Figure 28B:
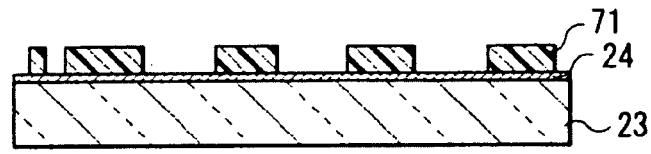

FIGS. 28A to 28H are sectional views schematically showing a method of preparing the optical barrier 3 usable in Example 7 shown in FIGS. 24A and 24B. To prepare the optical barrier 3, first, as shown in FIG. 28A, the chromium oxide film 24 having a thickness of 100 nm is formed on one major surface of the glass substrate 23 by a sputtering process. Next, an electron beam resist is applied onto the chromium oxide film 24 in a thickness of about 500 to 700 nm. The applied film is subjected to a heat treatment to form a resist film 71.

Next, an electron beam drawing device is used to draw a pattern with respect to the resist film 71 in accordance with the optical opening 4-1. Furthermore, the resist film 71 is subjected to a development treatment to form the resist pattern 71 shown in FIG. 28B. It is to be noted that the pattern drawing is carried out so as to form a marker for positioning, constituted of the chromium oxide film, on the end of the major surface of the substrate 23.

Figure 28C:
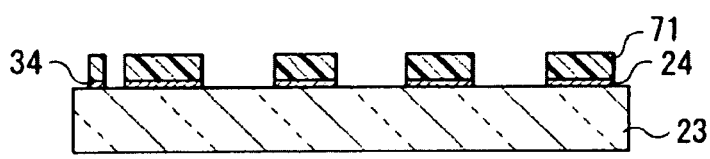

Thereafter, this resist pattern 71 is used as the optical barrier to subject the chromium oxide film 24 to the etching treatment. Here, for example, isotropic wet etching is carried out using dibasic cerium ammonium nitrate and perchloric acid. It is to be noted that when performing anisotropic etching, for example, a mixture gas of carbon tetrachloride and oxygen may be used to perform dry etching. In this manner, the shield pattern 24 and a marker for positioning 34 shown in FIG. 28C are obtained.

Figure 28D:
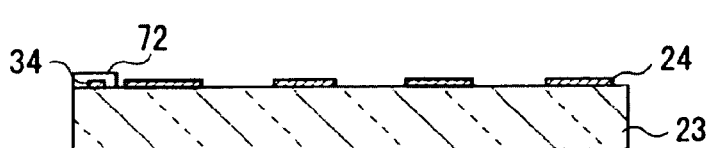

After removing the resist pattern 71 from the shield pattern 24 and marker for positioning 34, as shown in FIG. 28D, a seal 72 is attached to the substrate 23 so as not to coat the shield pattern 24 but to coat the marker for positioning 34. Moreover, a seal 73 is also attached to a position opposite to the seal 72 on the back surface.

Figure 28E:
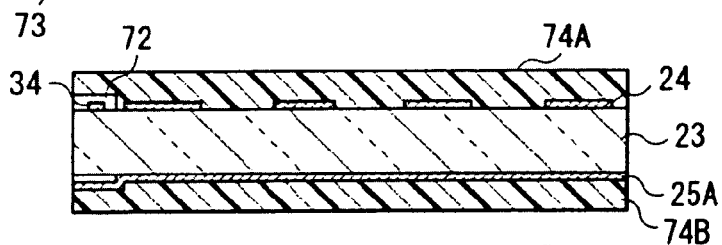

Next, as shown in FIG. 28E, a chromium oxide film 25A having a thickness of 60 nm is formed all over the surface of the substrate 23 to which the seal 73 is attached by the sputtering process. Next, the electron beam resist is applied to the opposite surfaces of the substrate 23 in a thickness of about 500 to 700 nm, and the applied film is subjected to the heat treatment to form resist films 74A, 74b.

Figure 28F:
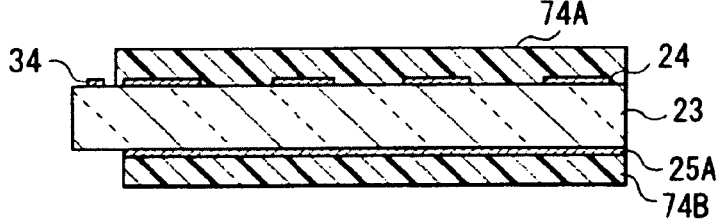
Figure 28G:
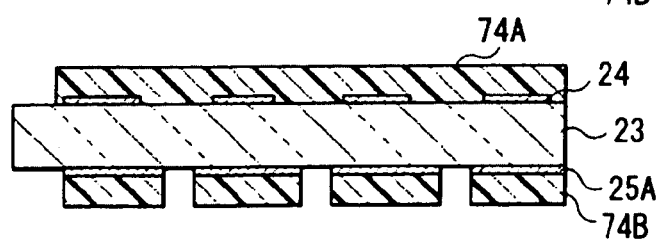

Thereafter, as shown in FIG. 28F, the seals 72, 73 are removed from the substrate 23. When the seals 72, 73 are removed, portions positioned on the seals 72, 73 of the resist films 74A, 74b are removed.

Next, the electron beam drawing device is used to draw the pattern with respect to the resist film 74b in accordance with the optical opening 4-2. In the positioning during the pattern drawing, the marker 34 is used. Furthermore, the resist film 74b is subjected to the development treatment to form the resist pattern 74b shown in FIG. 28G. Thereafter, the resist pattern 74b is used to subject the chromium oxide film 25A to the etching treatment similar to that described with reference to FIG. 28C. It is to be noted that the marker for positioning 34 can be removed by this etching, but there is no problem because the marker 34 has already performed its function.

Figure 28H:
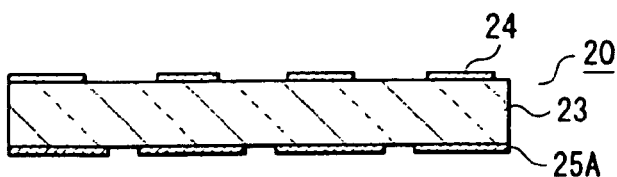

Thereafter, as shown in FIG. 28H, the resist films 74A, 74b are removed from the chromium oxide films 24, 25A, and further the end of the substrate 23 on which the marker 34 is formed is cut. The optical barrier 3 is obtained in this manner.

It is to be noted that in the method described with reference to FIGS. 28A to 28H, the reflective layer 25B is omitted. When the reflective layer 25B is disposed, for example, a step of forming the chromium film 25B having a thickness of about 100 nm on the chromium oxide film 25A may be added between a step of forming the chromium oxide film 25A and a step of forming the resist film 74b.

Moreover, in the method described with reference to FIGS. 28A to 28H, the seals 72, 73 are used to expose the end of the substrate 23 on which the marker 34 is formed from the chromium oxide films 24, 25A, but methods such as optical barrier sputtering may also be used. For the surface on the side of the chromium oxide film 25A, a method of forming the chromium oxide film 25A or a stacked film of the chromium oxide film 25A, and chromium film 25B all over the surface, and thereafter wiping off the portion corresponding to the marker 34 with hydrofluoric acid may also be used.

In the present example, the three-dimensional image display apparatus shown in FIG. 26 is prepared by the above-described method. It is to be noted that in the present example, the liquid crystal display apparatus similar to that used in Example 5 is used in the pixel 11 for displaying the three-dimensional image, and the backlight is disposed on the rear surface. Moreover, a glass substrate having a thickness of 1 mm is used as the transparent substrate 23, the slit-shaped optical opening 4-1 extending in the vertical direction and having a width of about 160 μm is disposed at an interval of 0.8 mm (distance between the centers) in the shield pattern 24, and the slit-shaped optical opening 4-2 extending in the vertical direction and having a width of 50 μm is disposed at an interval of 0.8 mm (distance between the centers) in the shield pattern 25. Furthermore, the distance between the optical barrier 3 and the pixel 11 for displaying the three-dimensional image (corresponding to the distance between the surface of the color filter of the liquid crystal display apparatus and the surface of the optical barrier 3 on which the shield layer 25 is disposed) is set to about 3.3 mm in terms of air. The distance between the glass surface of the liquid crystal display apparatus and the surface of the optical barrier 3 on which the shield layer 25 is disposed is set to about 2.7 mm.

In this three-dimensional image display apparatus, the three-dimensional image is displayed, and the opposite surfaces are observed while moving the observation position in the horizontal direction. As a result, the elemental image itself is not visible with respect to the elemental image whose observation position is deviated from the viewing zone, and the quasi image 61B is not mixed in the perceived image.

EXAMPLE 8

In the present example, the three-dimensional image display apparatus shown in FIG. 27 is prepared in a method similar to that described in Example 7. It is to be noted that in the present example, the liquid crystal display apparatus similar to that used in Example 5 is used in the pixel 11 for displaying the three-dimensional image, and the backlight is disposed on the rear surface. The glass substrate having a thickness of 1 mm is used as the transparent substrate 23, the slit-shaped optical opening 4-1 extending in the vertical direction and having a width of about 50 μm is disposed at an interval of 0.8 mm (distance between the centers) in the shield layer 24, and the slit-shaped optical opening 4-2 extending in the vertical direction and having a width of about 160 μm is disposed at an interval of 0.8 mm (distance between the centers) in the shield layer 25. For the opening disposed opposite to the elemental image constituted of 17 sub-pixels required for shifting the elemental image, the width of the opening is accordingly expanded to about 170 μm. Since the elemental image shifted outward with respect to the opening, the central position of the opening is shifted inwards every about 10 μm. Furthermore, the distance between the optical barrier 3 and the pixel 11 for displaying the three-dimensional image (corresponding to the distance between the surface of the color filter of the liquid crystal display apparatus and the surface of the optical barrier 3 on which the shield layer 25 was disposed) is set to about 3.3 mm in terms of air. The distance between the glass surface of the liquid crystal display apparatus and the surface of the optical barrier 3 on which the shield layer 25 is disposed is set to about 2.7 mm.

In this three-dimensional image display apparatus, the three-dimensional image is displayed, and the screen is observed while moving the observation position in the horizontal direction. As a result, the elemental image itself is not visible, when the observation position is deviated from the viewing zone in a reference distance of 1 m. Moreover, the quasi image 61B is not mixed with the perceived image. Also in the observation deviating from the reference distance, the elemental image itself whose observation position is deviated from the viewing zone is not visible, and the quasi image 61B is not mixed with the perceived image.

As described above, according to the present invention, there are provided a three-dimensional image display apparatus and a display method using the apparatus in which the observer can recognize that the quasi image is not perceivable or that the three-dimensional image perceived by the observer includes the quasi image. Even when the number of pixels for displaying the two-dimensional image included in the pixels for displaying the three-dimensional image is comparatively small, the image can smoothly change at the time of the movement of the observation position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method of manufacturing an apparatus for displaying a three-dimensional image observable in a viewing zone having a reference plane, comprising:
   forming a first film on one major surface of a glass substrate;
   applying a first resist onto the first film;
   patterning the first resist in accordance with a first optical opening and a marker;
   etching the first film;
   removing the first resist;

attaching a seal to coat the marker;
forming a second film on opposite surface of the glass substrate;
applying a second resist onto the second film using the marker;
removing the seal;
patterning the second resist in accordance with a second optical opening;
etching the second film and the marker;
removing the second resist;
wherein the apparatus includes:
   a display unit including pixels which are arranged in a matrix form, the pixels comprising sub-pixels disposed at a constant pixel pitch and grouped into first and second groups of sub-pixel arrays arranged along lines of sub-pixels, wherein each of the first groups of sub-pixel arrays has n number of sub-pixels, each of the second groups of sub-pixel arrays has (n+1) number of sub-pixels (n is a natural number), and the second groups of sub-pixel arrays are dispersedly allocated in an arrangement of the first groups of sub-pixel arrays along the lines of pixels;
   a display driver configured to display elemental images on sub-pixel arrays in the first and second groups of sub-pixel arrays, wherein
   the elemental images displayed on the first groups of sub-pixel arrays are produced from n parallax images, the n parallax images being displayed on a respective one of the n sub-pixels,
   the elemental images displayed on the second groups of sub-pixel arrays are produced from (n+1) parallax images, the (n+1) parallax images being displayed on a respective one of the (n+1) sub-pixels, and
   the parallax images embody views of the three-dimensional image from different directions; and
   a transmission control panel having optical openings arranged at a constant opening pitch and facing the first and second groups of pixel arrays, respectively, the transmission control panel being configured to control light rays emitted from the display unit so as to project the elemental images on the reference plane through the optical openings, respectively and the optical openings including the first optical opening and the second opening.

2. A display driver for an apparatus for displaying a three-dimensional image observable in a viewing zone having a reference plane, the apparatus comprising:
   a display unit including pixels which are arranged in a matrix form, the pixels comprising sub-pixels disposed at a constant pixel pitch and grouped into first and second groups of sub-pixel arrays arranged along lines of sub-pixels, wherein each of the first groups of sub-pixel arrays has n number of sub-pixels, each of the second groups of sub-pixel arrays has (n+1) number of sub-pixels (n is a natural number), and the second groups of sub-pixel arrays are dispersedly allocated in an arrangement of the first groups of sub-pixel arrays along the lines of pixels; and
   a transmission control panel having optical openings arranged at a constant opening pitch and facing the first and second groups of pixel arrays, respectively, the transmission control panel being configured to control light rays emitted from the display unit so as to project elemental images on the reference plane through the optical openings, respectively; wherein
   said display driver is configured to display the elemental images on sub-pixel arrays in the first and second groups of sub-pixel arrays,
   the elemental images displayed on the first groups of sub-pixel arrays are produced from n parallax images, the n parallax images being displayed on a respective one of the n sub-pixels,
   the elemental images displayed on the second groups of sub-pixel arrays are produced from (n+1) parallax images, the (n+1) parallax images being displayed on a respective one of the (n+1) sub-pixels, and
   the parallax images embody views of the three-dimensional image from different directions.

3. The display driver according to claim 2, wherein
   the elemental images have elemental image centers,
   the optical openings have optical opening centers, and
   a principle light ray emitted from one of the elemental image centers and passing through a corresponding one of the optical opening centers is incident on the viewing zone.

4. The display driver according to claim 2, wherein
   the elemental images have elemental image centers,
   the optical openings have optical opening centers, and
   light rays emitted from the first and second groups of sub-pixel arrays and passing through the optical opening centers are incident on the viewing zone.

5. The display driver according to claim 2, wherein the display unit has a center region in which the first groups of sub-pixel arrays are arranged, and the second groups of sub-pixel arrays are symmetrically arranged with respect to the center region.

6. The display driver according to claim 2, wherein the opening pitch is substantially equal to an integer multiple of the sub-pixel pitch.

* * * * *

UNITED STATES PATENT AND TRADEMARK OFFICE
CERTIFICATE OF CORRECTION

PATENT NO. : 7,714,857 B2  
APPLICATION NO. : 12/191246  
DATED : May 11, 2010  
INVENTOR(S) : Fukushima et al.

Page 1 of 1

It is certified that error appears in the above-identified patent and that said Letters Patent is hereby corrected as shown below:

Title page, Item (57), in the Abstract, line 1, change "a optical" to --an optical--.

Title page, Item (57), in the Abstract, line 3, change "groped" to --grouped--.

Title page, Item (57), in the Abstract, line 11, change "axe," to --axes,--.

Claim 1, column 49, line 42, change "respectively and" to --respectively, and--.

Signed and Sealed this

Sixth Day of July, 2010

David J. Kappos  
*Director of the United States Patent and Trademark Office*